(12) United States Patent
Blood et al.

(10) Patent No.: US 11,844,335 B2
(45) Date of Patent: Dec. 19, 2023

(54) ARTIFICIAL FISH ATTRACTOR, ESCAPE HABITAT, AND FISH FEEDER SYSTEMS AND METHODS

(71) Applicant: TH Products, LLC, San Antonio, TX (US)

(72) Inventors: Chris Blood, San Antonio, TX (US); Feiyu Shi, Auburn, AL (US); Paul Sides, San Antonio, TX (US); Dale Baden, San Antonio, TX (US); Bart Stephens, Birmingham, AL (US); David Miner, Lakehills, TX (US); Brett Jarriel, Aiken, SC (US); Noah Stewart, Auburn, AL (US); Will Goering, Sparks, MD (US)

(73) Assignee: TH Products, LLC, San Antonio, TX (US)

( * ) Notice: Subject to any disclaimer, the term of this patent is extended or adjusted under 35 U.S.C. 154(b) by 0 days.

(21) Appl. No.: 17/519,994

(22) Filed: Nov. 5, 2021

(65) Prior Publication Data

US 2022/0142128 A1 May 12, 2022

Related U.S. Application Data

(60) Provisional application No. 63/111,405, filed on Nov. 9, 2020.

(51) Int. Cl.
*A01K 61/73* (2017.01)
*A01K 61/78* (2017.01)

(52) U.S. Cl.
CPC .............. *A01K 61/73* (2017.01); *A01K 61/78* (2017.01)

(58) Field of Classification Search
CPC ................................ A01K 61/73; A01K 61/78
See application file for complete search history.

(56) References Cited

U.S. PATENT DOCUMENTS

| | | | | |
|---|---|---|---|---|
| 4,094,270 A | * | 6/1978 | Whitlock | A01K 61/70 220/6 |
| 4,727,672 A | * | 3/1988 | Hill | A01K 61/70 428/17 |
| 4,916,845 A | * | 4/1990 | Aydelette, Sr. | A01K 97/02 43/4 |
| 5,042,424 A | * | 8/1991 | Hense | A01K 61/70 119/221 |
| 5,062,382 A | * | 11/1991 | Matsuda | F16B 5/0664 119/51.04 |

(Continued)

OTHER PUBLICATIONS

Smith (GB-2594351-A ) (Year: 2021).*

(Continued)

*Primary Examiner* — Monica L Perry
*Assistant Examiner* — Brittany A Lowery
(74) *Attorney, Agent, or Firm* — Bradley Arant Boult Cummings LLP; Stephen Hall; Jessica L. Zurlo

(57) ABSTRACT

Fish attractor and escape habitat systems are disclosed. The fish attractor and escape habitat systems include a pyramid-shaped base structure having a plurality of side walls forming an interior space and having an open bottom and an open top, where the side walls include elongated slots for fish to swim into and out of the interior space and brace slots for receiving braces that provide shade for the fish. Spawning devices and conservation systems for fish forage growth are also disclosed.

19 Claims, 42 Drawing Sheets

(56) References Cited

U.S. PATENT DOCUMENTS

| | | | | |
|---|---|---|---|---|
| 5,173,006 A | * | 12/1992 | Lowe | A01K 61/70 |
| | | | | 119/221 |
| 5,315,779 A | * | 5/1994 | Fussell | A01K 61/70 |
| | | | | 43/4 |
| 6,186,702 B1 | * | 2/2001 | Bartkowski | A01K 61/70 |
| | | | | 119/221 |
| 6,824,327 B1 | * | 11/2004 | Walter | A01K 61/70 |
| | | | | 119/221 |
| 6,978,735 B1 | * | 12/2005 | Yeager | A01K 61/70 |
| | | | | 119/221 |
| D625,471 S | | 10/2010 | King | |
| 8,020,515 B2 | * | 9/2011 | Metzler | A01K 61/70 |
| | | | | 119/221 |
| D745,747 S | | 12/2015 | King | |
| D757,369 S | | 5/2016 | Marsden | |
| 9,560,838 B1 | * | 2/2017 | King | A01K 97/01 |
| 9,681,645 B2 | | 6/2017 | Marsden | |
| 9,744,687 B2 | * | 8/2017 | Hilton | B28B 1/32 |
| 2017/0112106 A1 | * | 4/2017 | Marsden | A01K 97/00 |
| 2022/0178100 A1 | * | 6/2022 | De Leeneer | E02B 3/06 |

OTHER PUBLICATIONS

Kim (KR-101788562-B1) (Year: 2017).*
Translation of KR 200361768 Y1; 김길평 et al.; "Ecological Embankment Construction of River"; Jun. 30, 2004 (Year: 2004).*
Translation of KR 101788562 B1; Kim Sang Chun; "Multi-Functional Fish Bank Using Buoyancy Member"; Mar. 24, 2017 (Year: 2017).*

* cited by examiner

ARTIFICIAL FISH ATTRACTOR, ESCAPE HABITAT, AND FISH FEEDER SYSTEMS AND METHODS

CROSS-REFERENCE TO RELATED APPLICATIONS

This application claims the benefit of and priority to U.S. Provisional Application No. 63/111,405, filed on Nov. 9, 2020, and entitled "Artificial Fish Attractor, Escape Habitat, and Fish Feeder Systems and Methods," the disclosure of which is expressly incorporated by reference in its entirety.

TECHNICAL FIELD

The present invention relates generally to the field of fish attracting systems and methods. The systems disclosed herein can act as a fish habitat, provide an escape habitat, serve as a foundation for growth of fish forage, provide a fish feeding structure, and also facilitate spawning.

BACKGROUND

It is widely known that fish are often attracted to or congregate around various structures. For example, fish and other aquatic animals use the structures for protection, shade, to feed on other fish or prey attracted to the structures, to lay eggs, and for other purposes. Such structures may include aquatic vegetation, for example, hydrilla, milfoil, or lily pads, or timber or brush piles. In hopes of attracting fish, some fisherman will create and place their own structures, including sinking Christmas trees, brush piles, or other structures, in areas where they plan to fish. However, these structures often deteriorate, or end up being moved from their original location due to currents or water movements. Accordingly, there remains a need in the art for improved systems and methods for attracting fish to increase fishermen's chances of catching fish and providing escape habitats for smaller fish.

SUMMARY

The problems expounded above, as well as others, are addressed by the following inventions, although it is to be understood that not every embodiment of the inventions described herein will address each of the problems described above. The present disclosure describes different embodiments of certain artificial fish attractor, escape habitat, and fish feeder systems and methods.

In some embodiments of the present disclosure, a fish attractor and escape habitat system is provided, the fish attractor and escape habitat system including a pyramid-shaped base structure including a plurality of side walls forming an interior space and having an open bottom and an open top, wherein the side walls include a plurality of elongated slots and brace slots formed therein, and wherein the pyramid-shaped base structure is formed of a thermoplastic polymeric material having a density of about 0.80 g/cm$^3$ or less. In some embodiments, the pyramid-shaped base structure is formed of high-density polyethylene (HDPE). In further embodiments, the elongated slots have a width of about 2.54 cm (1 inch) to about 7.62 cm (3 inches) and a length of about 5.08 cm (2 inches) to about 15.24 cm (6 inches). In still further embodiments, each side wall includes a tab configured for attachment to a corresponding slot on an adjacent side wall. In yet other embodiments, the thermoplastic polymeric material has a tensile strength of about 3,000 psi or greater. In still further embodiments, the pyramid-shaped base structure has a length of about 0.91 m (three feet) to about 3.05 m (ten feet).

In further embodiments of the present disclosure, a fish attractor and escape habitat system is provided, the fish attractor and escape habitat system including a pyramid-shaped base structure including a plurality of sloping side walls forming an interior space and having an open bottom and an open top, wherein the sloping side walls include a plurality of elongated slots and brace slots formed therein, a plurality of braces slidably attached to the pyramid-shaped base structure at the brace slots, wherein the pyramid-shaped base structure and the plurality of braces are formed of a thermoplastic polymeric material having a density of about 0.80 g/cm$^3$ or less. In some embodiments, the braces have a textured surface including a plurality of longitudinal ribs. In further embodiments, the braces are V-shaped. In other embodiments, the braces are shaped as a wave having two inwardly curved portions. In still further embodiments, the braces are at least 0.91 m (three feet) in length. In yet other embodiments, each of the sloping side walls includes an upper edge that forms the open top and each of the upper edges includes a plurality of holes configured for attaching a cable thereto. In still further embodiments, each of the sloping side walls includes a bottom edge that forms the open bottom and each of the bottom edges includes a plurality of jagged teeth.

In still further embodiments, a kit for a fish attractor and escape habitat system is provided, the kit including a pyramid-shaped base structure including a plurality of side walls forming an interior space and having an open bottom and an open top, wherein the side walls include a plurality of elongated slots and brace slots formed therein, a plurality of braces configured for insertion into the pyramid-shaped base structure at the brace slots, a cable configured for attaching a weight to the pyramid-shaped base structure, and a plurality of clips configured for attaching the cable to the pyramid-shaped base structure. In some embodiments, the weight includes a cinder block, a paver, or a brick. In further embodiments, the cable is made of stainless steel. In still further embodiments, the cable includes a center loop configured for attachment to the weight and two end loops configured for attachment to the clips. In yet further embodiments, each of the side walls includes a plurality of holes configured for attachment by the clips. In some embodiments, the clips are carabiner clips. In yet other embodiments, the pyramid-shaped base structure and the braces are formed of high-density polyethylene (HDPE).

BRIEF DESCRIPTION OF THE DRAWINGS

Further features and advantages can be ascertained from the following detailed description that is provided in connection with the drawings described below.

DETAILED DESCRIPTION

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural (i.e., "at least one") forms as well, unless the context clearly indicates otherwise.

The terms "first," "second," "third," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Spatially relative terms, such as "above," "under," "below," "lower," "over," "upper," and the like, may be used herein for ease of description to describe one element or feature's relationship to another when the apparatus is right side up as shown in the accompanying drawings.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

Referring to FIGS. 1-4, a fish attractor and escape habitat system 100 according to an exemplary embodiment of the present disclosure is shown. The fish attractor and escape habitat system 100 can provide an escape habitat for fish to hide from predators. The fish attractor and escape habitat system 100 can also be used to attract fish by providing shade within a body of water and providing a food source for the fish. The fish attractor and escape habitat system 100 can be deployed in any body of water, including, for example, in ponds, lakes, rivers, marshes, swamps, and the ocean.

Figure 3:
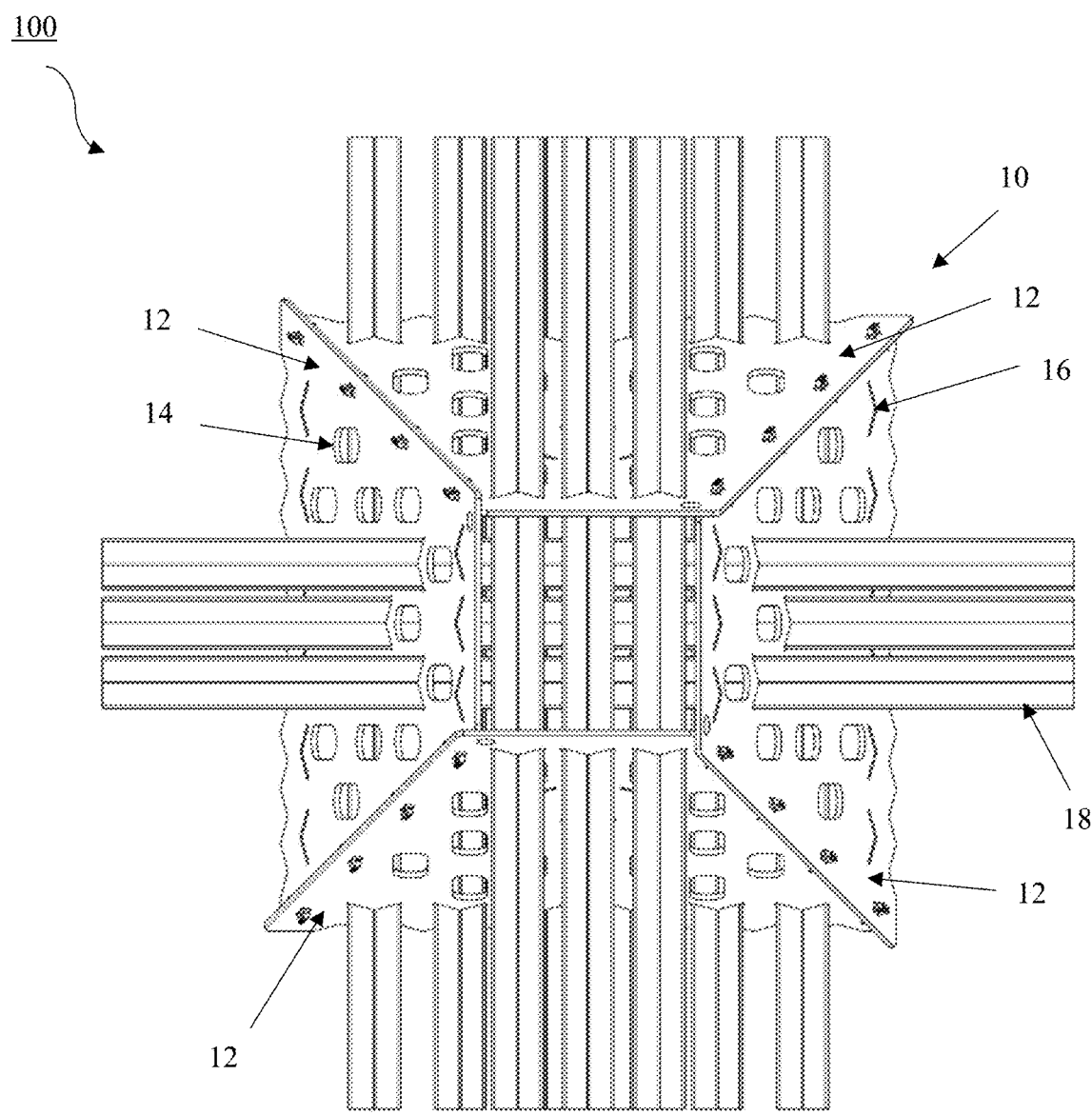
FIG. 3 is a top view of the fish attractor and escape habitat system shown in FIG. 1.

The fish attractor and escape habitat system 100 includes a base structure 10. In the illustrated embodiment, the base structure 10 is made up of four side walls 12 that are configured to resemble a pyramid-type structure. As shown in FIG. 3, the side walls 12 form a pyramid-type structure having a truncated (or flat) top. However, the base structure 10 can also form a full pyramid-type structure with a pointed top. Other geometrical configurations can also be used for the base structure 10. For example, the base structure 10 may resemble a cube-shaped structure, a cone-shaped structure, a diamond-shaped structure, or a cylindrically shaped structure. In some embodiments, each of the side walls 12 may include a bottom edge 20 having a plurality of jagged teeth 22 formed therein. The zig-zag pattern formed by the jagged teeth 22 provides increased stability and prevents movement when the fish attractor and escape habitat system 100 is anchored in the body of water. In some embodiments, some or all of the bottom edges 20 may have the jagged teeth 22. In other embodiments, the bottom edges 20 of the side walls 12 can be straight. In still other embodiments, only one or two jagged teeth 22 may be used on the bottom edge 20, or at the corners of the base structure 10, for securing the base structure 10 to the bottom. In still other embodiments, the bottom edges 20 may have tabs or flanges that have holes that can receive a stake, large nail, or spike to secure the base structure 10 in a particular spot.

Figure 1:
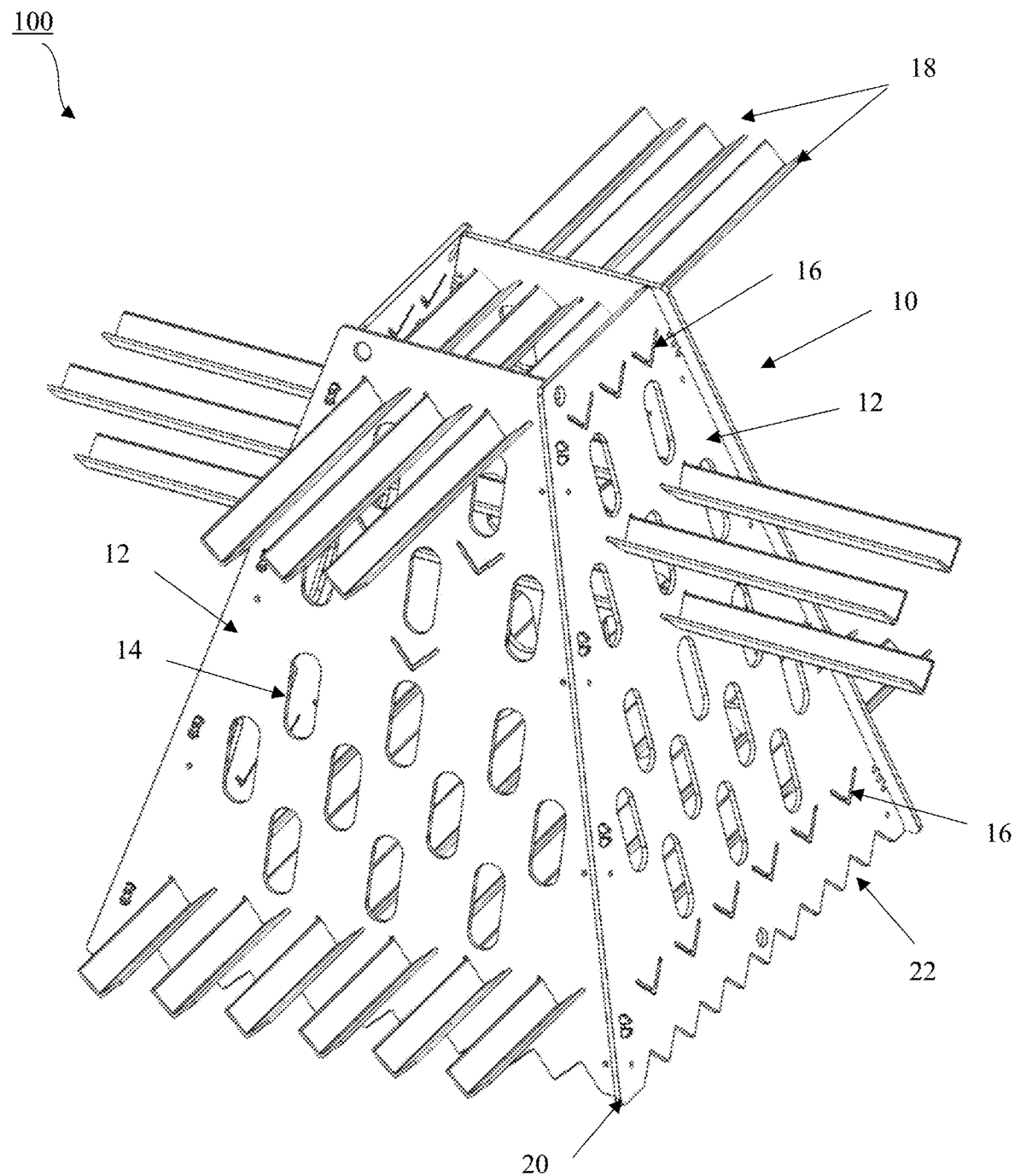
FIG. 1 is a front perspective view of a fish attractor and escape habitat system according to an embodiment of the present disclosure.
Figure 2:
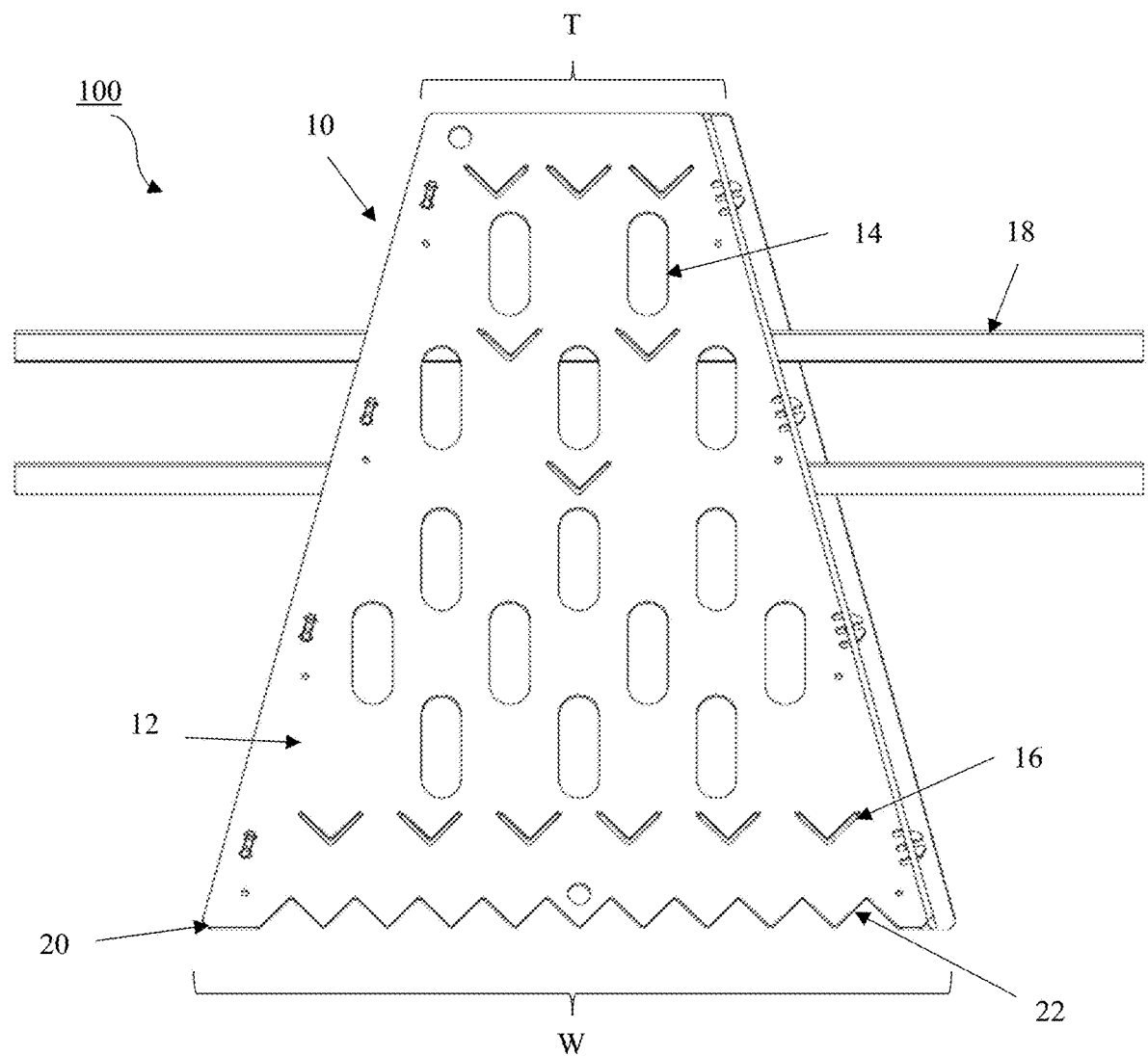
FIG. 2 is a front view of the fish attractor and escape habitat system shown in FIG. 1.

In some embodiments, each of the side walls 12 include a plurality of elongated slots 14. The elongated slots 14 are designed to allow fish to swim through the slots and provide an escape area for fish from predators. The smaller forage fish inside the system 100 naturally attract predator fish to the system 100 and the surrounding area. As shown in FIGS. 1 and 2, the elongated slots 14 are formed within each side wall 12. In some embodiments, the elongated slots 14 may be arranged in a pattern on each of the side walls 12. For example, in the illustrated embodiment of FIGS. 1-5, the elongated slots 14 are arranged in five rows having two, three, or four elongated slots 14 in each row. In the illustrated embodiment of FIG. 6, the elongated slots 14 are arranged in nine rows having three to eight elongated slots 14 in each row. In other embodiments, the elongated slots 14 may be arranged in a random fashion on each of the side walls 12. Any number of elongated slots 14 may be utilized on the side walls 12 and will vary depending on the size of the base structure 10. The elongated slots 14 may also have any size sufficient to allow for fish to enter and exit the base structure 10. In some embodiments, the elongated slots 14 may have a width of about 2.54 cm (1 inch) to about 7.62 cm (3 inches), preferably about 2.54 cm (1 inch) to about 5.08 cm (2 inches), and a length of about 5.08 cm (2 inches) to about 15.24 cm (6 inches), preferably about 7.62 cm (3 inches) to about 12.7 cm (5 inches). For example, the elongated slots 14 may have dimensions of about 3.81 cm (1½ inches) by 10.16 cm (4 inches), 2.54 cm (1 inch) by 7.62 cm (3 inches), 5.08 cm (2 inches) by 12.7 cm (5 inches), or any combination thereof. While the elongated slots 14 are shown in the figures as having an oval shape, the elongated slots 14 may also have any other shape that allows fish to enter and exit, such as circular, square, rectangular, or a diamond shape.

In some embodiments, the base structure 10 also includes one or more brace slots 16 configured to receive and support corresponding braces 18 that may be used with the base structure 10. The corresponding braces 18 may be inserted through the brace slots 16, as shown in FIGS. 1-4. The braces 18 provide stability to the base structure 10. The braces 18 also catch sediment in the water and promote the growth of food sources for fish, such as algae, phytoplankton, and other aquatic vegetation. Moreover, the braces 18 can extend outside the base structure 10 which allows for the braces 18 to provide shade and attract fish.

In some embodiments, the braces 18 have a textured surface that includes a plurality of longitudinal ribs on the inner and outer surfaces. The rough texture promotes the growth of algae and phytoplankton on the braces 18, which helps to attract the fish and can serve as a food source to fish and other living creatures. In other embodiments, the braces 18 may have a smooth surface. In the illustrated embodiment, the brace slots 16 and the corresponding braces 18 have a "V"-shaped configuration. However, other configurations could be used, for example, straight slots and braces (either vertical, horizontal, angled, or a combination of the foregoing), round slots and braces, square slots and braces, wavy or curved slots and braces, S-shaped slots and braces, U-shaped slots and braces, W-shaped slots and braces, L-shaped slots and braces, Z-shaped slots and braces, or any combination of the foregoing.

In some embodiments, the braces 18 are insertable into the brace slots 16 and moveable (or slidable) within the brace slots 16. However, when placed into the water, the braces 18 generally stay in place due to the preferably close friction fit between the braces 18 and the brace slots 16. In some embodiments, the braces 18 may also have a structure that can be used to connect to the base structure 10, for example, a tab/slot design, flanges for using screws, bolts, nuts, or other connection mechanisms so that the braces 18 are not slidable relative to the base structure 10.

In the illustrated embodiment, a total of twelve braces 18 are utilized with the base structure 10. As shown in FIG. 1, three braces 18 are inserted through the brace slots 16 positioned at the top of the base structure 10, six braces 18 are inserted through the brace slots 16 positioned at the bottom of the base structure 10, and three braces 18 are inserted through various brace slots 16 positioned in the center of the base structure 10. However, any number and configuration of the braces 18 may be used with the base structure 10. For instance, the base structure 10 may have braces 18 inserted through every brace slot 16 or none at all. In other embodiments, the braces 18 may be inserted only near the bottom of the base structure 10 or only near the top of the base structure 10. The braces 18 may also be inserted into the base structure 10 such that the braces 18 extend along the length of the base structure 10 and/or they may be inserted into the base structure 10 such that the braces 18 extend along the width of the base structure 10. FIG. 1 shows the braces 18 extending along both the length and the width of the base structure 10.

Figure 5:
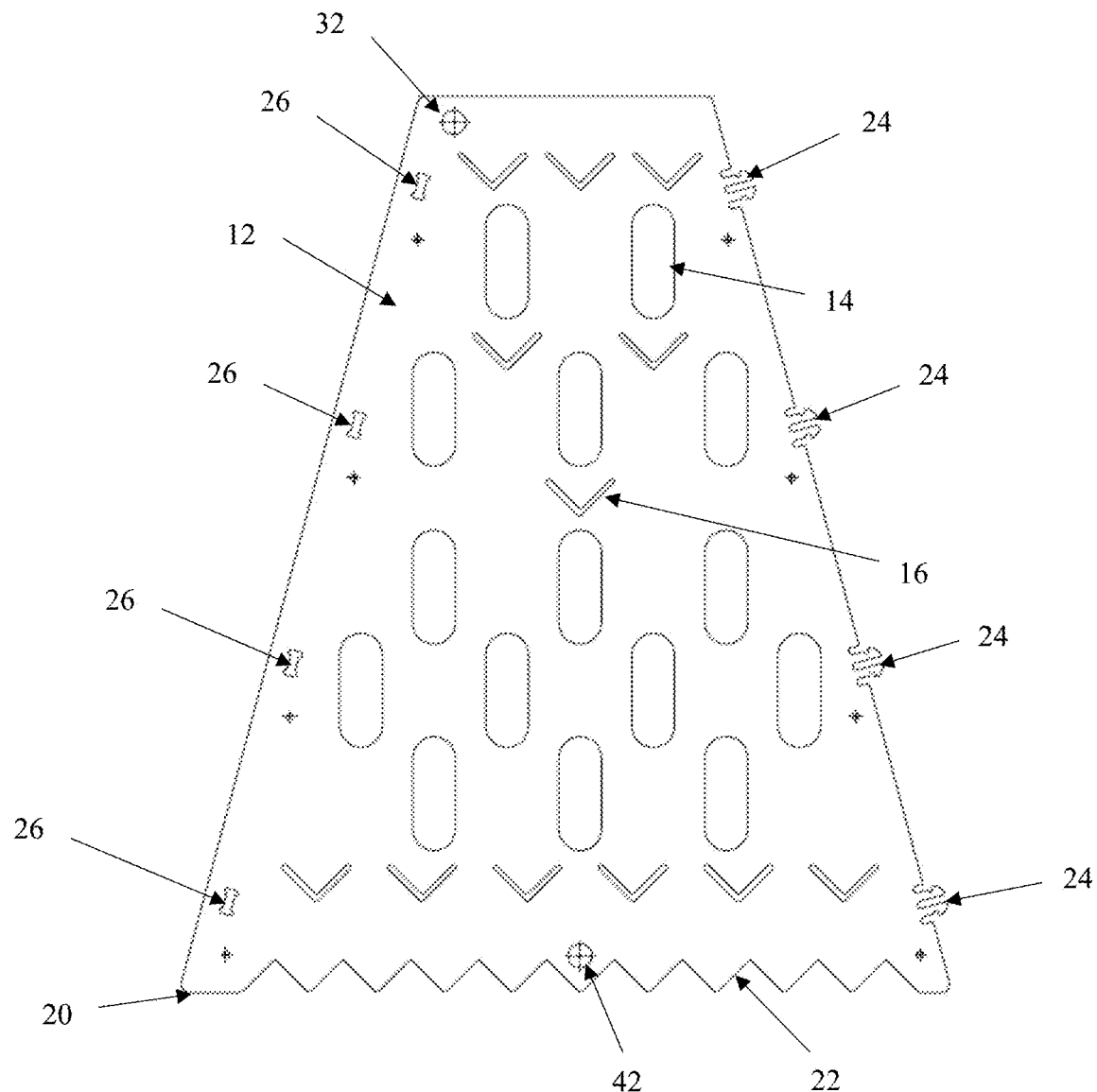
FIG. 5 is a front view of a side wall utilized with the fish attractor and escape habitat system according to one embodiment of the present disclosure.
Figure 6:
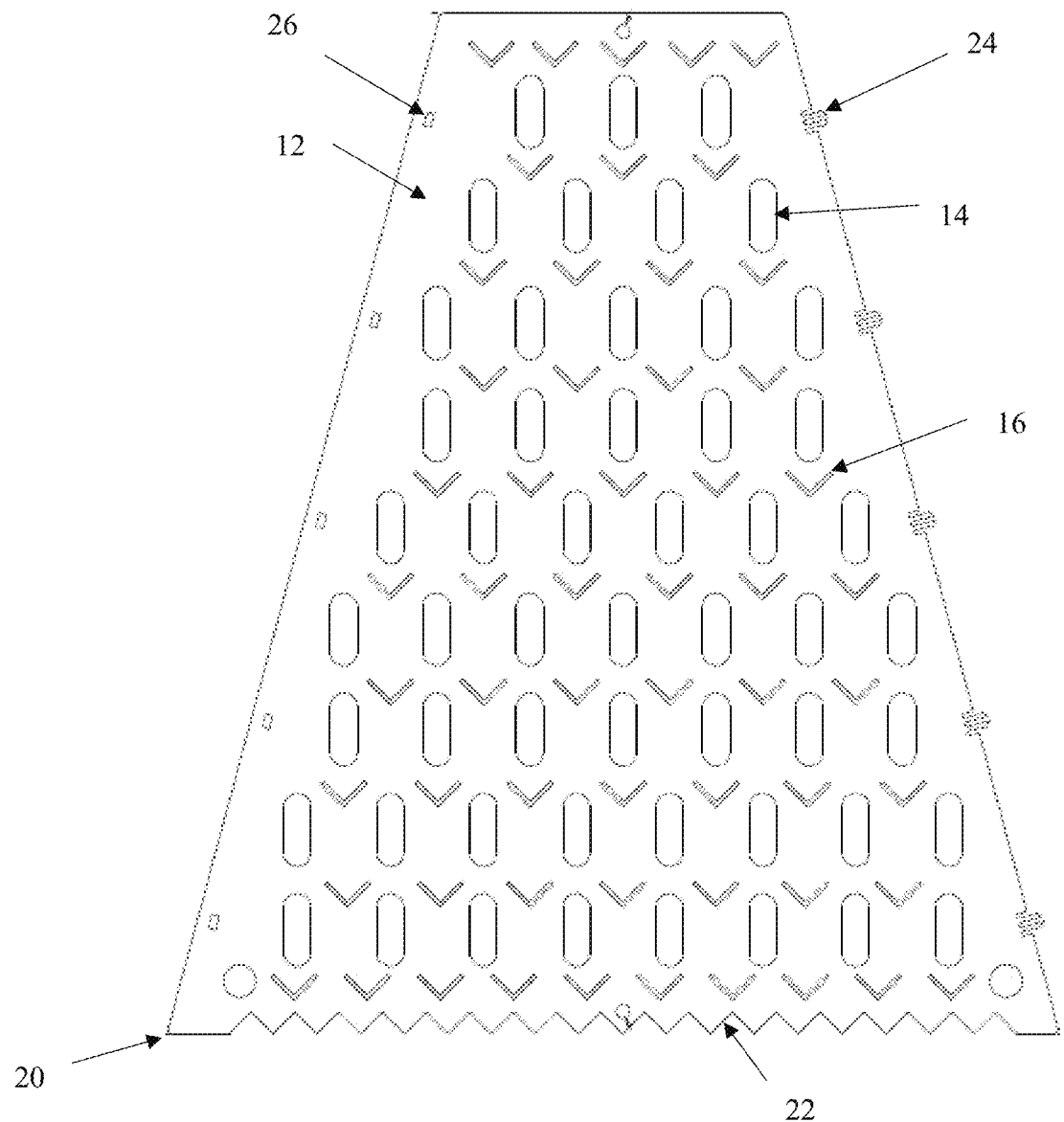
FIG. 6 is a front view of the side wall utilized with the fish attractor and escape habitat system according to another embodiment of the present disclosure.

In some embodiments, the side walls 12 are separate pieces that are removably attached to each other to form the base structure 10. FIGS. 5 and 6 show the side walls 12 of the base structure 10 having an exemplary attachment mechanism. As shown in FIGS. 5 and 6, each side wall 12 may have a plurality of tabs 24 that can connect to a plurality of corresponding slots 26 on the adjacent side wall 12. In some embodiments, the tabs 24 can fit within the slots 26 using a snap fitting. The tabs 24 and corresponding slots 26 can be spaced apart along the edges of the side walls 12. The side walls 12 may also utilize a variety of other configurations that allow the side walls 12 to be connected together. For example, the side walls 12 may be connected using male or female connections, for example, one side wall 12 may have a male fitting to connect into a female fitting on the adjacent side wall 12. In still other embodiments, the side walls 12 may be connected using slots and grooves, for example, a slot on one side wall 12 may be received within a groove on an adjacent side wall 12. The side walls 12 may also have holes so that adjacent panels can be connected with zip ties or other securing mechanisms. The side walls 12 may also have flanges or lips to accommodate the use of screws, bolts, and/or nuts to secure the side walls 12 together. While the side walls 12 are described herein as separate pieces, it will be apparent to one of ordinary skill in the art that the base structure 10 may also be designed such that the side walls 12 are integrally formed with one another to form a unitary, one-piece base.

Figure 4:
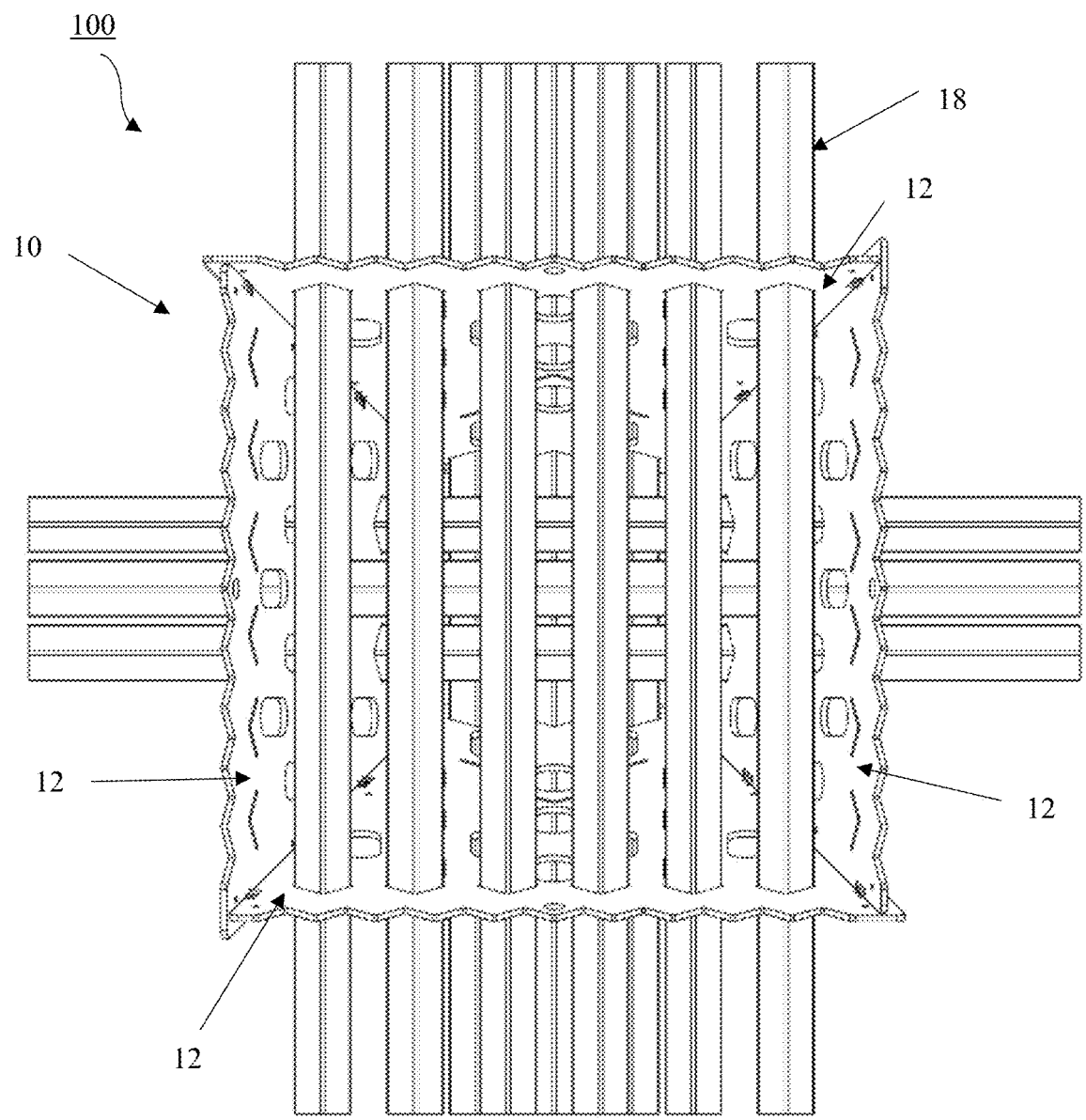
FIG. 4 is a bottom view of the fish attractor and escape habitat system shown in FIG. 1.

The embodiments of the fish attractor and escape habitat system 100 shown in the figures generally have an open bottom. As shown in FIG. 4, the base structure 10 does not have a bottom. In other embodiments, the base structure 10 can have a bottom. In some embodiments, the bottom wall is similar to the side walls 12 and may or may not include the slots 14 designed to allow small fish to swim in and out of the interior. In other embodiments, and preferred for those embodiments that may be configured to sit on the bottom surface of a body of water, the bottom wall may be solid, and shaped and configured similar to the platform discussed in U.S. application Ser. No. 17/479,213, entitled "Fish Attracting Systems and Methods", filed on Sep. 20, 2021, the entire disclosure of which is incorporated by reference. This also allows the use of a weight to secure the system 100 to the bottom of the body of water.

The base structure 10 and the corresponding braces 18 may be made of any suitable material allows for the base structure 10 to float within the body of water. In one embodiment, the base structure 10 and the corresponding braces 18 may be made of a thermoplastic polymeric material. Suitable thermoplastic polymeric materials include, but are not limited to, high-density polyethylene (HDPE), nylon (polyamide), acrylic, polycarbonate, polyoxymethylene (POM), polystyrene (PS), acrylonitrile butadiene styrene (ABS), polypropylene (PP), and polyethylene (PE). In one embodiment, the base structure 10 and the corresponding braces 18 are made from HDPE, preferably closed-cell or cellular, marine-grade HDPE to withstand the aquatic environment. HDPE is advantageous in that the material will float, is recyclable, and will not rot, discolor, swell, splinter, or delaminate when exposed to UV, humidity, or water.

In one embodiment, the base structure 10 and the corresponding braces 18 have a density of less than 0.90 g/cm$^3$ such that the base structure 10 floats within the water. For example, the base structure 10 and the corresponding braces 18 may have a density of about 0.80 g/cm$^3$ or less. In other embodiments, the base structure 10 and the corresponding braces 18 have a density of about 0.77 g/cm$^3$ or less. The base structure 10 and the corresponding braces 18 should also be weatherproof, weather resistant, and durable to withstand the aquatic environment. In some embodiments, the base structure 10 and the corresponding braces 18 have a tensile strength greater than about 3,000 psi. In other embodiments, the base structure 10 and the corresponding braces 18 have a tensile strength greater than about 3,300 psi. In still other embodiments, the base structure 10 and the corresponding braces 18 have a tensile strength greater than 4,000 psi.

The base structure 10 may have any shape and size suitable to allow for the fish attractor and escape habitat system 100 to be deployed and used in the water. In some embodiments, each side wall 12 of the base structure 10 may have a base width W of at least about 63.5 cm (25 inches) or more. In another embodiment, each side wall 12 of the base structure 10 may have a base width W of at least about 76.2 cm (30 inches) or more. In still another embodiment, each side wall 12 of the base structure 10 may have a base width W of at least about 91.44 cm (36 inches) or more. In yet other embodiments, each side wall 12 of the base structure 10 may have a base width W of at least about 121.92 cm (48 inches) or more. In still other embodiments, each side wall 12 of the base structure 10 may have a base width W of at least about 152.4 cm (60 inches) or more. For example, the base structure 10 may have a bottom profile of about 91.44 cm (36 inches) by 91.44 cm (36 inches) or 121.92 cm (48 inches) by 121.92 cm (48 inches). Each side wall 12 of the base structure 10 may also have a top width T of at least about 20.32 cm (8 inches) or more. In other embodiments, each side wall 12 may have a top width T of at least about 25.4 cm (10 inches) or more. In still other embodiments, each side wall 12 may have a top width of at least about 38.1 cm (15 inches) or more. The side walls 12 are preferably between 0.3175 cm (⅛ inches) and 1.27 cm (½ inches) in thickness, and more preferably approximately 0.635 cm (¼ inches) in thickness.

The base structure 10 may have a height of at least about 76.2 cm (30 inches) or greater. In other embodiments, the base structure 10 may have a height of at least about 88.9 cm (35 inches) or greater. In still other embodiments, the base structure 10 may have a height of at least about 101.6 cm (40 inches) or greater. For example, the base structure 10 may have a height of at least about 137.16 cm (54 inches) or greater. In further embodiments, the base structure 10 may have a height of at least about 213.36 cm (84 inches) or greater. In yet further embodiments, the base structure 10 may have a height of at least about 243.84 cm (96 inches) or greater. In some embodiments, the ratio of the base width W to the height is approximately 1:1. In other embodiments, the ratio of the base width W to the height is approximately 1:1.2. In still other embodiments, the ratio of the base width W to the height is approximately 1:1.5. As will be apparent to one of ordinary skill in the art, the width and height dimensions can be smaller or larger, depending on the preferred use.

The braces 18 may also have any shape and size suitable to allow for the braces 18 to be inserted through the base structure 10. In some embodiments, the braces 18 have a length of at least about 91.44 cm (36 inches). In other embodiments, the braces 18 have a length of at least about 101.6 cm (40 inches). In still other embodiments, the braces 18 have a length of at least about 106.68 cm (42 inches). In still other embodiments, the braces 18 are at least about 121.92 cm (48 inches) in length. However, as will be apparent to one of ordinary skill in the art, the braces 18 should be sufficiently long enough to protrude out from the base structure 10 and will vary in length depending on the size of the base structure 10.

Figure 7:
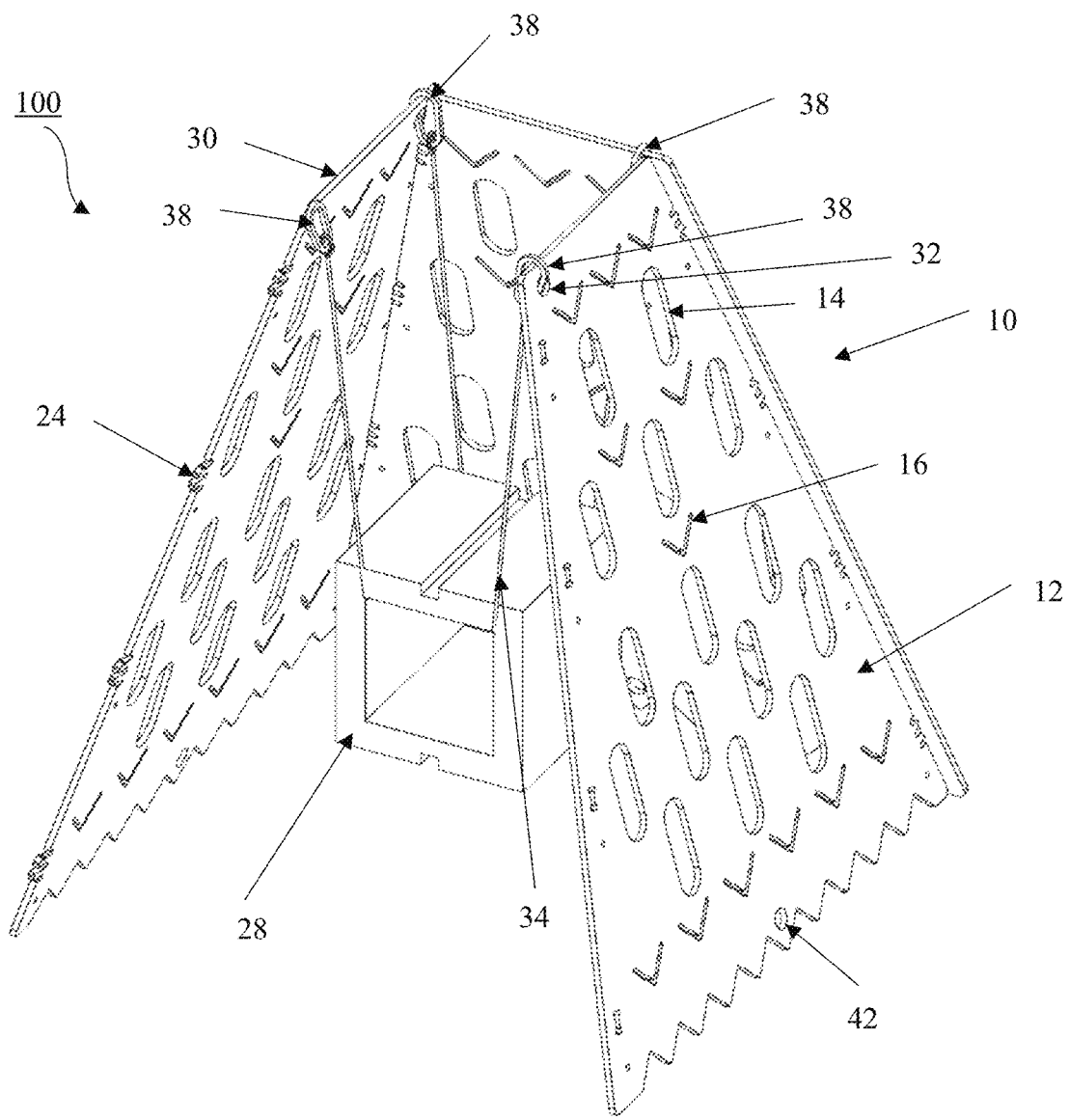
FIG. 7 is a cutaway view showing the fish attractor and escape habitat system secured to a weighted device according to one embodiment of the present disclosure.

FIG. 7 shows an embodiment of the fish attractor and escape habitat system 100 secured to a weighted device 28. The weighted device 28 allows for the fish attractor and escape habitat system 100 to be deployed into the water and placed on the bottom of the body of water by connecting the base structure 10 to the weighted device 28. In the illustrated embodiment, the weighted device 28 is attached inside of the base structure 10. The weighted device 28 may be any type of weight sufficient to allow the fish attractor and escape habitat system 100 to sink within the water. For example, as shown in FIG. 7, the weighted device 28 may be a half cinder block. In another embodiment, the weighted device 28 may be a full cinder block. In still another embodiment, the weighted device 28 may be a brick or a paver, for example, a 20.32 cm (8-inch) paver, a 30.48 cm (12-inch) paver, or a 40.64 cm (16-inch paver). As shown in FIG. 7, four holes 32 are formed in the side walls 12 along an upper edge 30 of the base structure 10. The holes 32 serve as an attachment point for a cable 34 to connect the base structure 10 to the weighted device 28.

Figure 8:
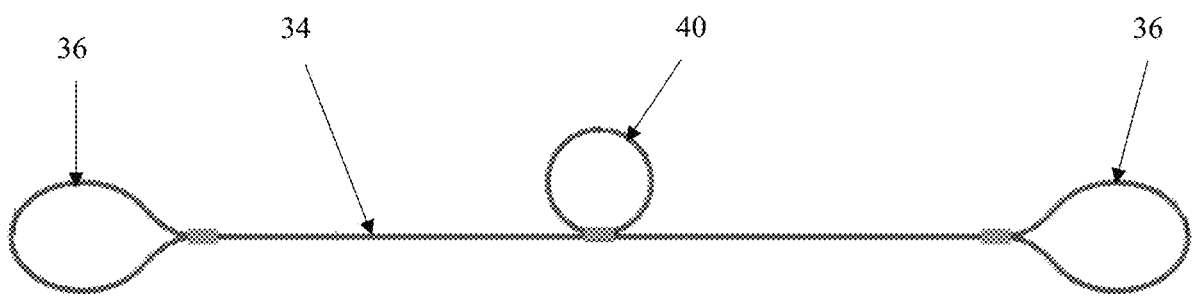
FIG. 8 is a perspective view of an exemplary cable used to secure the weighted device to the fish attractor and escape habitat system according to one embodiment of the present disclosure.

FIG. 8 shows an embodiment of the cable 34 that may be used to connect the base structure 10 to the weighted device 28. The cable 34 includes two loops 36 on each end and a center loop 40. As shown in FIG. 7, each loop 36 may be attached to a clip 38 (such as a carabiner clip), while the center loop 40 can be secured to the weighted device 28. Once the cable 34 is adequately secured to the weighted device 28, the clips 38 can attach to the holes 32 on the base structure 10 to secure the base structure 10 to the weighted device 28. In the illustrated embodiment of FIG. 7, two cables 34 are used such that four clips 38 are attached to each of the four holes 32 formed in the side walls 12. Any number of cables 34 and clips 38 may be used depending on the weight of the base structure 10 and the weighted device 28. The cable 34 may be formed of any material that is sufficiently durable to support the weighted device 28 and is rust-proof, corrosion-resistant, and wear-resistant since the cable 34 will be exposed to the aquatic environment. In some embodiments, the cable 34 is a stainless or galvanized steel cable. For example, the cable 34 may be formed of stainless-steel with a 7×7 strand construction. The cable 34 should have a breaking strength of at least 136.08 kg (300 pounds), preferably at least 181.44 kg (400 pounds), and more preferably at least 226.80 kg (500 pounds). While the cable 34 has been shown herein as an exemplary attachment mechanism, other securing means having sufficient strength to connect the base structure 10 to the weighted device 28 may be used, such as a rope, strap, or bungee cord.

While the weighted device 28 has been exemplified herein as being secured to the base structure 10 with the cable 34 and the clips 38, the weighted device 28 may be secured to the base structure 10 by other mechanisms. For instance, the base structure 10 may include an interior compartment designed to receive and store the weighted device 28. The compartment may also be filled with a substance like gravel or sand to provide sufficient weight for the system 100 to sink. In other embodiments, a molded area may be formed within the interior of the base structure 10 where the weighted device 28 may be attached by snapping into place. In still other embodiments, the base structure 10 may be formed such that it fits over the weighted device 28 and snapped or locked into place so that it is securely fastened to the weighted device 28.

Figure 9:
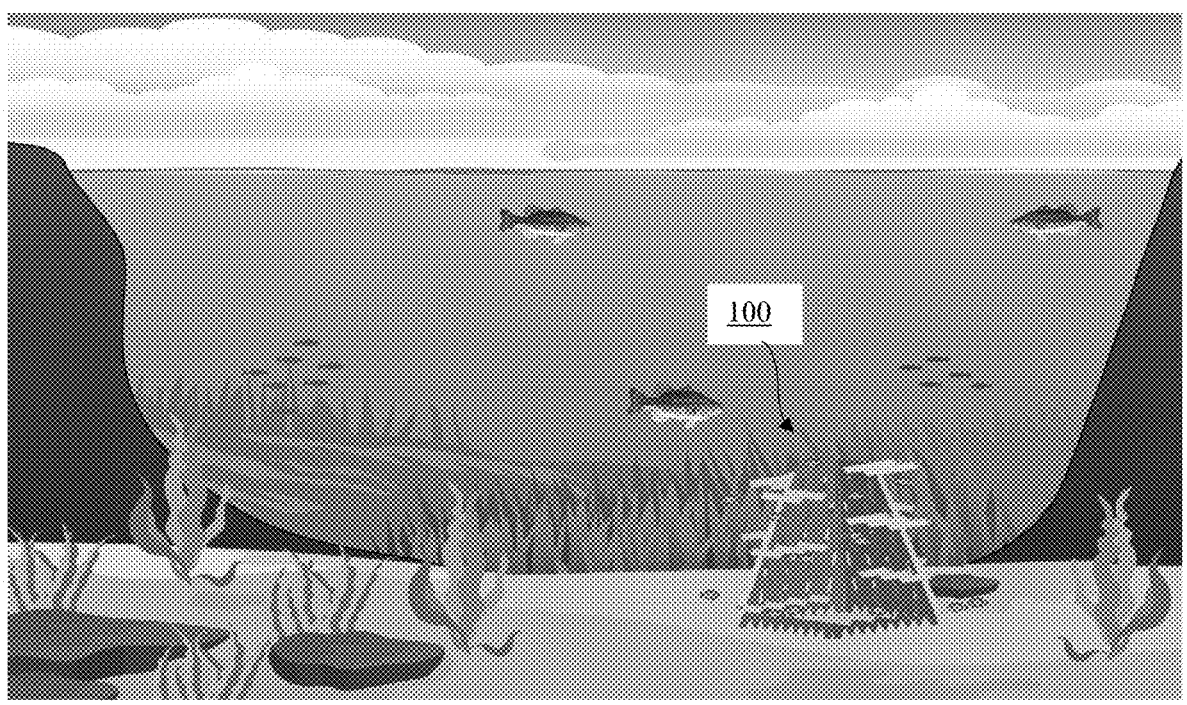
FIG. 9 shows the fish attractor and escape habitat system anchored in a body of water according to one embodiment of the present disclosure.

FIG. 9 shows the fish attractor and escape habitat system 100 secured to the weighted device 28 and positioned on the bottom floor of a body of water. As shown in FIG. 9, the weighted device 28 secured inside of the base structure 10 allows for the system 100 to be anchored on the bottom. In some embodiments, if the base structure 10 is made of sufficiently heavy material, the base structure 10 may not need separate weighting in order to be anchored. For example, the base structure 10 may be made of a cast metal, such as aluminum, magnesium, copper, tin, zinc, lead, iron or steel, ceramic, or other weighted materials such that the base structure 10 itself is weighted, so that it can sink within the body of water without the use of the weighted device 28. In this embodiment, the base structure 10 should have a sufficient weight to sink within the body of water. For example, the base structure 10 should weigh at least 2.27 kg (5 pounds) or greater. In other embodiments, the base structure 10 should weigh at least 4.54 kg (10 pounds) or greater. In still other embodiments, the base structure may weigh over 6.80 kg (15 pounds).

Figure 10:
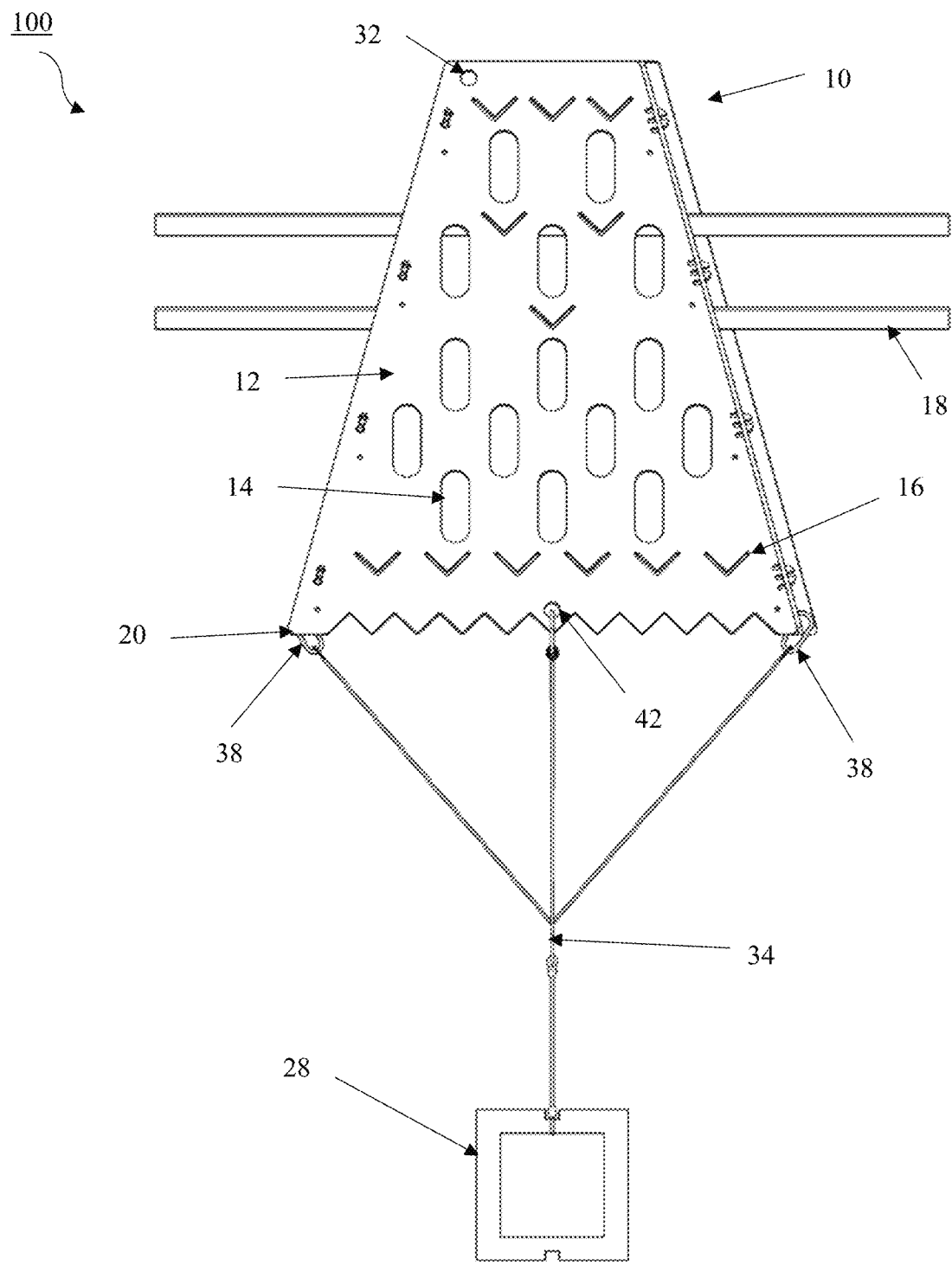
FIG. 10 is a front view of the fish attractor and escape habitat system secured to the weighted device according to another embodiment of the present disclosure.
Figure 11:
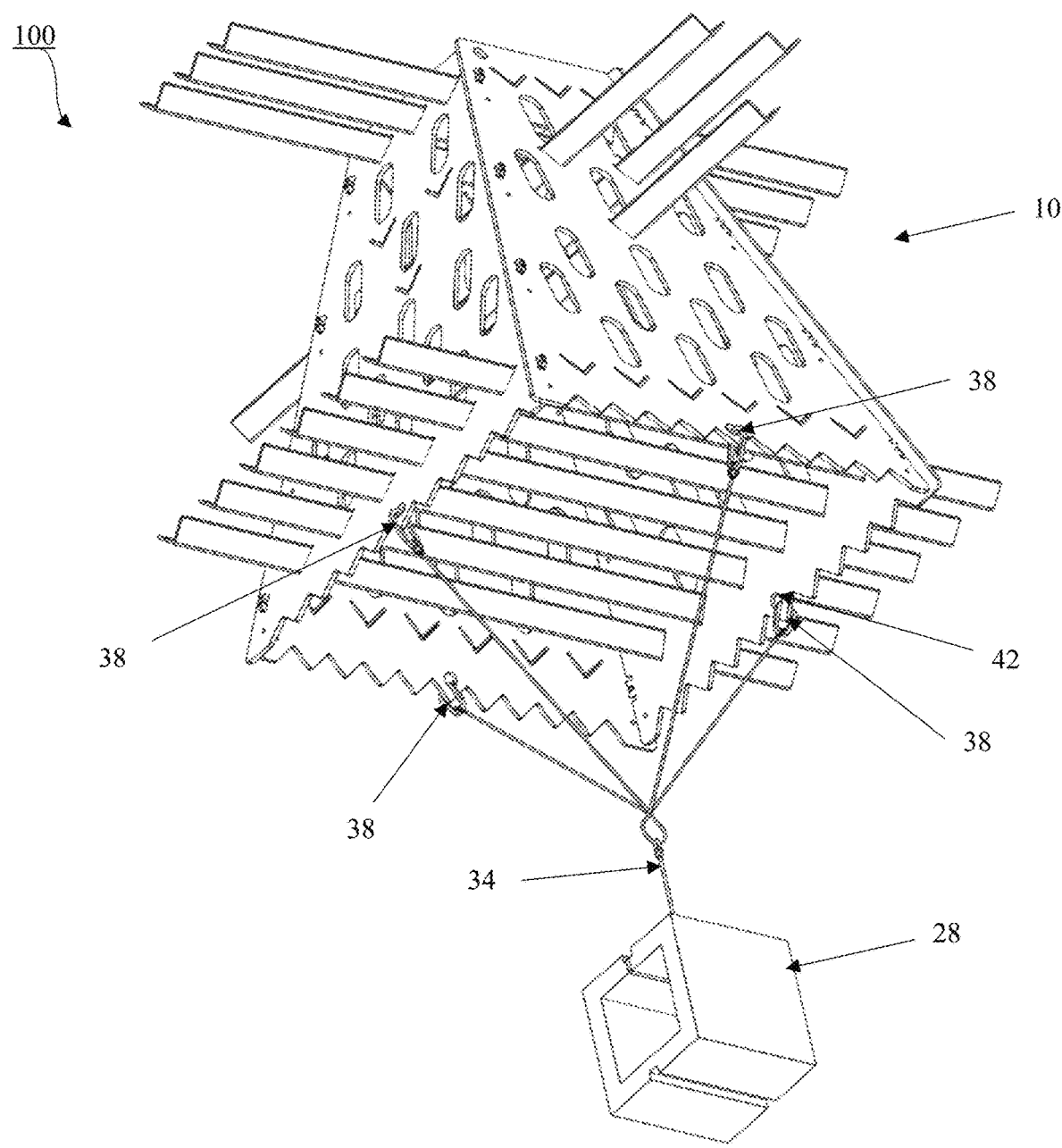
FIG. 11 is a lower perspective view of the fish attractor and escape habitat shown in FIG. 10.

FIGS. 10 and 11 show the fish attractor and escape habitat system 100 secured to the weighted device 28 according to another embodiment of the present disclosure. As shown in FIGS. 10 and 11, the base structure 10 is tethered to the weighted device 28 using the cable 34 and the clips 38, as described above. However, in this embodiment, the clips 38 are secured to holes 42 along the bottom edges 20 of the side walls 12. In the illustrated embodiment, four clips 38 are used to secure the cable 34 to each of the four holes 42 along the bottom edges 20 (as shown in FIG. 11). This allows for the base structure 10 to be tethered to the weighted device 28 such that the base structure 10 is able to float above the weighted device 28 while it is anchored to the bottom of the body of water.

Figure 12:
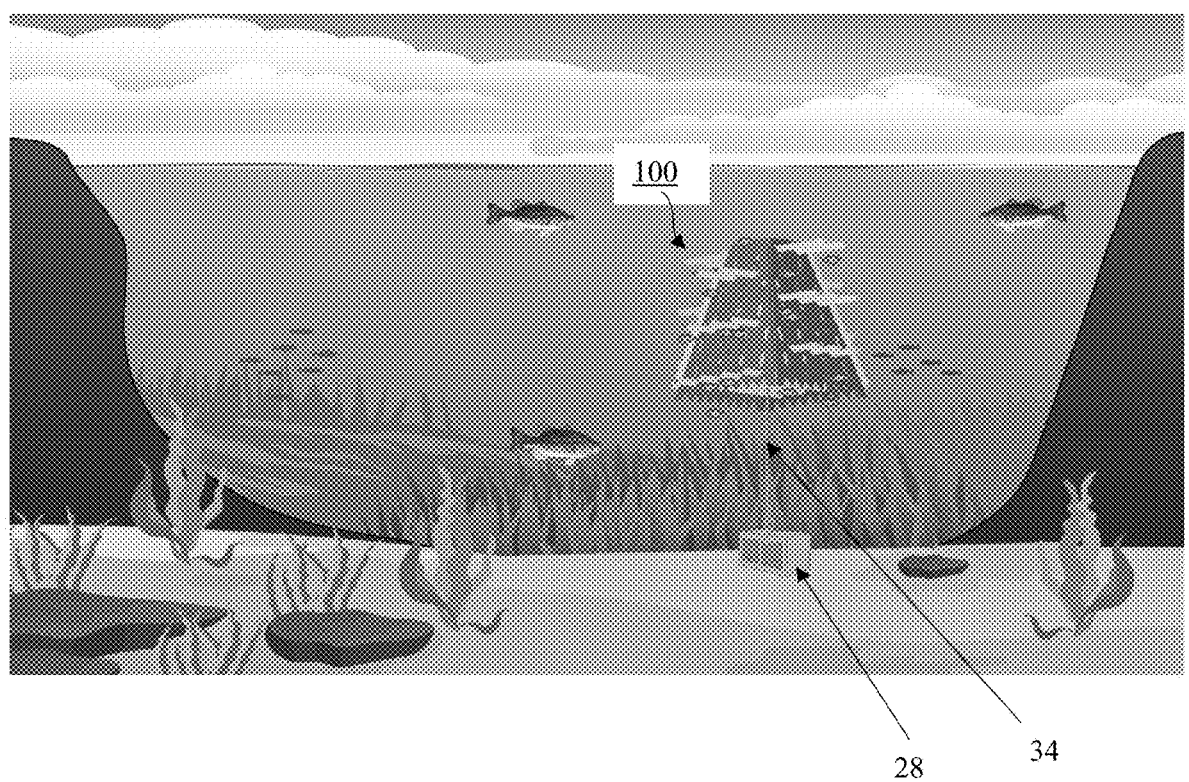
FIG. 12 shows the fish attractor and escape habitat system anchored in the body of water according to another embodiment of the present disclosure.

FIG. 12 shows the fish attractor and escape habitat system 100 secured to the weighted device 28 and floating in the body of water. As shown in FIG. 12, the base structure 10 is suspended under water when tethered to the weighted device 28 that is anchored to the bottom of the body of water. This allows for the system 100 to be placed in ideal levels of the water that are highest in oxygen. For example, the base structure 10 may be tethered to the weighted device 28 at a length that allows for the base structure 10 to be placed at a depth of about 2.44 m (8 feet) below the surface, preferably about 1.22 m (4 feet) below the surface, and more preferably about 0.61 m (2 feet) below the surface.

Figure 13:
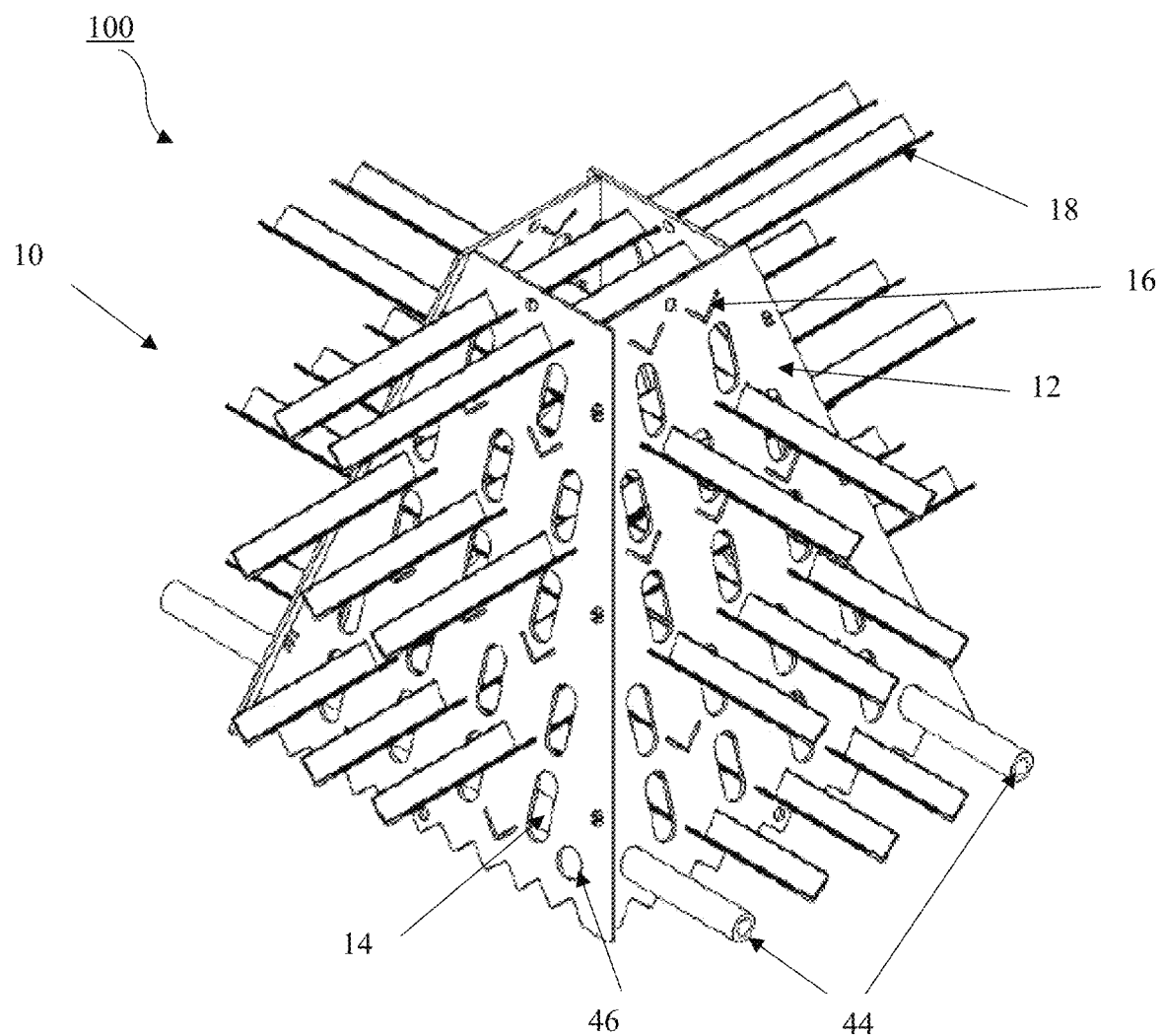
FIG. 13 is a front perspective view of the fish attractor and escape habitat system according to still another embodiment of the present disclosure.
Figure 14A:
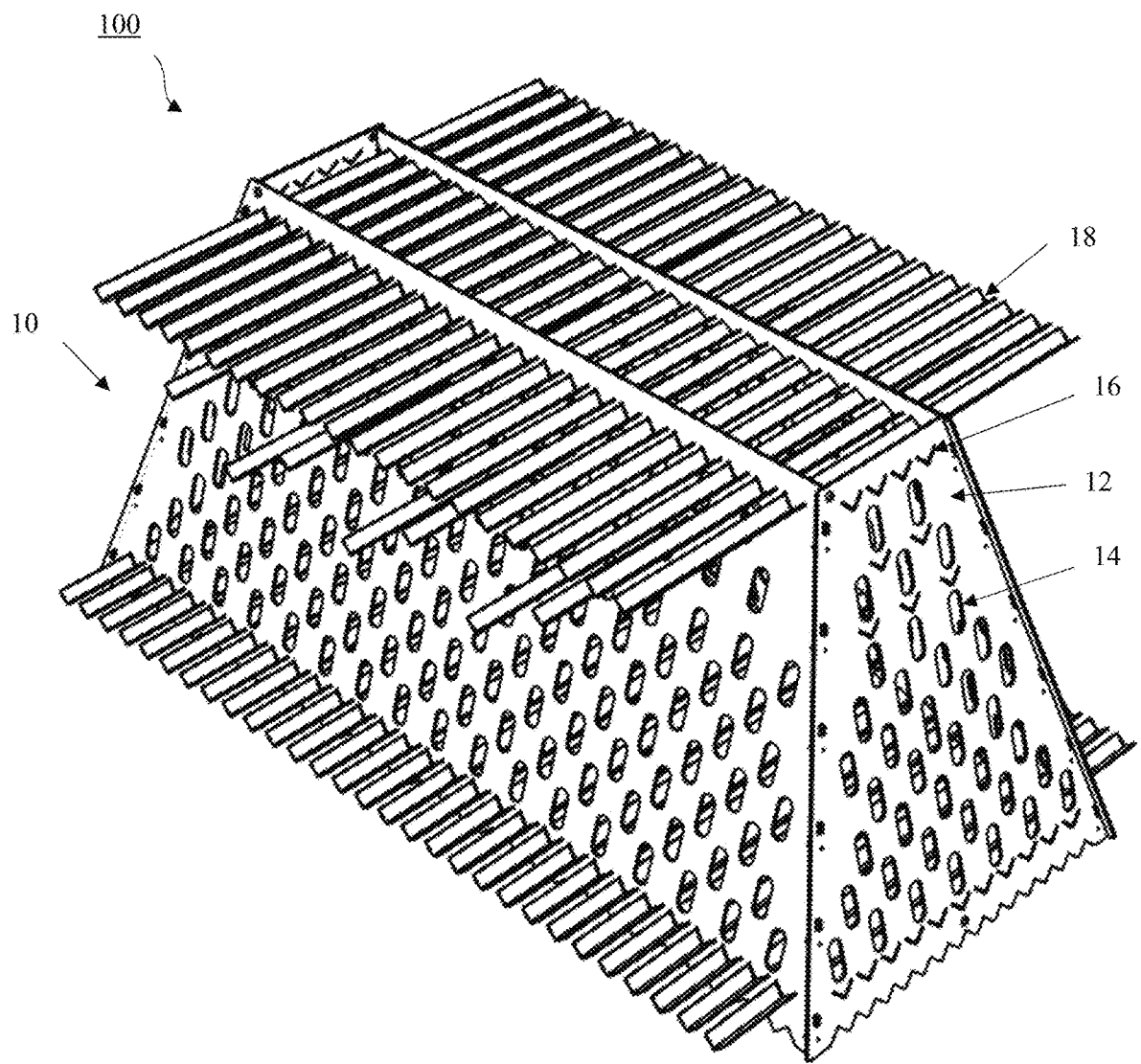
FIG. 14A is an upper perspective view of the fish attractor and escape habitat system according to another embodiment of the present disclosure.
Figure 14B:
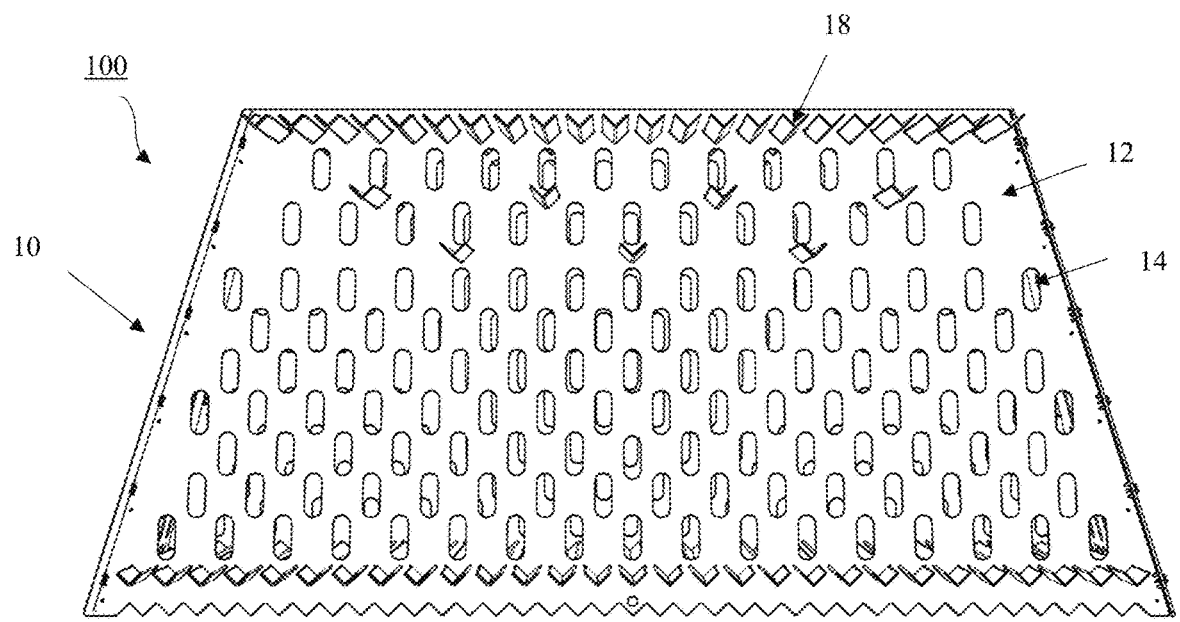
FIG. 14B is a front view of the fish attractor and escape habitat system shown in FIG. 14A.
Figure 14C:
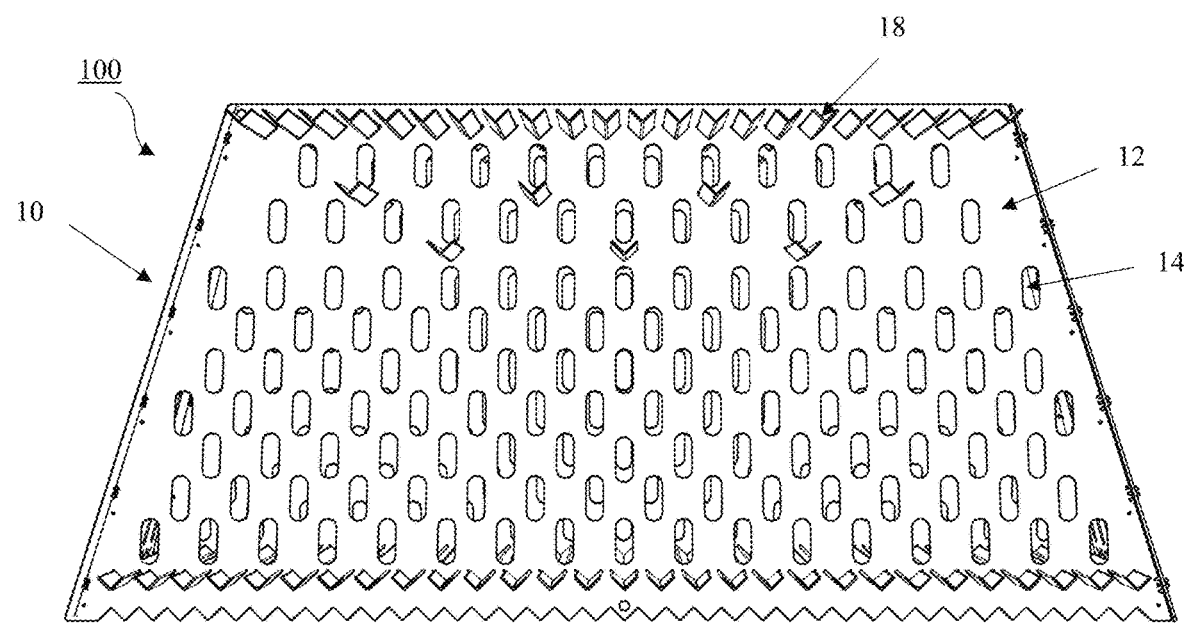
FIG. 14C is a rear view of the fish attractor and escape habitat system shown in FIG. 14A.
Figure 14D:
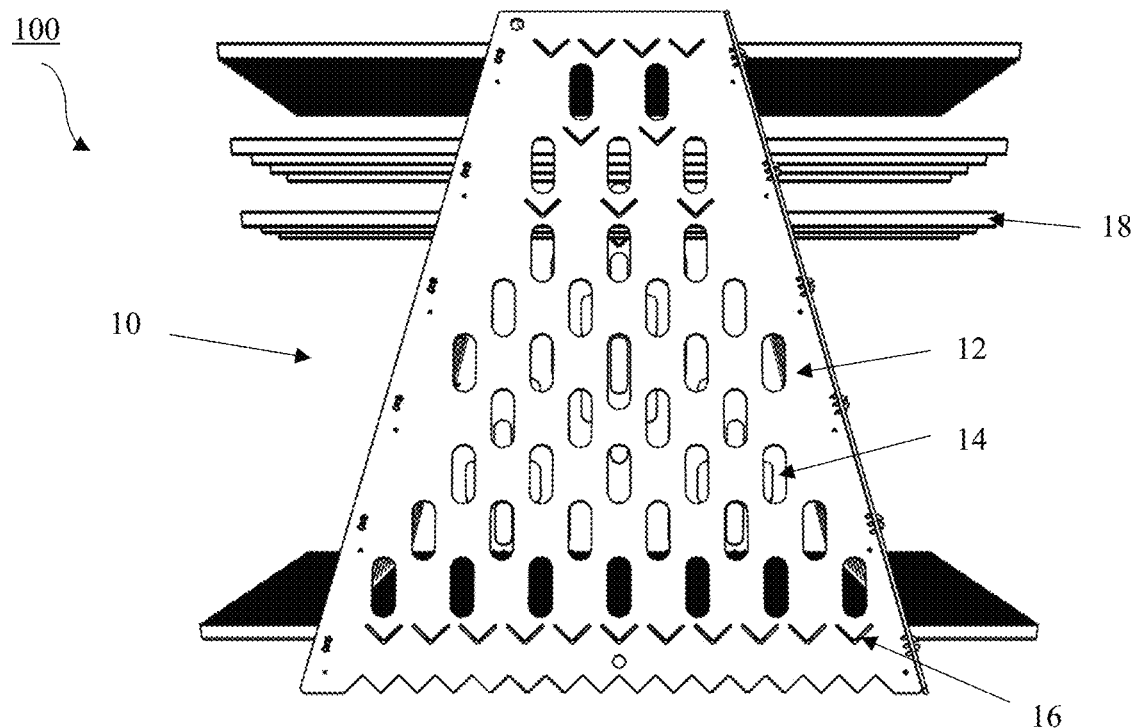
FIG. 14D is a first side view of the fish attractor and escape habitat system shown in FIG. 14A.
Figure 14E:
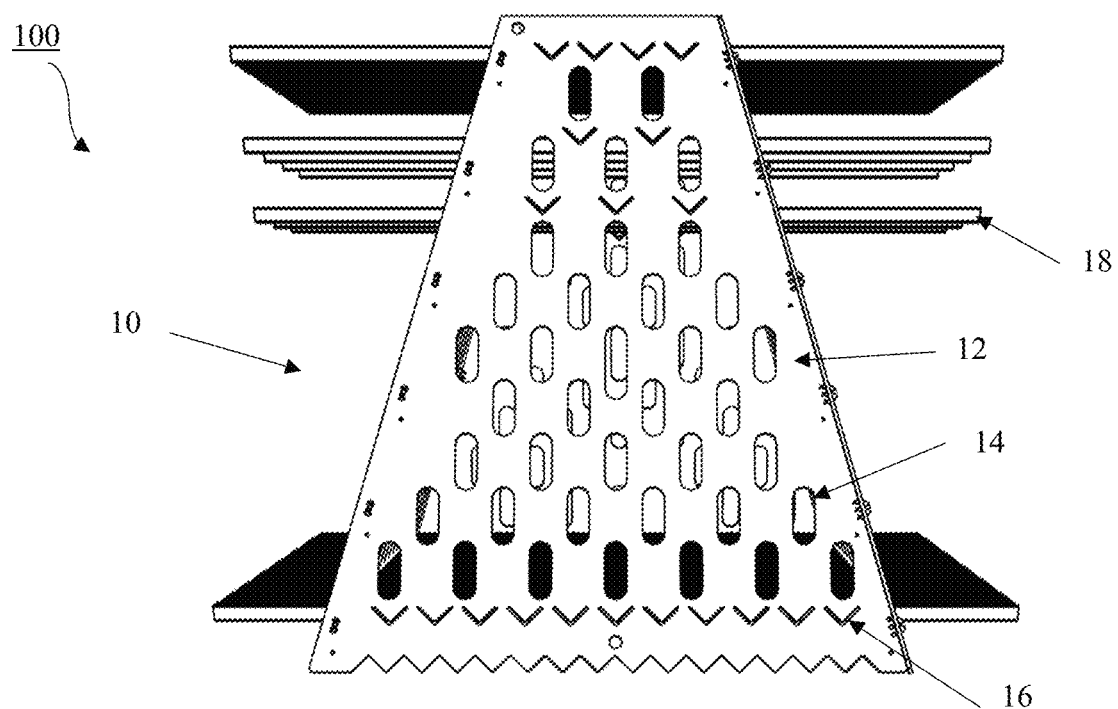
FIG. 14E is a second side view of the fish attractor and escape habitat system shown in FIG. 14A.
Figure 14F:
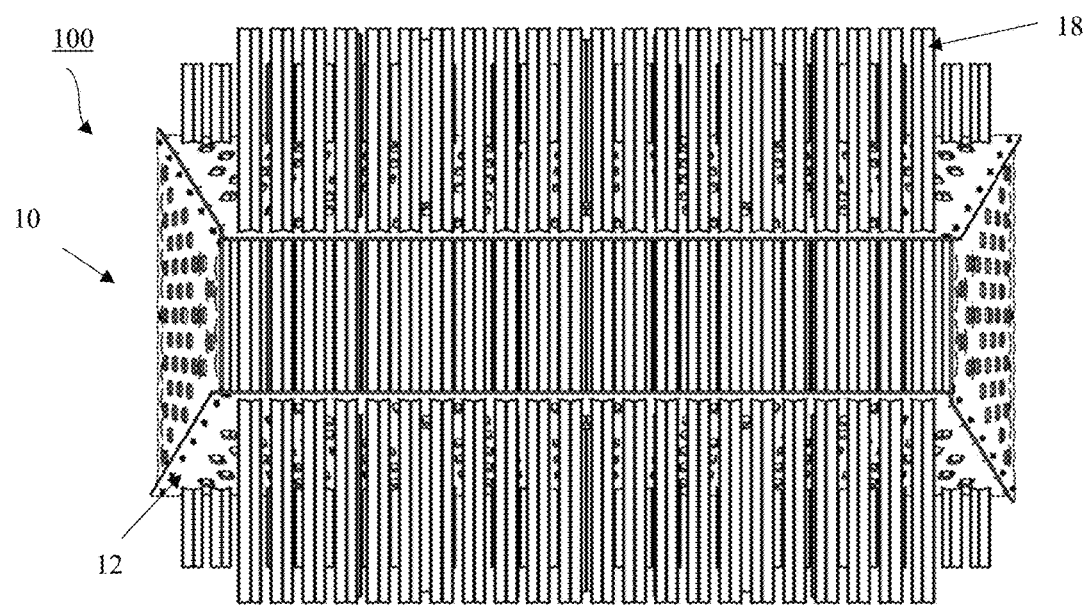
FIG. 14F is a top view of the fish attractor and escape habitat system shown in FIG. 14A.
Figure 14G:
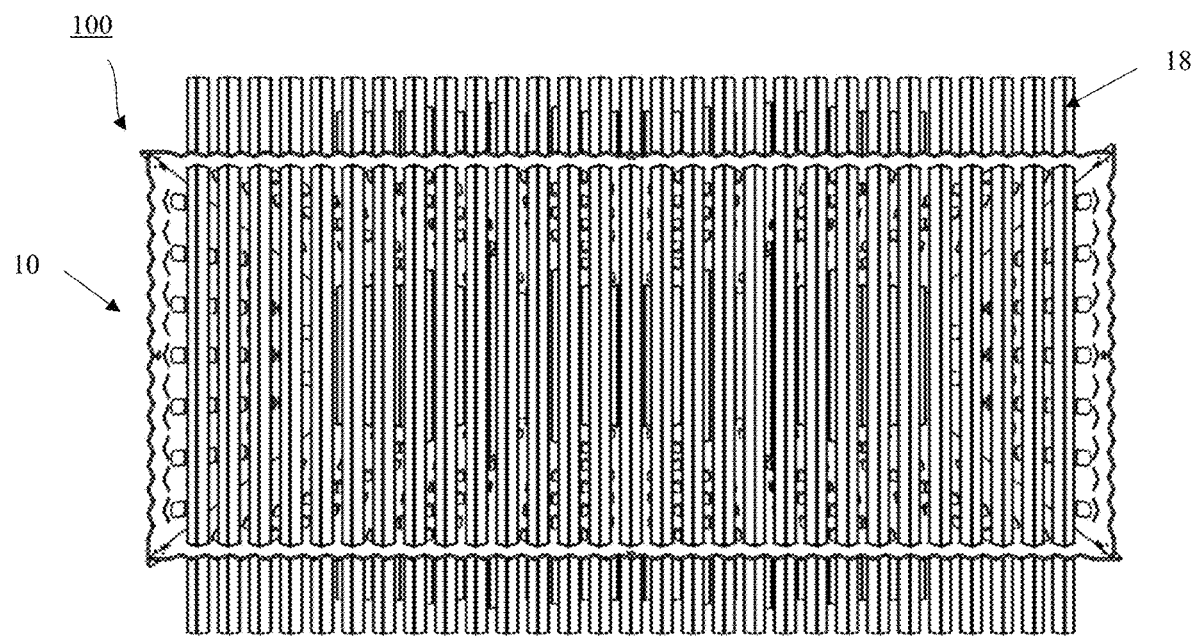
FIG. 14G is a bottom view of the fish attractor and escape habitat system shown in FIG. 14A.

FIG. 13 shows another embodiment of the fish attractor and escape habitat system 100. As an alternative to using the weighted device 28 in the base structure 10 (for those embodiments designed to rest on the bottom of the body of water), the base structure 10 can be configured to receive weighted devices that are designed to provide structure and weight to the base structure 10. As shown in FIG. 13, one or more of the brace slots 16 and the corresponding braces 18 can be replaced with one or more holes 46 configured to receive a pipe 44. Two pipes 44 are shown on the bottom row of the side wall 12, on opposite sides of the side wall 12, with a rounded cross section. The pipe 44 can be made of heavier material, have thicker side walls, or be solid cross-sectioned devices so that adequate weight is added to the base structure 10 to secure it in place (when anchored on the bottom of the body of water). In one embodiment, the pipe 44 is made of polyvinyl chloride (PVC) that can be filled by a user with a weighted material, such as sand, gravel, or concrete, for extra weight and sealed (if needed) at the end. In some embodiments, the holes 46 configured to receive the pipe 44 may be sized to receive an approximately 5.08 cm (2-inch) PVC pipe, 3.81 cm (1½ inch) PVC Pipe, 3.175 cm (1¼ inch) PVC Pipe, or 2.54 cm (1-inch) PVC Pipe. In one preferred embodiment, industrial grade black PVC pipe can be provided or used with the system 100, which will promote algae growth. While FIG. 13 shows the use of the pipes 44 only on the outside of the bottom row of the side wall 12, the pipes 44 and the corresponding holes 46 may be used anywhere on the base structure 10. The pipes 44 and the corresponding holes 46 can also have multiple different cross sections, and circular pipes (or other configurations, like X-shaped or polygonal cross sections) can be used together or as replacements.

FIGS. 14A-14G show yet another embodiment of the fish attractor and escape habitat system 100. In this embodiment, the base structure 10 has an elongated design that is able to incorporate additional elongated slots 14 and brace slots 16 (and corresponding braces 18). As shown in FIGS. 14A-14G, one or more of the side walls 12 may include as many as 133 elongated slots 14 where the elongated slots 14 are positioned in nine rows having twelve to seventeen elongated slots 14 per row. The one or more side walls 12 may also include as many as 51 brace slots 16 (and corresponding braces 18) along the top and bottom edges and seven brace slots 16 (and corresponding braces 18) within the center portion of the side wall 12. As will be apparent to those of ordinary skill in the art, the number of elongated slots 14 and brace slots 16 can vary (for example, can be increased or decreased) depending on the size of the side walls 12. In some embodiments of the elongated design, the base structure 10 may have a length of at least 1.83 m (six feet). In still other embodiments of the elongated design, the base structure 10 may have a length of at least 2.44 m (eight feet). In yet other embodiments of the elongated design, the base structure 10 may have a length of at least 3.05 m (ten feet).

Figure 15A:
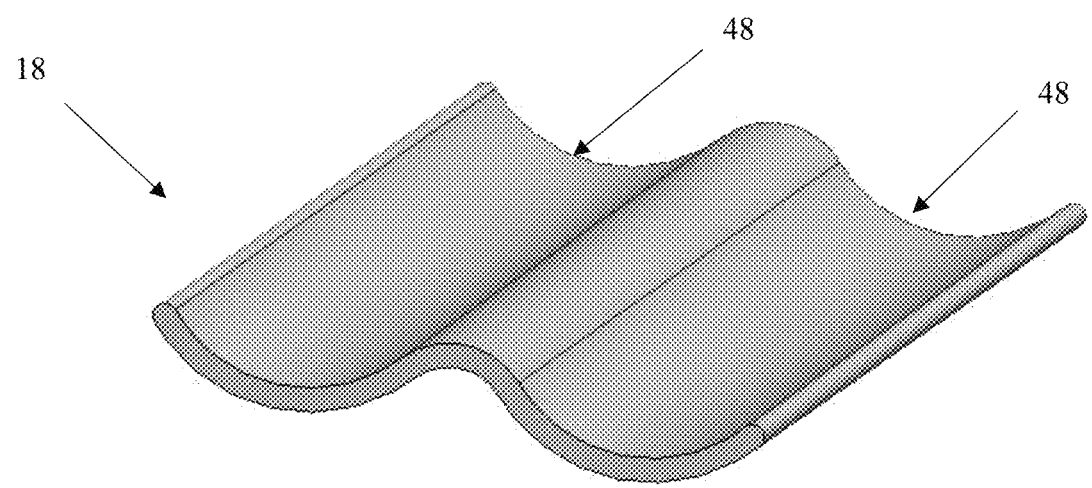
FIG. 15A is a front perspective view of a brace according to another embodiment of the present disclosure.
Figure 15B:
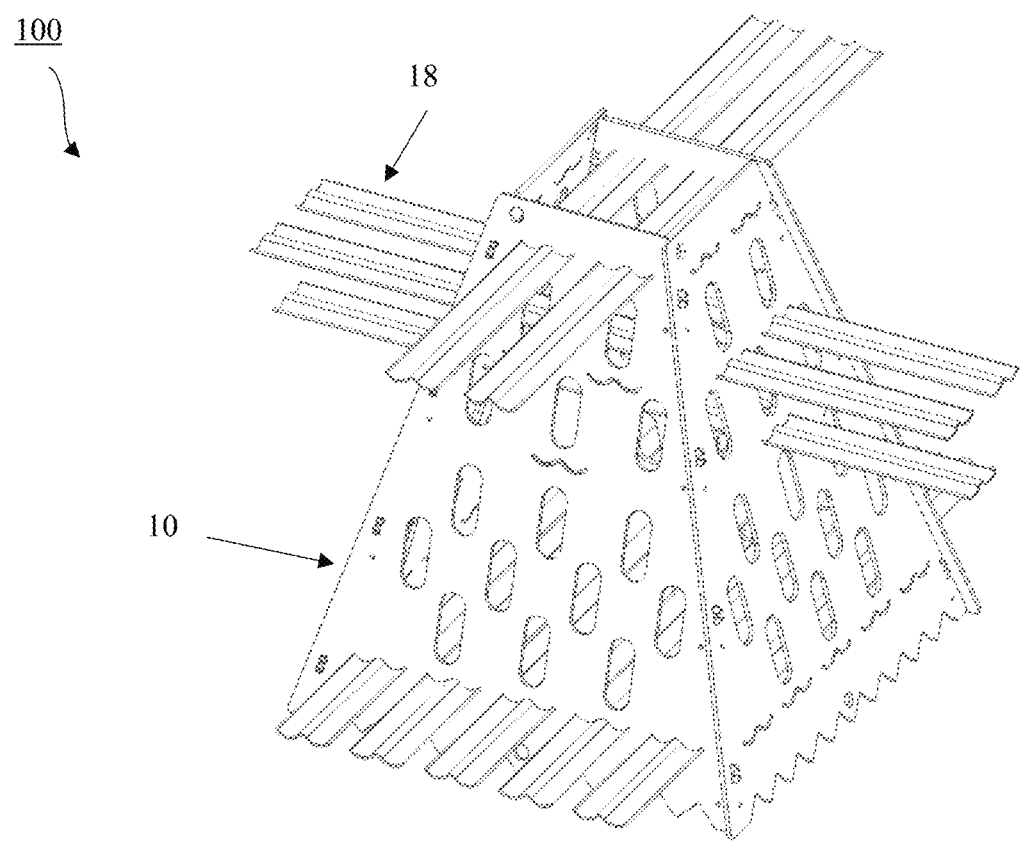
FIG. 15B is an upper perspective view of the brace illustrated in FIG. 15A inserted into the fish attractor and escape habitat system according to one embodiment of the present disclosure.
Figure 15C:
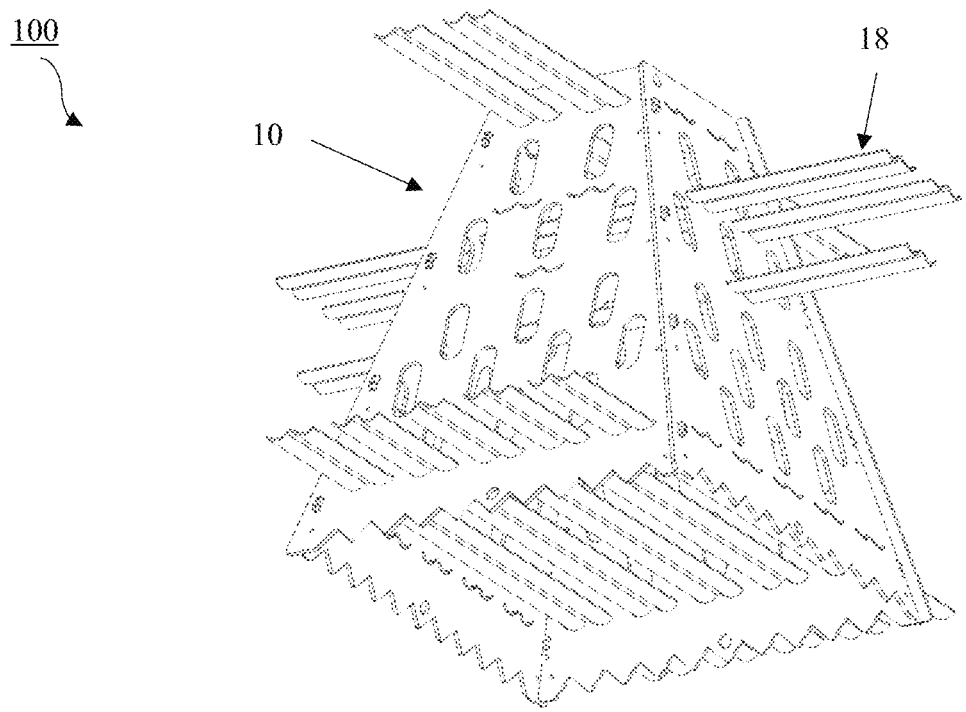
FIG. 15C is a lower perspective view of the fish attractor and escape habitat system shown in FIG. 15B.
Figure 15D:
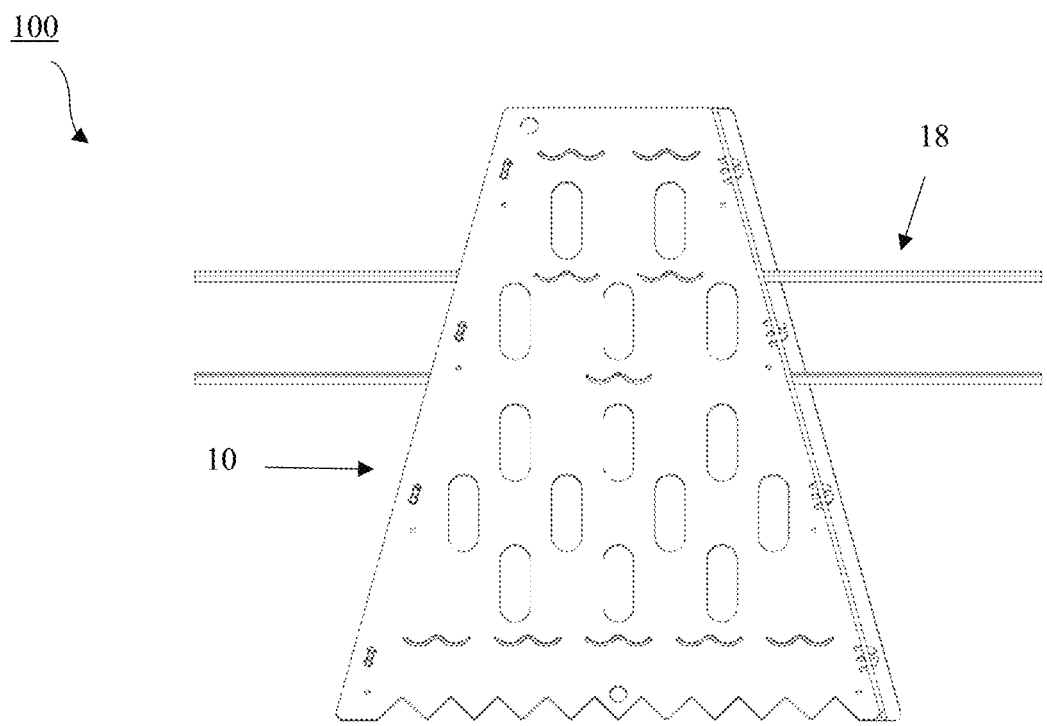
FIG. 15D is a front view of the fish attractor and escape habitat system shown in FIG. 15B.
Figure 15E:
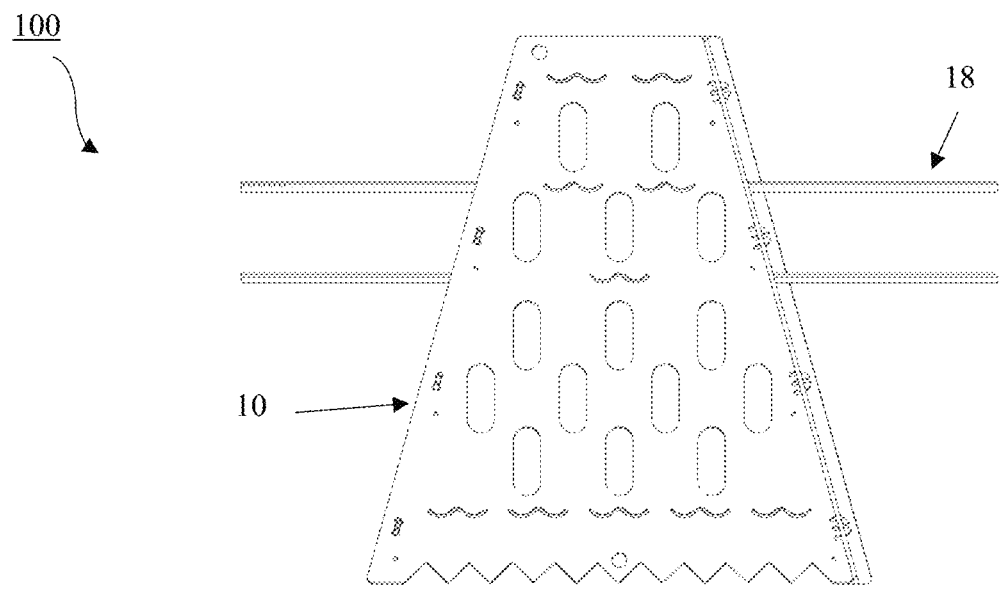
FIG. 15E is a rear view of the fish attractor and escape habitat system shown in FIG. 15B.
Figure 15F:
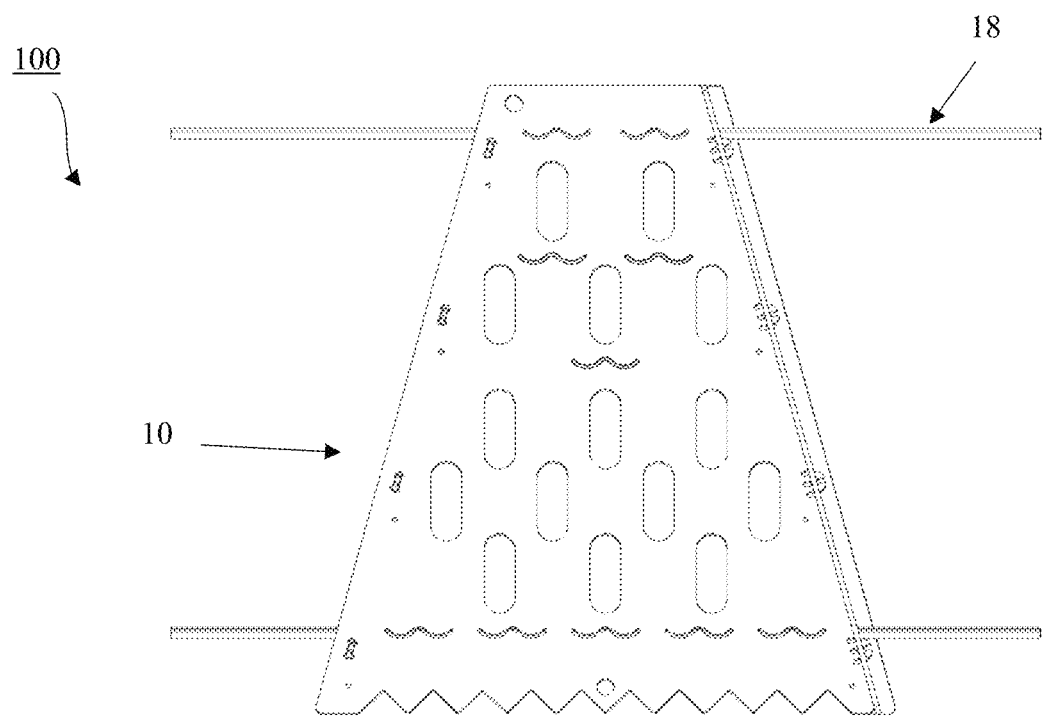
FIG. 15F is a first side view of the fish attractor and escape habitat system shown in FIG. 15B.
Figure 15G:
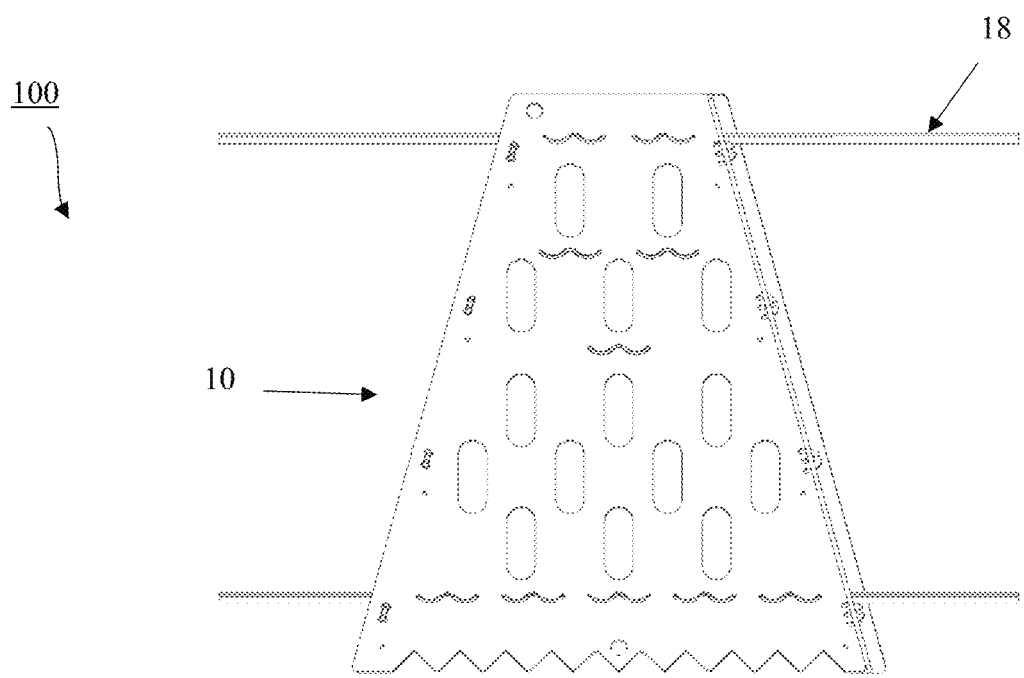
FIG. 15G is a second side view of the fish attractor and escape habitat system shown in FIG. 15B.
Figure 15H:
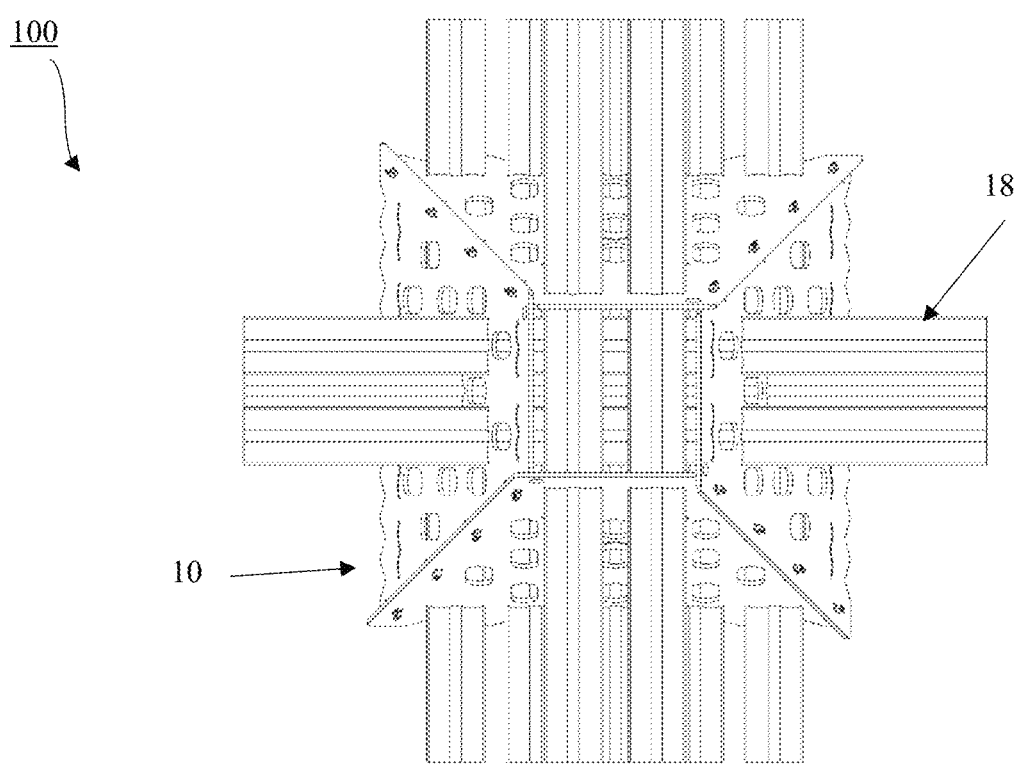
FIG. 15H is a top view of the fish attractor and escape habitat system shown in FIG. 15B.
Figure 15I:
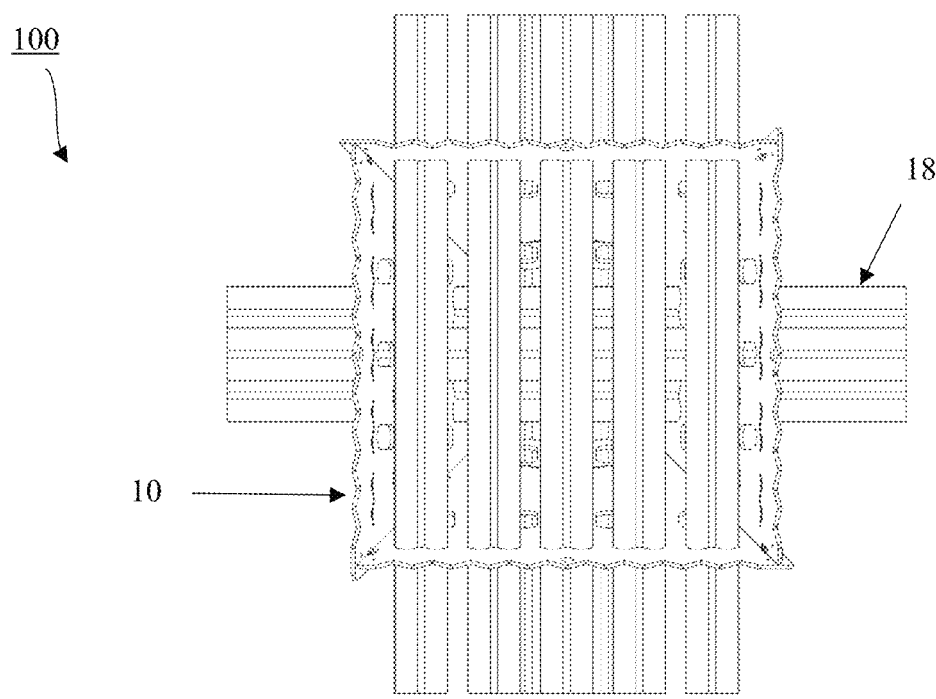
FIG. 15I is a bottom view of the fish attractor and escape habitat system shown in FIG. 15B.
Figure 15J:
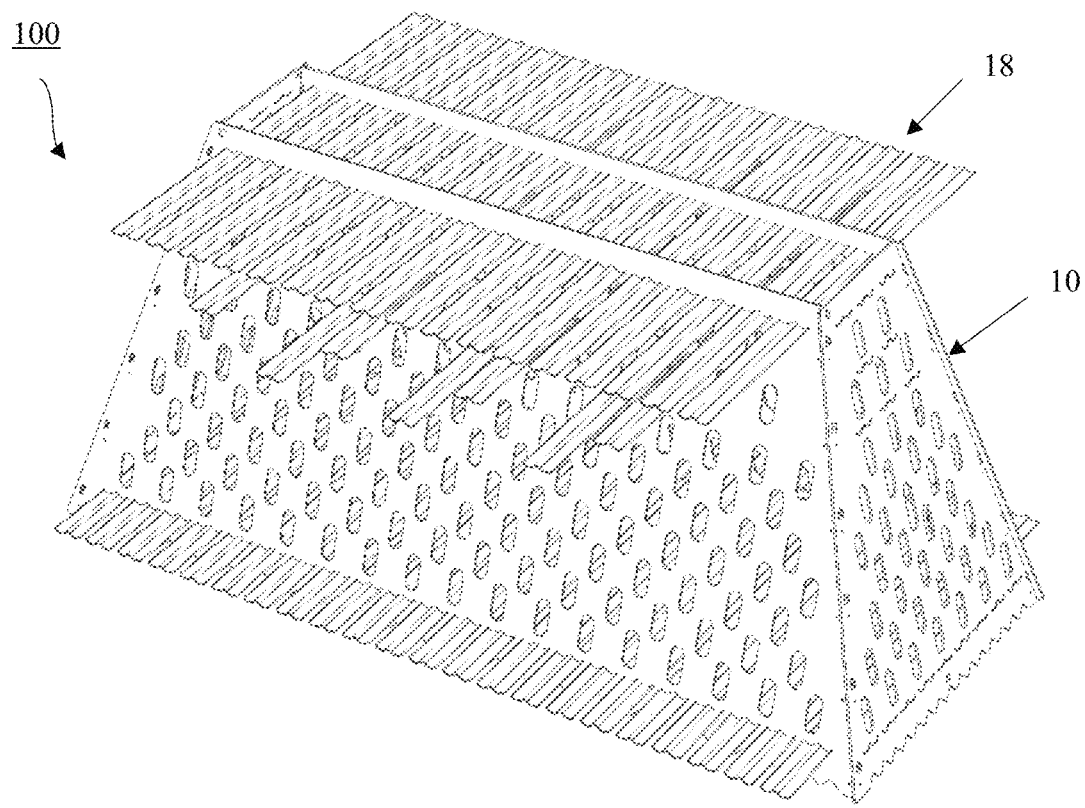
FIG. 15J is an upper perspective view of the brace illustrated in FIG. 15A inserted into the fish attractor and escape habitat system according to another embodiment of the present disclosure.
Figure 15K:
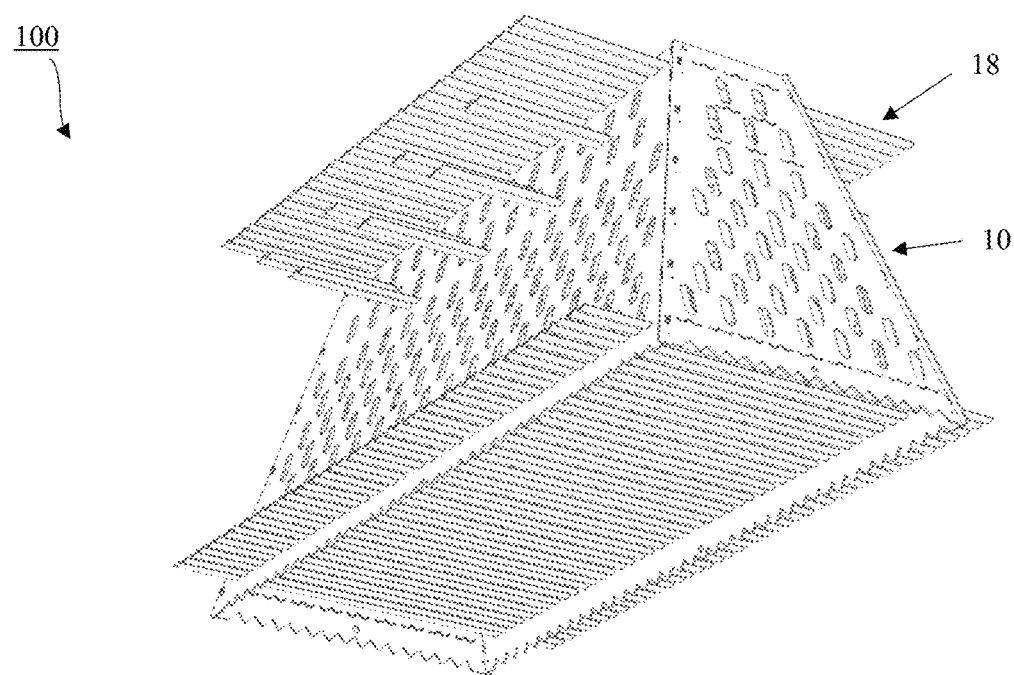
FIG. 15K is a lower perspective view of the fish attractor and escape habitat system shown in FIG. 15J.
Figure 15L:
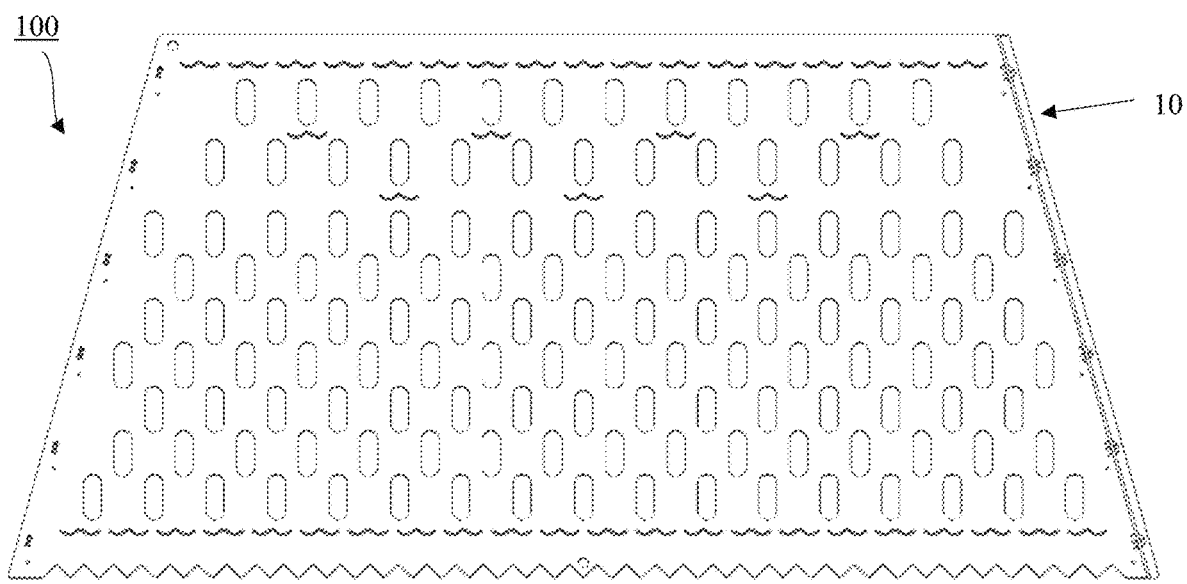
FIG. 15L is a front view of the fish attractor and escape habitat system shown in FIG. 15J.
Figure 15M:
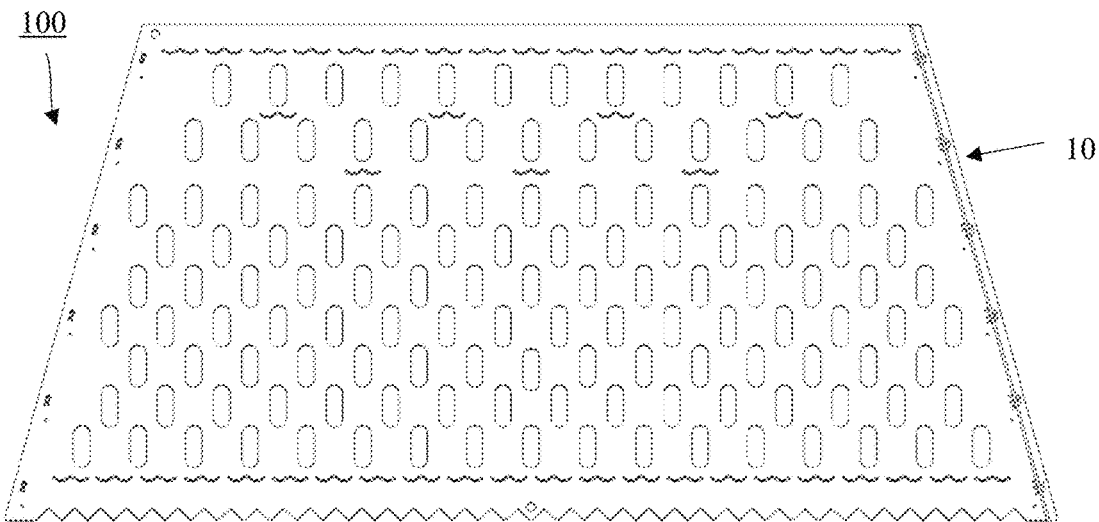
FIG. 15M is a rear view of the fish attractor and escape habitat system shown in FIG. 15J.
Figure 15N:
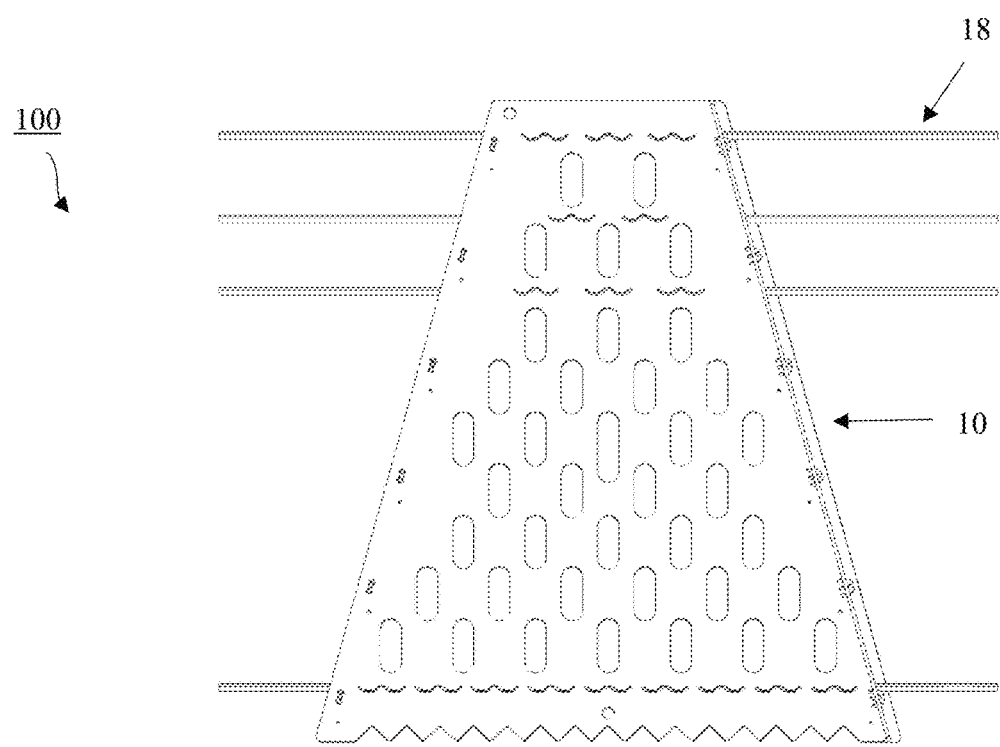
FIG. 15N is a first side view of the fish attractor and escape habitat system shown in FIG. 15J.
Figure 15O:
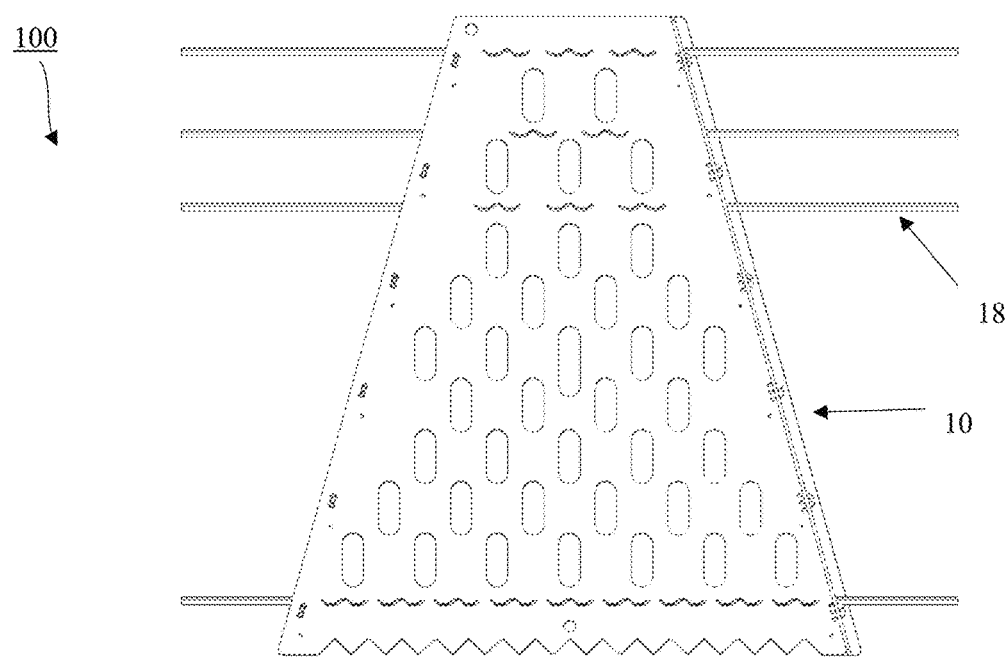
FIG. 15O is a second side view of the fish attractor and escape habitat system shown in FIG. 15J.
Figure 15P:
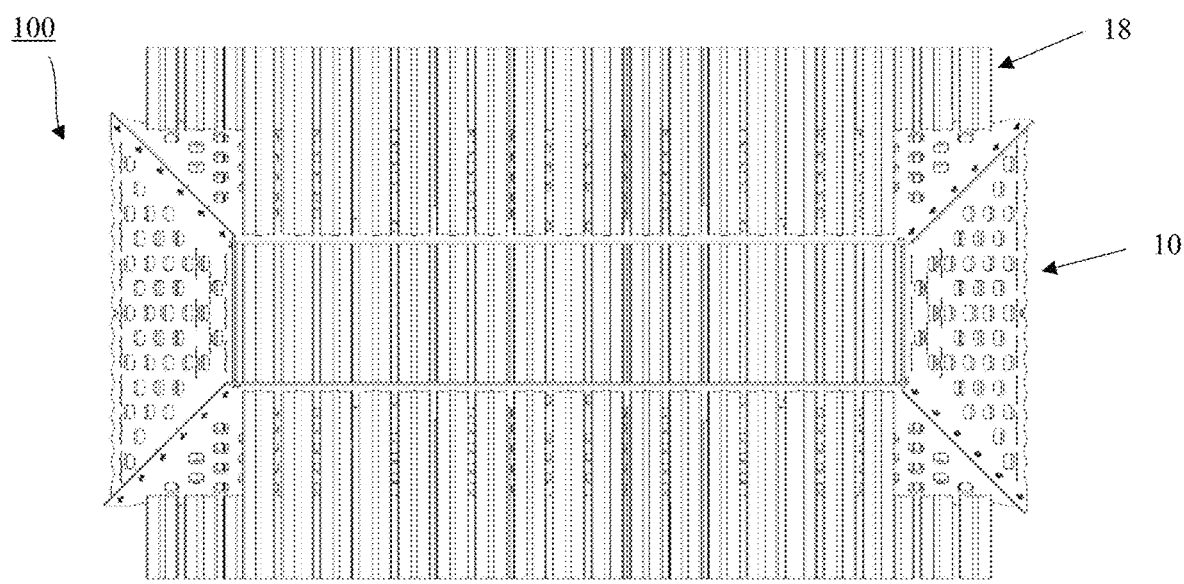
FIG. 15P is a top view of the fish attractor and escape habitat system shown in FIG. 15J.
Figure 15Q:
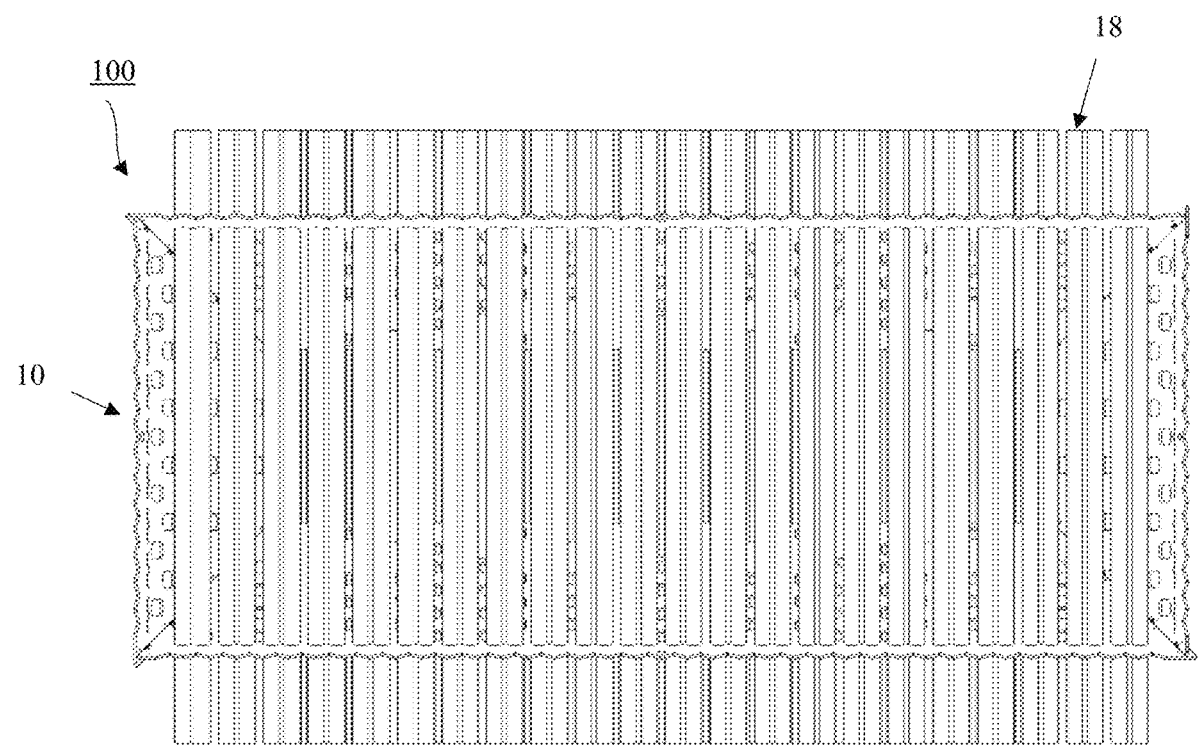
FIG. 15Q is a bottom view of the fish attractor and escape habitat system shown in FIG. 15J.
Figure 16A:
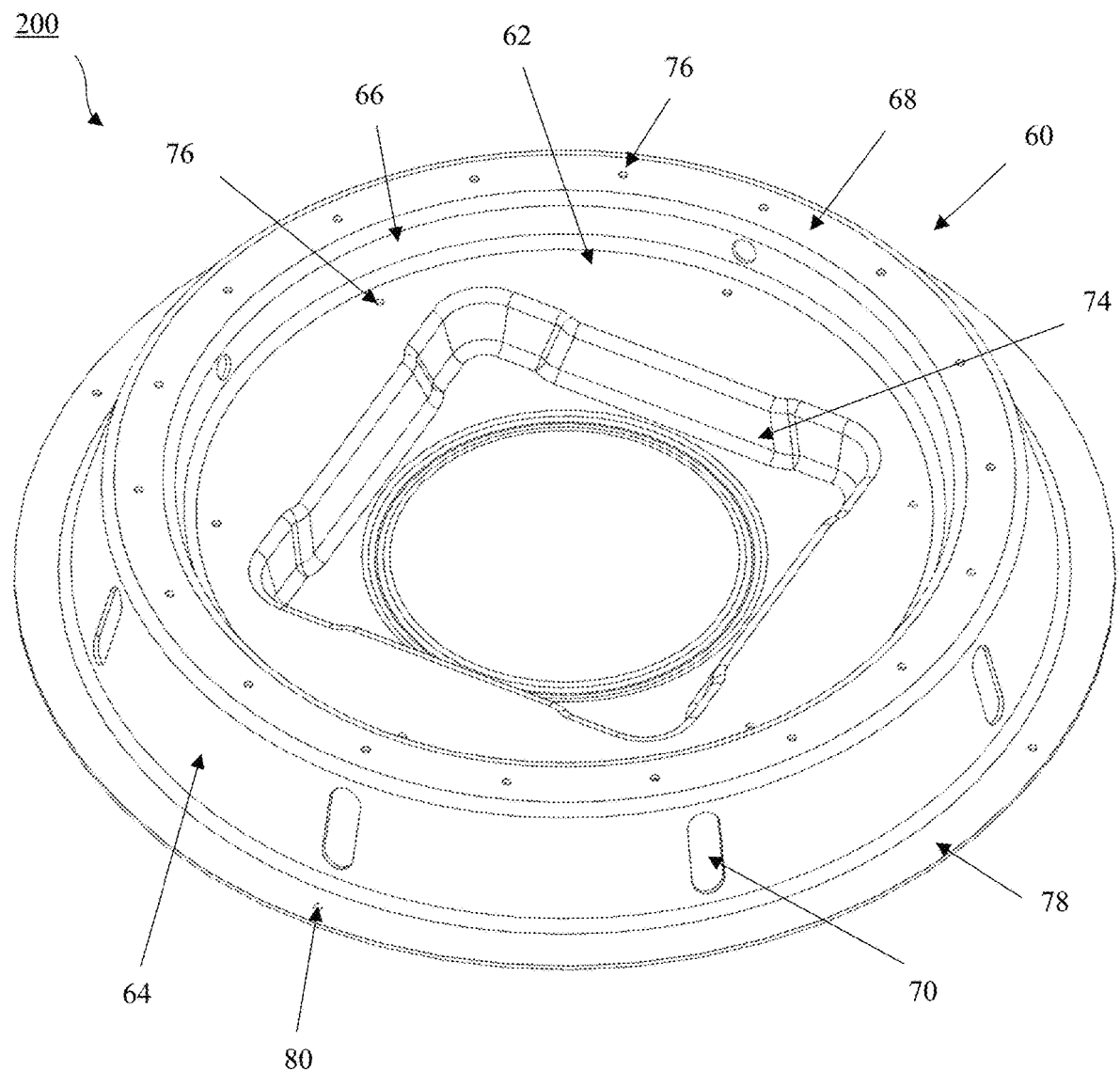
FIG. 16A is an upper perspective view of a spawning device according to an embodiment of the present disclosure.
Figure 16B:
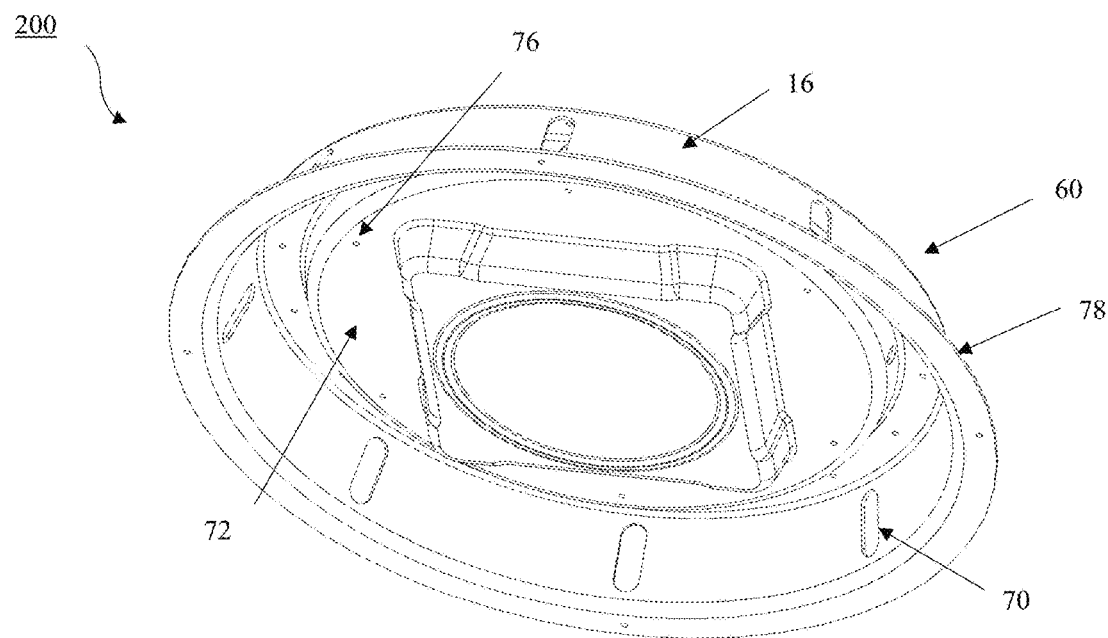
FIG. 16B is a lower perspective view of the spawning device shown in FIG. 16A.
Figure 16C:
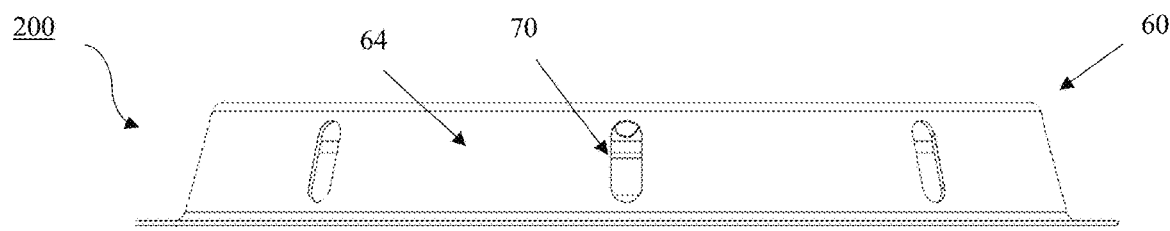
FIG. 16C is a front view of the spawning device shown in FIG. 16A.
Figure 16D:
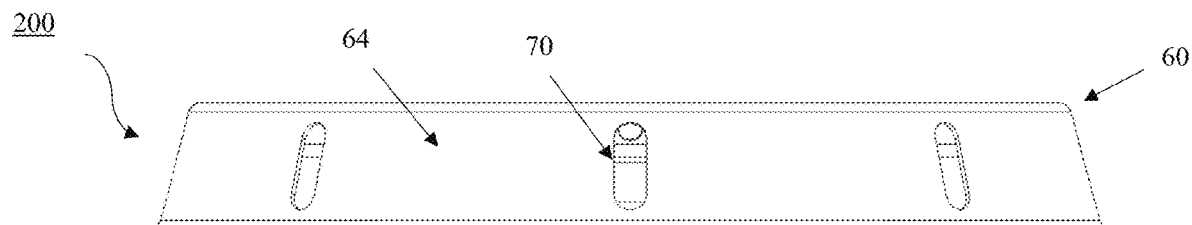
FIG. 16D is a rear view of the spawning device shown in FIG. 16A.
Figure 16E:
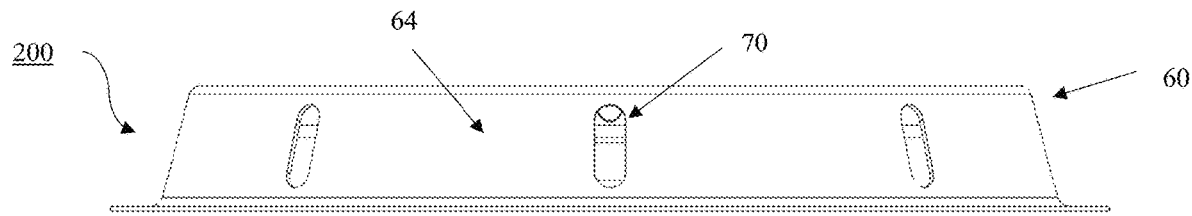
FIG. 16E is a first side view of the spawning device shown in FIG. 16A.
Figure 16F:
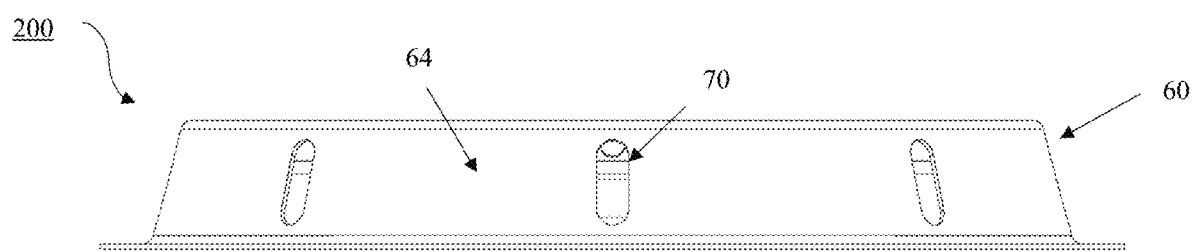
FIG. 16F is a second side view of the spawning device shown in FIG. 16A.
Figure 16G:
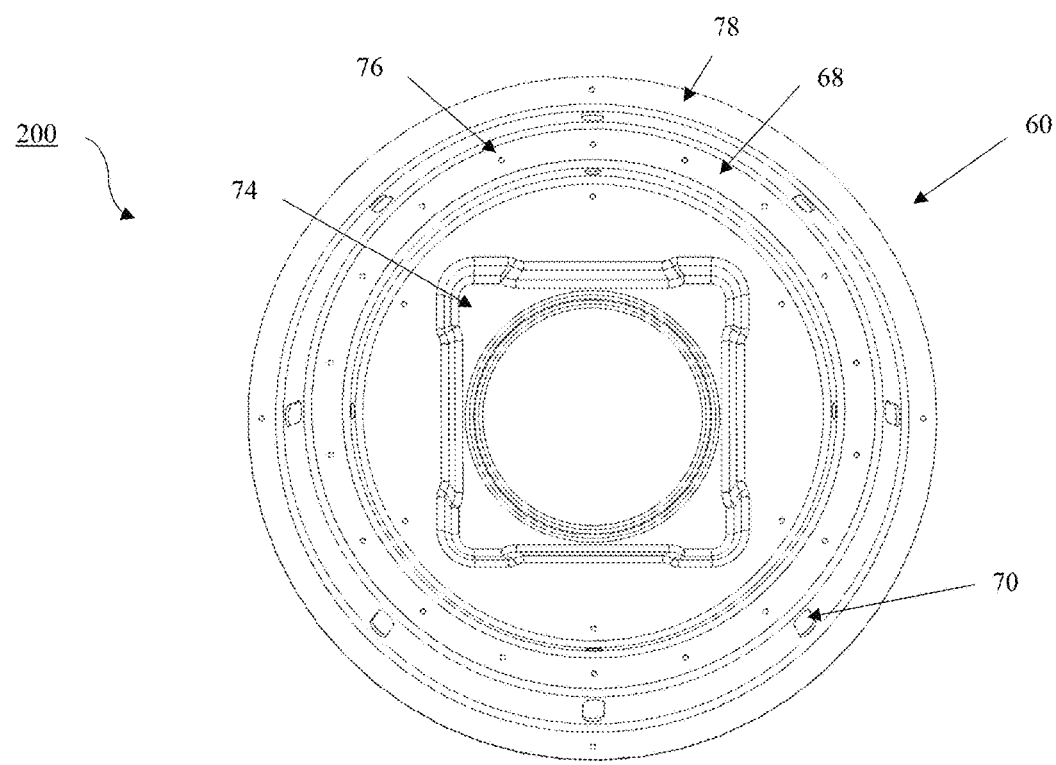
FIG. 16G is a top view of the spawning device shown in FIG. 16A.
Figure 16H:
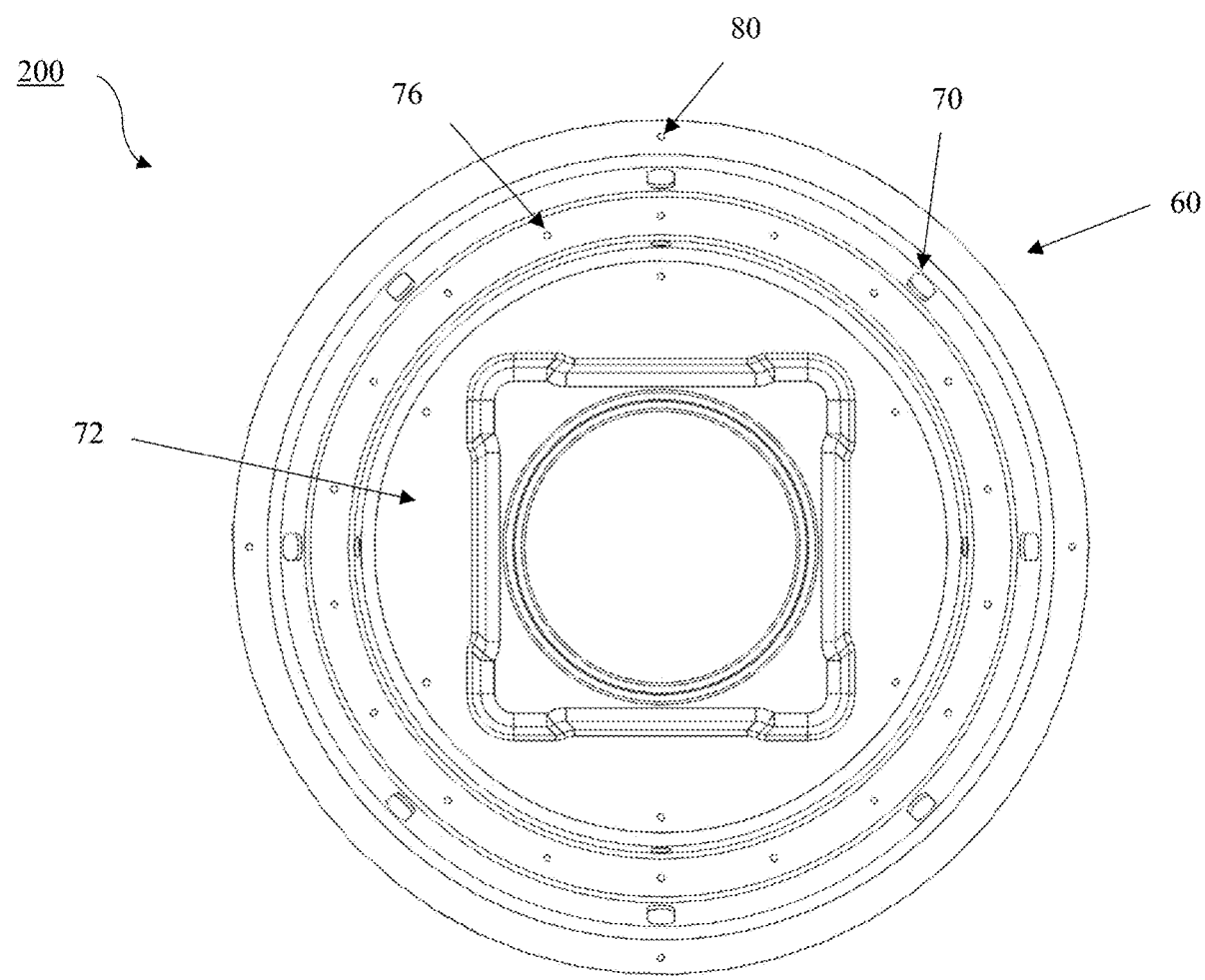
FIG. 16H is a bottom view of the spawning device shown in FIG. 16A.

FIG. 15A shows another embodiment of the brace 18 that may be utilized with the fish attractor and escape habitat system 100. In some embodiments, the brace 18 may be shaped as a wave (rather than the V-shape described above). As illustrated in FIG. 15A, the body of the brace 18 includes two inwardly curved portions 48 that resemble the outline of a wave. FIGS. 15B-15I and 15J-15Q show the brace 18 illustrated in FIG. 15A inserted into brace slots 16 on the regular pyramid and the elongated pyramid embodiments of the fish attractor and escape habitat system. As shown in FIGS. 15B-15Q, the brace slots 16 may be designed to have a shape complementary to the wave-shape of the brace 18 such that the wave-shaped brace 18 may be inserted therein.

Referring to FIGS. 16A-16H, a spawning device 200 according to another embodiment of the present disclosure is shown. The spawning device 200 is designed to enhance and facilitate the spawning of a variety of fish in a body of water. The spawning device 200 provides an area for fish to attach eggs and spawn. The spawning device 200 can also provide an escape area for newly hatched fish to escape predators. Like the fish attractor and escape habitat system 100, the spawning device 200 can be deployed in any body of water, including, for example, in ponds, lakes, rivers, marshes, swamps, and the ocean, and is designed to sit on the bottom of the body of water.

The spawning device 200 includes a base structure 60 having a flat bottom 72, an outer side wall 64, and an inner side wall 66, where the outer and inner side walls 64, 66 extend along the circumference of the base structure 60. The outer side wall 64 and the inner side wall 66 are connected by an upper rim 68. An interior cavity 62 is formed within the base structure 60. The interior cavity 62 may be used to fill the spawning device 200 with natural spawning materials, such as gravel. In the illustrated embodiment, the base structure 60 is shown as a circular or "ring" configuration. However, other sizes and shapes can be used, for example, rectangular, square, oval, diamond, or cylindrical.

The spawning device 200 may have a plurality of elongated slots 70 formed in the outer side wall 64 and along the periphery of the base structure 60 that provide access to a protective area within and under the spawning device 200 for newly hatched fish (fry) from predators. The elongated slots 70 may have a width of about 2.54 cm (1 inch) to about 7.62 (3 inches), preferably about 5.08 cm (2 inches), and more preferably about 2.54 cm (1 inch). The elongated slots 70 may have a length of about 5.08 cm (2 inches) to about 15.24 cm (6 inches), preferably about 7.62 cm (3 inches) to about 12.7 cm (5 inches), and more preferably about 10.16 cm (4 inches). For example, the elongated slots 70 may be about 3.81 cm×10.16 cm (1½"×4"), about 2.54 cm×7.62 cm (1"×3"), or about 5.08 cm×12.7 cm (2"×5") (or any combination thereof). Any other similar sizes that allow smaller fry to enter, but not larger more predatory fish to enter, may be used with the present disclosure. For example, instead of elongated slots, round holes having a diameter of 2.54 cm (1 inch) or 5.08 cm (2 inches) may be used.

The spawning device 200 may also have a plurality of holes 76 formed in the base structure 60 for attaching aquatic vegetation strands, as will be described in more detail below. The vegetation strands are designed to simulate aquatic plants, like grass, hydrilla, milfoil, or seaweed, to attract fish, provide a hiding place for fish, and serve as a location for fish to attach their eggs. In the illustrated embodiment, the holes 76 are formed along the upper rim 68 and in the flat bottom 72. However, the holes 76 may be formed along any surface of the spawning device 200. Although different numbers of holes 76 can be used, in one embodiment, the upper rim 68 may include 18 holes, and the flat bottom 72 may have 6 holes.

In some embodiments, the flat bottom 72 has a compartment 74 formed therein for the placement of a weight (not shown). As shown in FIGS. 16A-16H, the compartment 74 may have a square shape and be configured to receive a square weight, such as a square paver. The compartment 74 may also include a circular portion, which is configured to receive a round weight, such as a round paver. In some embodiments, the compartment 74 has a depth such that, when a weight is inserted into the compartment 74, the top of the weight is approximately flush with the flat bottom surface 72. In a preferred embodiment, the depth of the compartment 74 is between about 1.905 cm (¾ inches) and 5.08 cm (2 inches). The weight can be inserted into the compartment 74 to add weight to the spawning device 200 and anchor it to the bottom of a body of water. In some embodiments, if a pea gravel paver is used as a weight, the rough surface will also serve as a place for fish to attach their eggs. In other embodiments, not shown in the figures, the spawning device 200 can be configured so that the compartment 74 is on the underside of the flat bottom 72 (i.e., the compartment 74 shown in the figures would be "inverted" to receive the weight on the underside). In this embodiment, the weight could be secured with straps, clips, or other securing mechanisms discussed herein with respect to other embodiments.

In some embodiments, the base structure 60 may include a lower lip 78 that extends circumferentially along the bottom of the outer side wall 64. The lower lip 78 is designed to create more stability when the spawning device 200 is positioned on the bottom of a body of water. The lower lip 78 may also include a plurality of attachment holes 80. The attachment holes 80 may be positioned around the outer side wall 64. The attachment holes 80 can be used to connect multiple spawning devices together to create spawning colonies. The attachment holes 80 can also be used to anchor the spawning device 200 to the bottom of a body of water by inserting a stake therethrough, as will be described in more detail below. In other embodiments, rather than using the lower lip 78, the base structure 60 may have optional tabs connected to the base of the outer side wall 64.

The spawning device 200 may have any size suitable to allow for the device 200 to be deployed and used in the water. In some embodiments, the spawning device 200 may have a height of about 5.08 cm (2 inches) to about 15.24 cm (6 inches). In other embodiments, the spawning device 200 may have a height of about 7.62 cm (3 inches) to about 12.7 cm (5 inches). In still other embodiments, the spawning device 200 may have a height of about 10.16 cm (4 inches) to about 11.43 cm (4.5 inches). The spawning device 200 may also have an overall diameter of about 76.2 cm (30 inches) or greater. In other embodiments, the spawning device 200 may have an overall diameter of about 83.82 cm (33 inches) or greater. In still other embodiments, the spawning device 200 may have an overall diameter of about 101.6 cm (40 inches) or greater. For example, the spawning device 200 may have a height of about 10.16 cm (4 inches) and a diameter of about 83.82 cm (33 inches). In other embodiments, the overall heights and/or diameter can be increased by 10%, 25%, 50%, or 100%. In still other embodiments, smaller sizes can be used.

The spawning device 200 may be made of a thermoplastic polymeric material. Suitable thermoplastic polymeric materials include, but are not limited to, nylon (polyamide), acrylic, polycarbonate, polyoxymethylene (POM), polystyrene (PS), acrylonitrile butadiene styrene (ABS), polypropylene (PP), polyethylene (PE), and high-density polyethylene (HDPE). In one embodiment, the spawning device 200 may be made of acrylonitrile butadiene styrene (ABS). For example, the spawning device 200 may be made of recyclable ABS, which is eco-friendly. In some embodiments, the spawning device 200 may have a specific gravity greater than 1.0 such that the spawning device 200 itself is able to sink within the body of water. For example, the spawning device 200 may have a specific gravity of 1.04, which enables it to sink within the water. In other embodiments, when a weight is attached to the compartment 74, the spawning device 200 may have a specific gravity of less than 1. The spawning device 200 may also be made from eco-friendly polymer materials with a rough texture to promote the growth of algae, bacteria, periphyton, and other microorganisms that serve as a food source to fish and other living creatures.

Figure 17A:
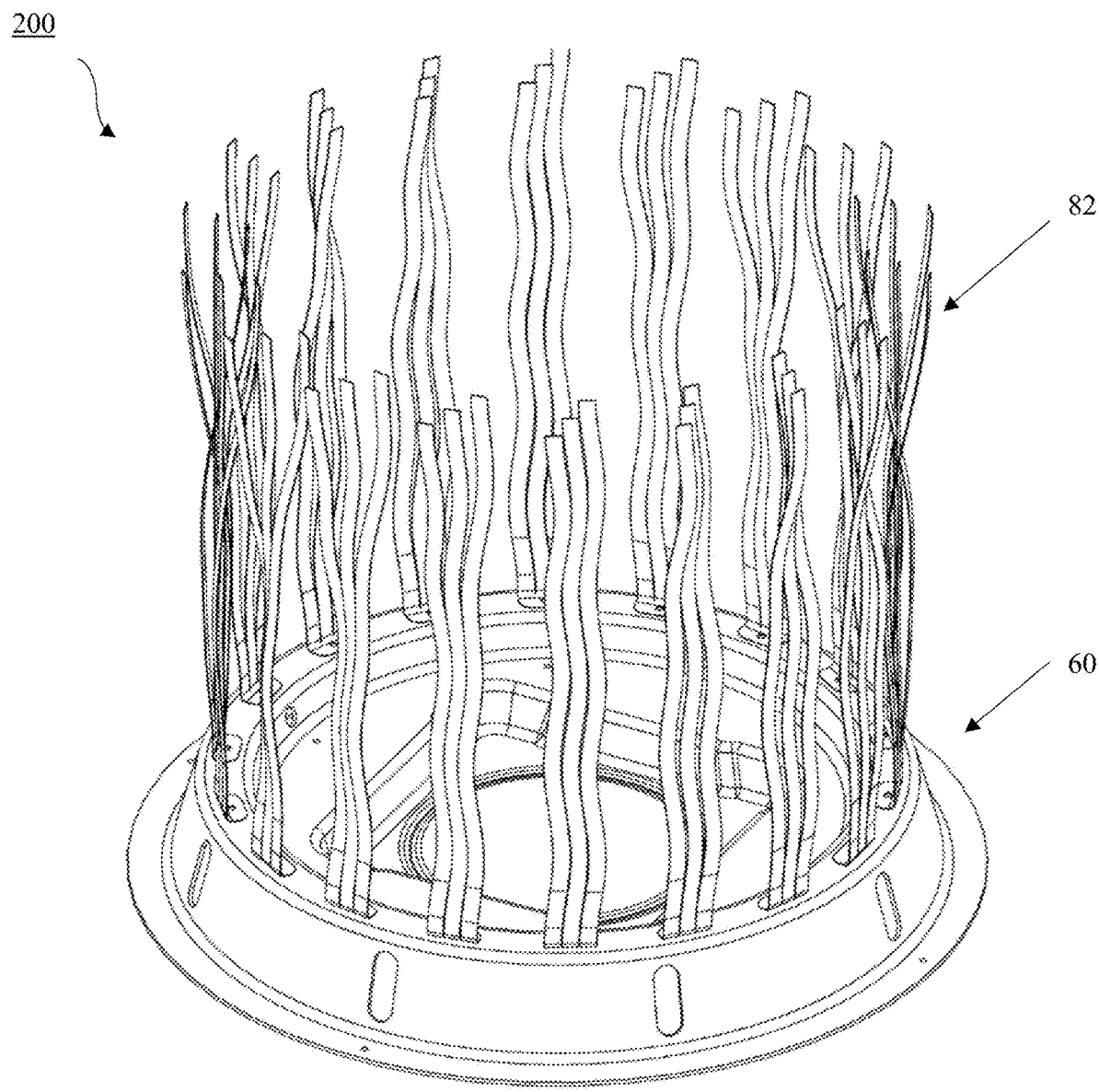
FIG. 17A shows vegetation strands attached to the spawning device shown in FIG. 16A according to one embodiment of the present disclosure.
Figure 17B:
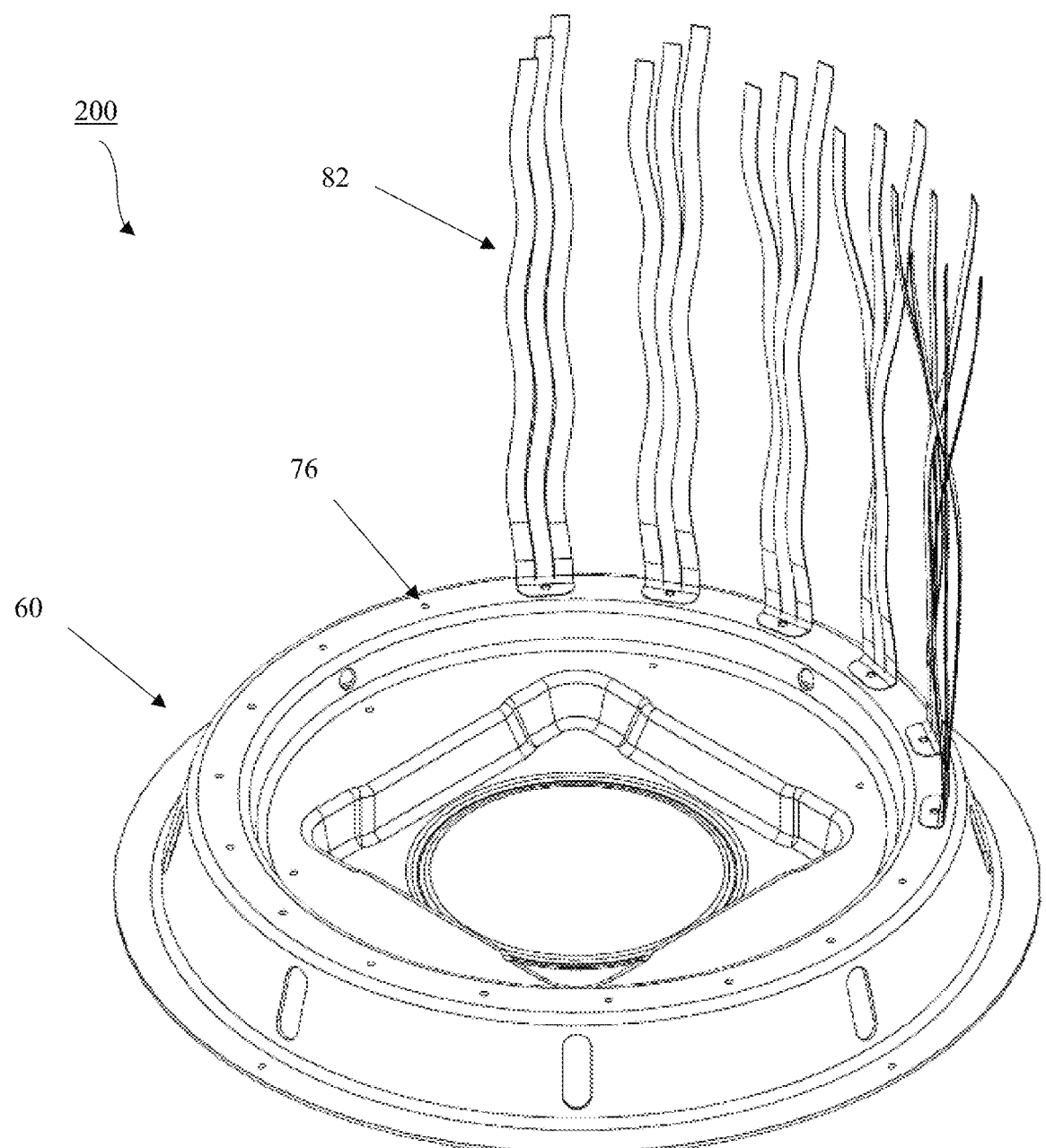
FIG. 17B shows vegetation strands attached to the spawning device shown in FIG. 16A according to another embodiment of the present disclosure.

FIGS. 17A and 17B show the spawning device 200 having vegetation strands 82 attached thereto that are designed to simulate aquatic plants, like grass, hydrilla, milfoil, or seaweed, to attract fish, provide a hiding place for fish, and serve as a location for fish to attach their eggs. The vegetation strands 82 may be attached at any of the holes 76 on the spawning device 200 (for example, along the upper rim 68 and in the flat bottom 72). In some embodiments, as shown in FIG. 17A, the vegetation strands 82 may be attached at all of the holes 76 along the upper rim 68. In other embodiments, as shown in FIG. 17B, the vegetation strands 82 may be attached at only some of the holes 76, for instance, some of the holes 76 along the upper rim 68. In still other embodiments, the vegetation strands 82 may be attached at every hole 76 on the spawning device 200, or only used along the upper rim 68 or only used on the flat bottom 72. The embodiments covered only partially with the vegetation strands 82 may be more conducive to some types of fish.

The vegetation strands 82 can be made of any suitable material that is resilient, does not easily degrade in water, and is buoyant such that the vegetation strands 82 stand up when placed in the water and do not sink. In one embodiment, the vegetation strands 82 are made of a polymeric material. For example, the vegetation strands 82 may be made of polyethylene. In some embodiments, the vegetation strands 82 have a specific gravity of 1.0 or less so that when the vegetation strands 82 are placed in a body of water, the vegetation strands 82 tend to float and are naturally buoyant so as to appear like natural vegetation. For instance, the vegetation strands 82 may have a specific gravity of about 0.88 to about 0.92. The vegetation strands 82 can have any dimension that allows for the strands 82 to simulate aquatic vegetation, including any of the dimensions of the vegetation strands described in U.S. application Ser. No. 17/479, 213, entitled "Fish Attracting Systems and Methods," filed on Sep. 20, 2021, the entire disclosure of which is incorporated by reference.

Figure 17C:
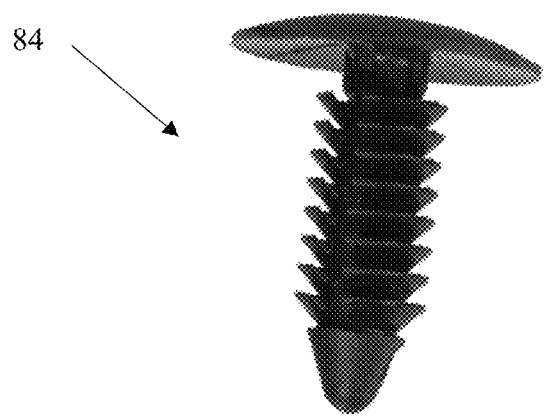
FIG. 17C shows an exemplary fastener that may be used to attach the vegetation strands to the spawning device according to one embodiment of the present disclosure.

FIG. 17C shows an exemplary fastener 84 that may be used to attach the vegetation strands 82 to the spawning device 200. The vegetation strands 82 may include a hole at the base portion configured to receive an attachment mechanism, such as the exemplary fastener 84, to secure the vegetation strands 82 to the base structure 60. The fastener 84 includes flexible ridges along the length of the shaft to help hold it in place when it is secured to the spawning device 200. In other embodiments, the vegetation strands 82 can be secured to the base structure 60 using friction fit pins, push pins, straps, snaps, or other male/female connectors known to those in the industry. The vegetation strands 82 are preferably removably attached to the base structure 60 such that if the vegetation strands 82 deteriorate or are torn, the vegetation strands 82 can be removed from the base structure 60 and replaced with new strands. However, the vegetation strands 82 should be securely attached to the base structure 60 during use so that the vegetation strands 82 are not dislodged by ordinary water movement and currents. The fastener 84 may also be used to attach multiple spawning devices 200 together, as will be described in more detail below.

Figure 18A:
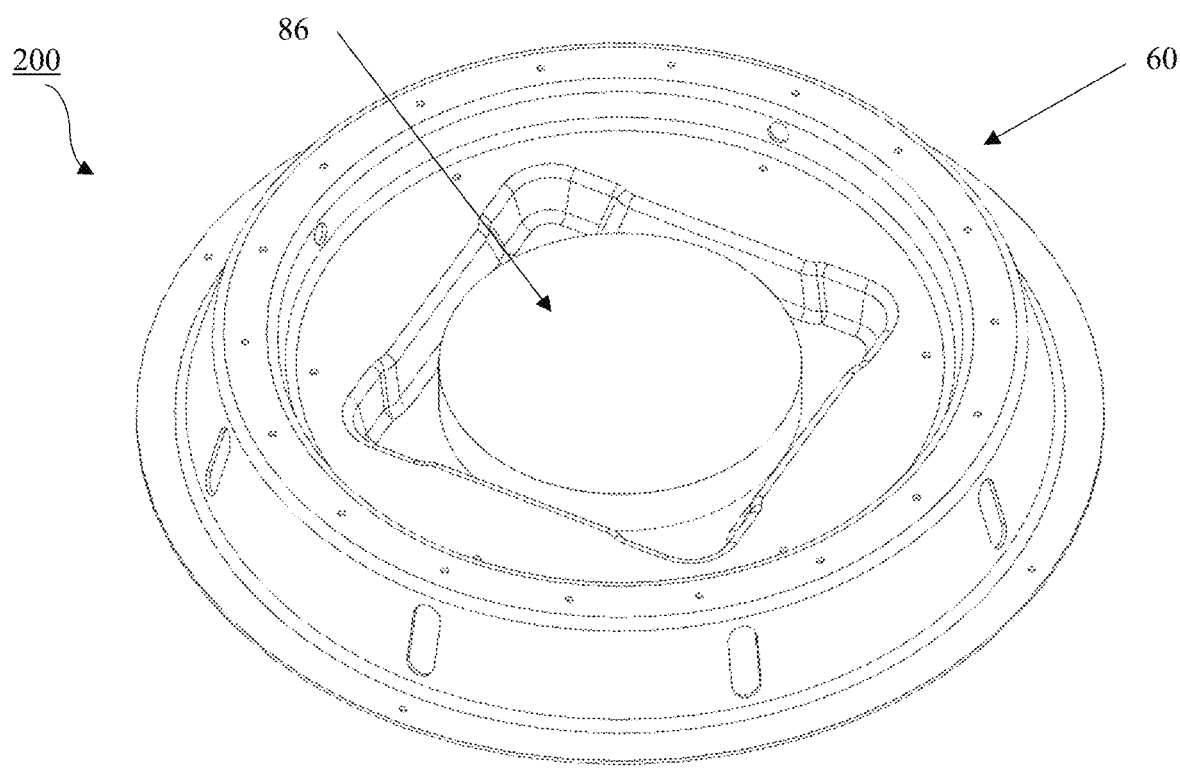
FIG. 18A is an upper perspective view of the spawning device with a circular paver inserted therein according to one embodiment of the present disclosure.
Figure 18B:
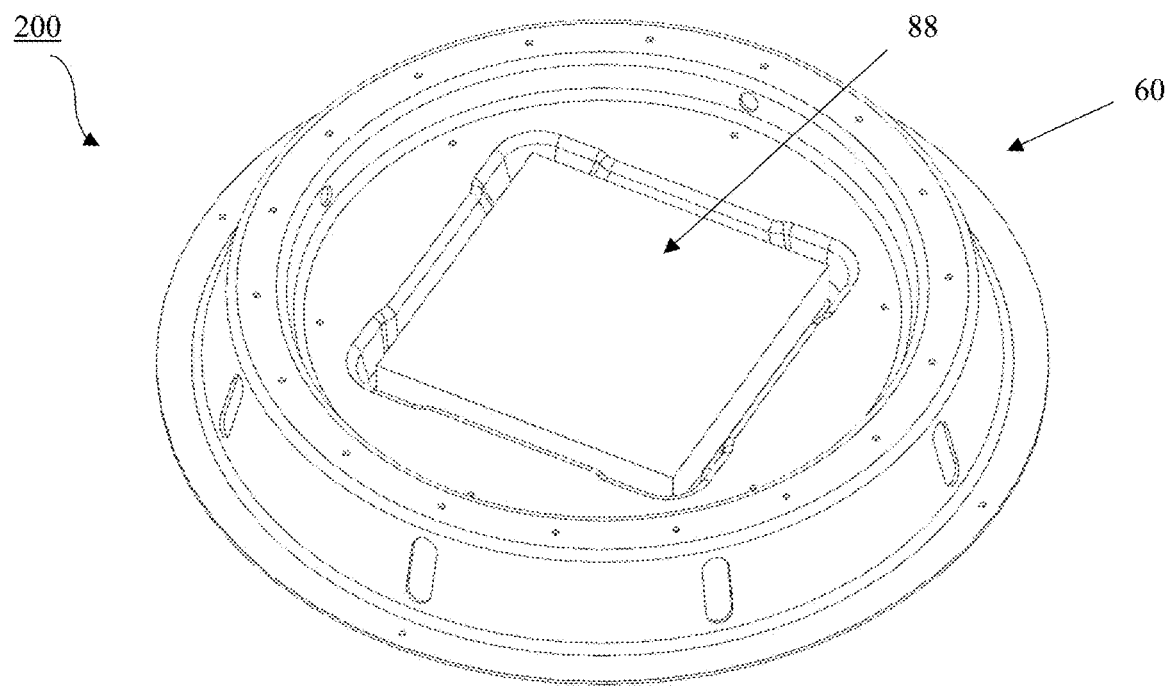
FIG. 18B is an upper perspective view of the spawning device with a square paver inserted therein according to one embodiment of the present disclosure.
Figure 18C:
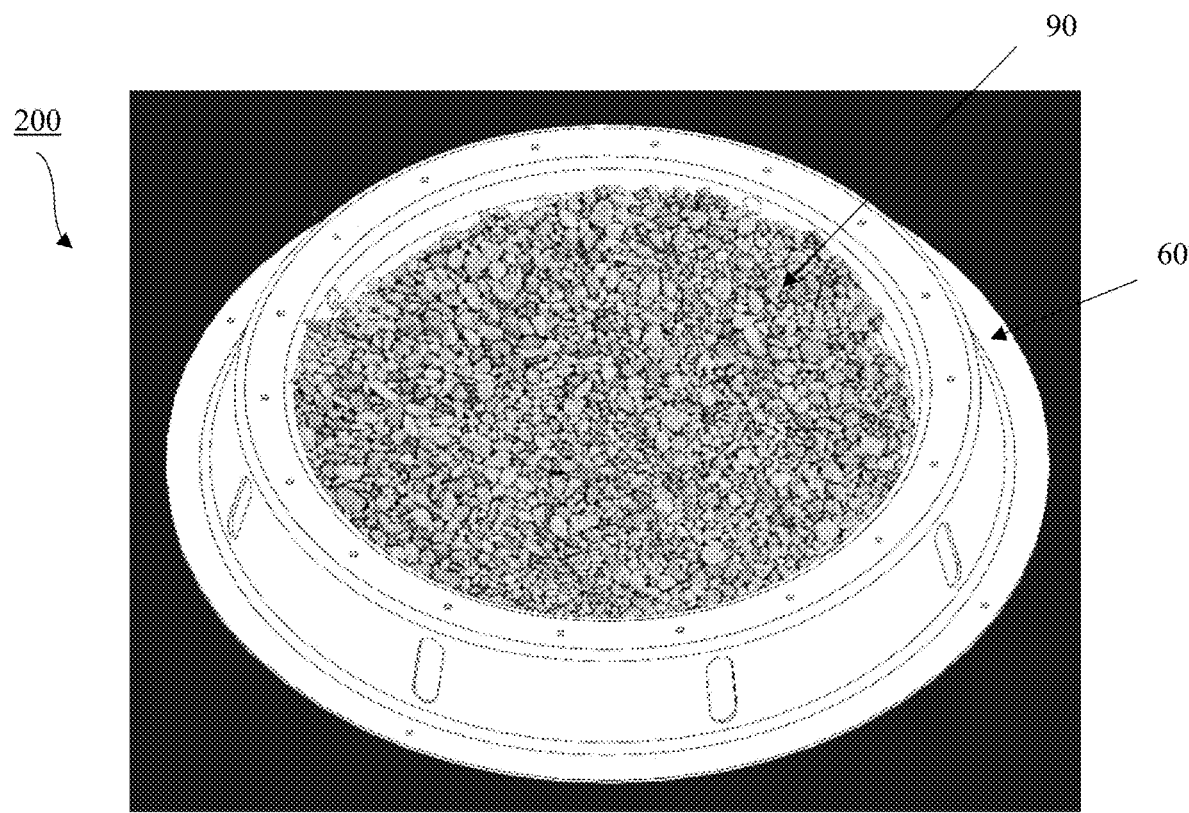
FIG. 18C is an upper perspective view of the spawning device with gravel material inserted therein according to one embodiment of the present disclosure.

FIGS. 18A-18D show various devices or materials that may be used with the spawning device 200 to facilitate use as a fish attracting device and/or to help secure the device in place. In some embodiments, as shown in FIG. 18A, the compartment 74 in the interior cavity 62 may be sized and configured to receive a circular or round paver 86. For example, FIG. 18A shows a 30.48 cm (12-inch) round paver 86 in the center. In another embodiment, as shown in FIG. 18B, the compartment 74 may be sized and configured to receive a square paver 88. For example, FIG. 18B shows a 30.48 cm (12-inch) square paver 88 in the center. The pavers 86, 88 can help retain the spawning device 200 in the originally deployed location. In other embodiments, as shown in FIG. 18C, the spawning device 200 can also be used with gravel material 90, which serves as a naturally occurring spawning surface. As shown in FIG. 18C, the interior cavity 62 is filled with the gravel material 90. This embodiment may include use with or without the pavers 86, 88 in the compartment 74.

Figure 18D:
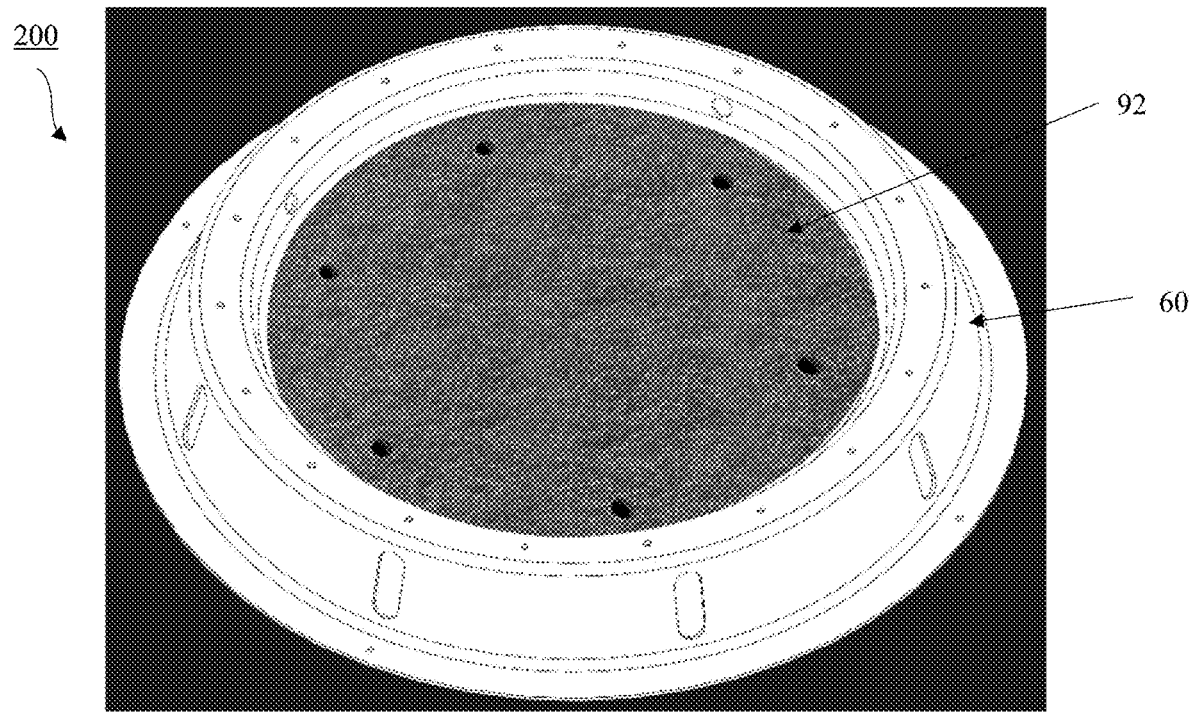
FIG. 18D is an upper perspective view of the spawning device with a filter material inserted therein according to one embodiment of the present disclosure.

In some embodiments, as shown in FIG. 18D, the spawning device 200 can also be used with a filter material 92. The filter material 92 is common in fish hatchery environments for the spawning of fish and can be installed on the surface of the spawning device 200 and secured with fasteners, such as exemplary fastener 84, as a substitute for the gravel material 90. One example is shown in FIG. 18D, which shows the filter material 92 covering the interior cavity 62. The filter material 92 may include holes 94 that allow users to attach the vegetation strands 82 to the filter material 92 and are configured to mate with the holes 76. This embodiment may include use with or without the pavers 86, 88 in the compartment 74.

The filter material 92 may be any material that is suitable for use in fish hatcheries and that allows fish to attach their eggs thereto. In some embodiments, the filter material 92 is made at least partially of natural or synthetic fiber hog hair or coconut fibers. The filter material 92 is preferably washable and reusable filter media. The filter material 92 is also preferably comprised of fine, interconnected fibers, and spun into a high loft, depth loading, fiber maze. In some embodiments, the filter material 92 is anti-microbial treated to resist mold and mildew. In further embodiments, the filter material 92 has an initial resistance versus airflow of less than 0.15 (w.g.) at 1000 CFM airflow. The filter material 92 may have a depth between about 1.27 cm (½ inch) to 10.16 cm (4 inches). The filter material 92 may also have a latex binder and/or a polyester net backing. In still further embodiments, the filter material 92 may be the same material used in air filters, such as filtering paper based on cellulose fibers impregnated with phenolic, epoxy or acrylic resins.

Figure 19:
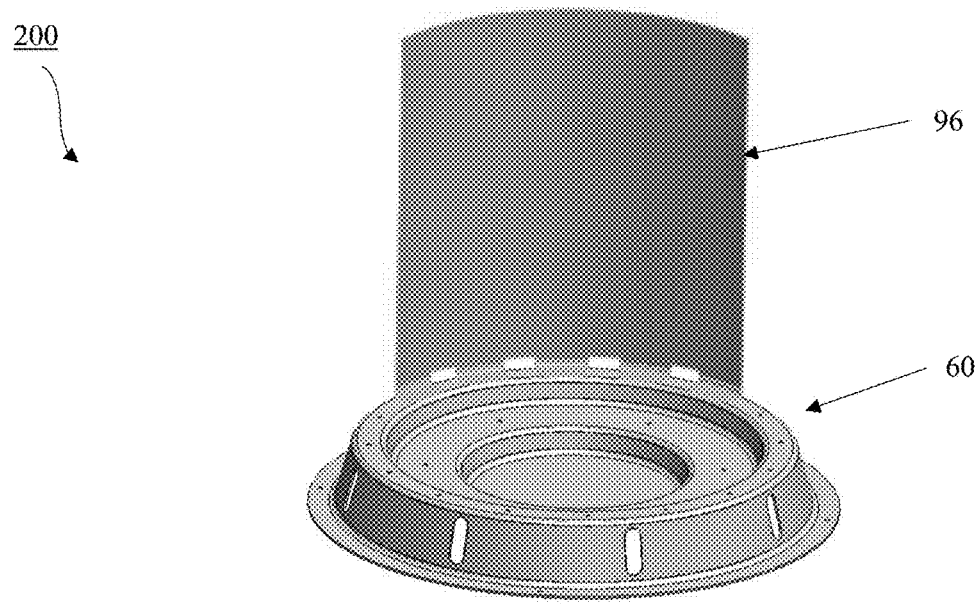
FIG. 19 is a perspective view of the spawning device with a spawning mat attached thereto according to one embodiment of the present disclosure.

FIG. 19 shows a guard 96 that can be used with the spawning device 200. The guard 96 provides a solid surface area on the spawning device 200, which is attractive to fish, such as bass and bluegill, for spawning. Fish can spawn up against the guard 96. As shown in FIG. 19, the guard 96 may be attached to the base structure 60 along the upper rim 68. The guard 96 may be attached to the base structure 60 using any of the fasteners described above, including the fastener 84.

Figure 20:
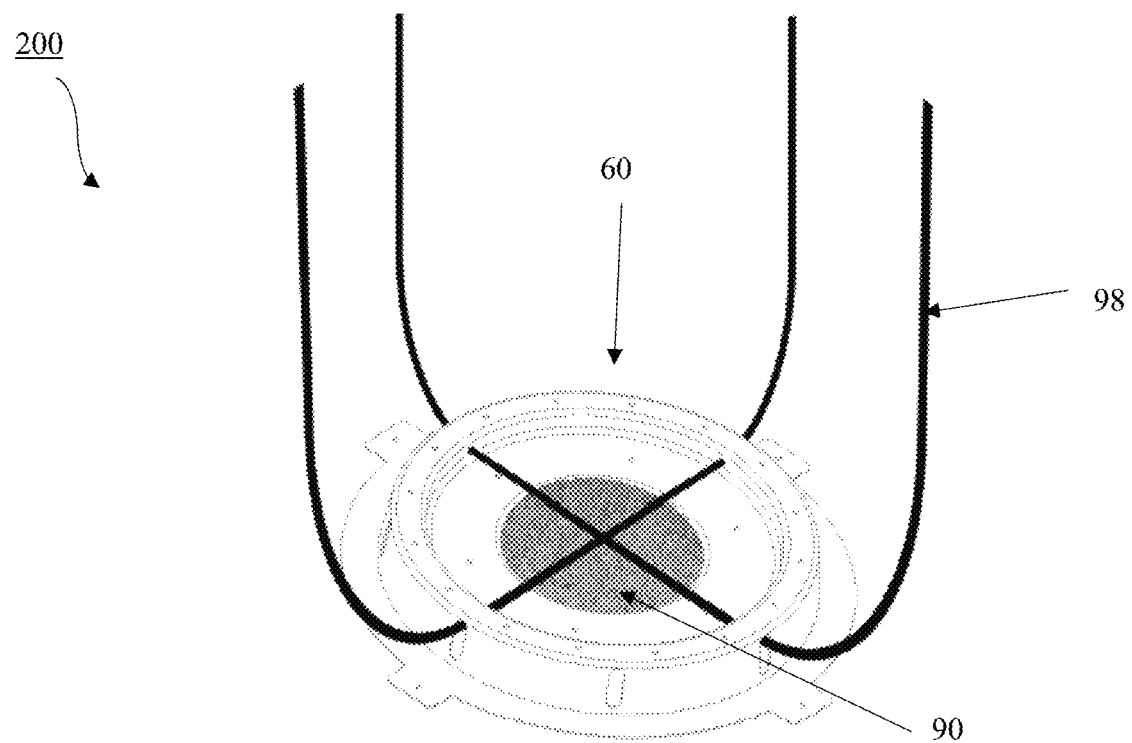
FIG. 20 is a perspective view of the spawning device with ropes attached thereto according to one embodiment of the present disclosure.

FIG. 20 depicts an exemplary method that can be used to deploy the spawning device 200 into the water. As shown in FIG. 20, two ropes 98 can be passed through the elongated slots 70 on opposite sides of the outer and inner side walls 64, 66 to keep the spawning device 200 level as the device 200 is lowered into the water and to the bottom floor. This can be done from a boat, barge, pier, dock or in shallow water areas. Once the spawning device 200 is lowered to the floor of the body of water, one end of each of the ropes 98 can be released and pulled through the elongated slots 70. The spawning device 200 can be installed on the floor of a body of water during construction or rehabilitation or lowered into the water using the ropes 98.

Figure 21:
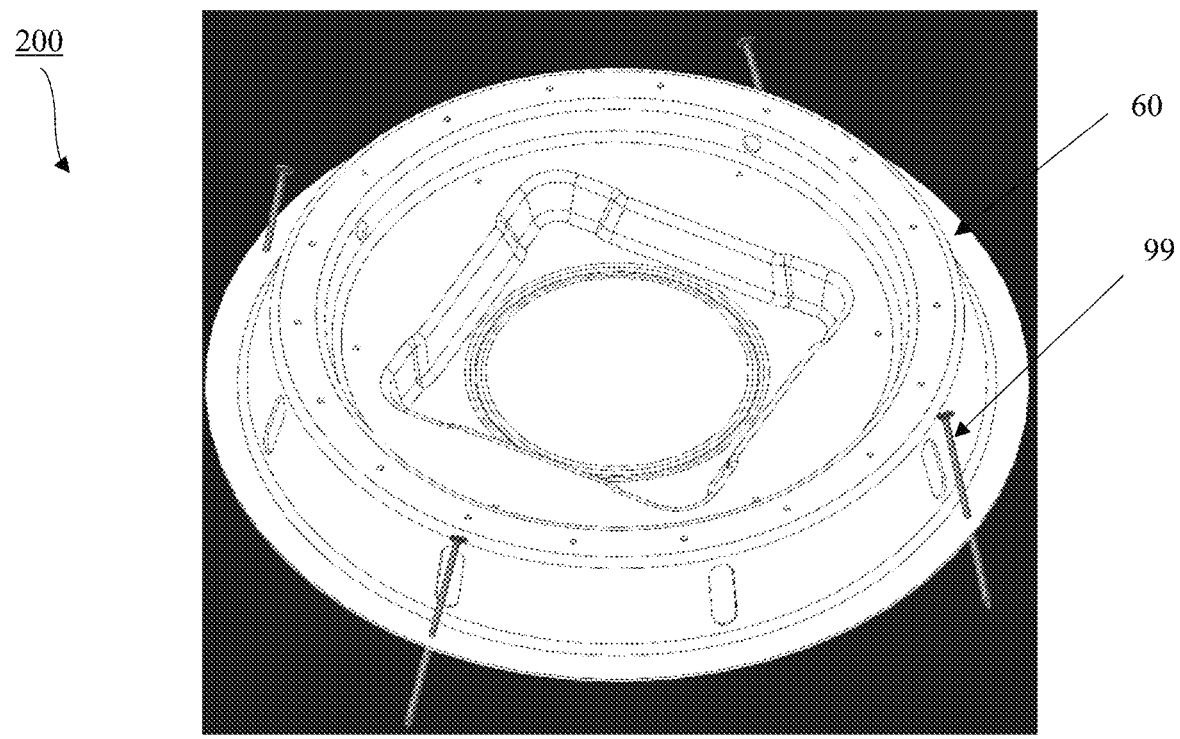
FIG. 21 is an upper perspective view of the spawning device with stakes attached thereto according to one embodiment of the present disclosure.
Figure 22A:
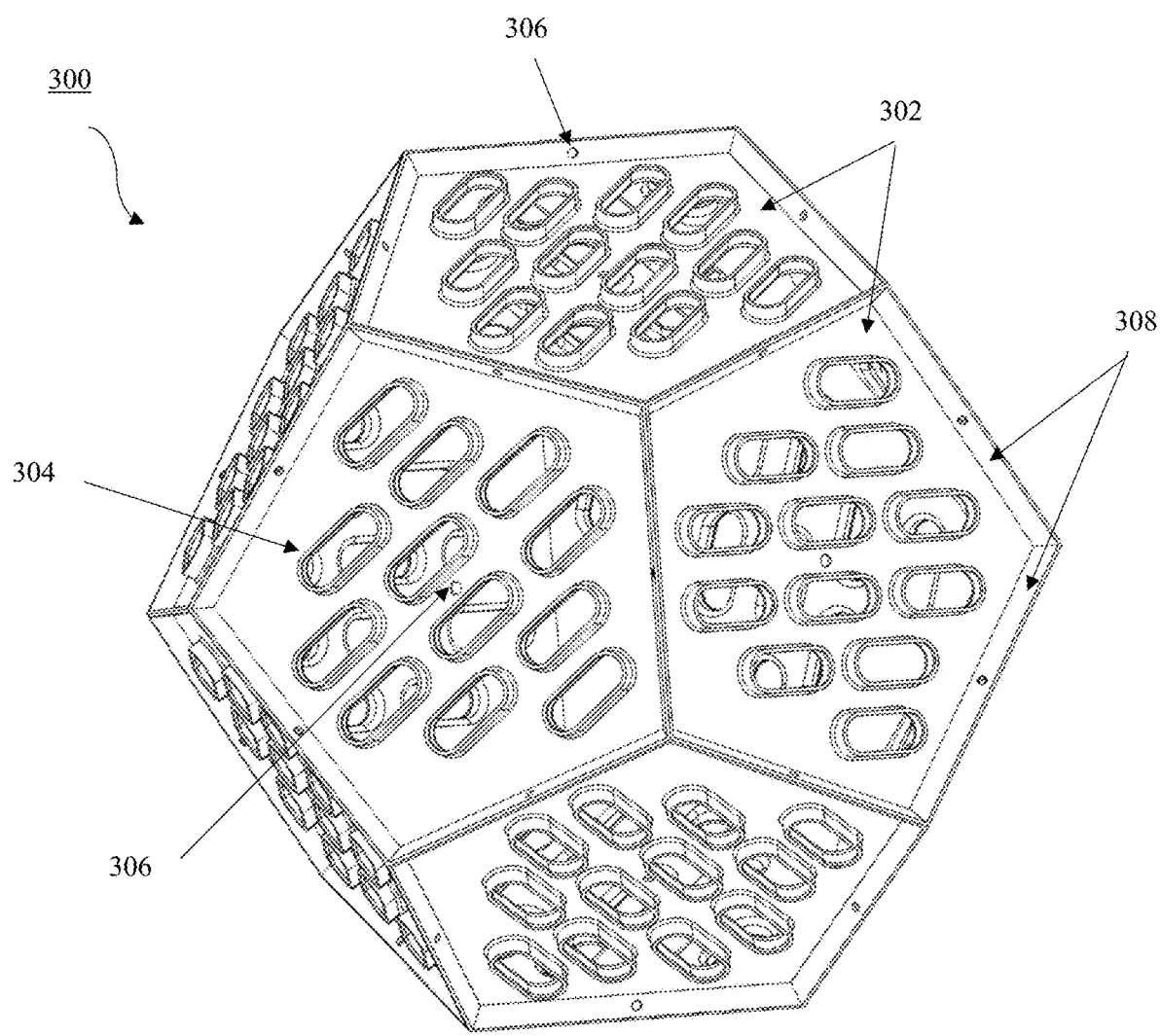
FIG. 22A is an upper perspective view of a fish attractor and escape habitat system according to still another embodiment of the present disclosure.
Figure 22B:
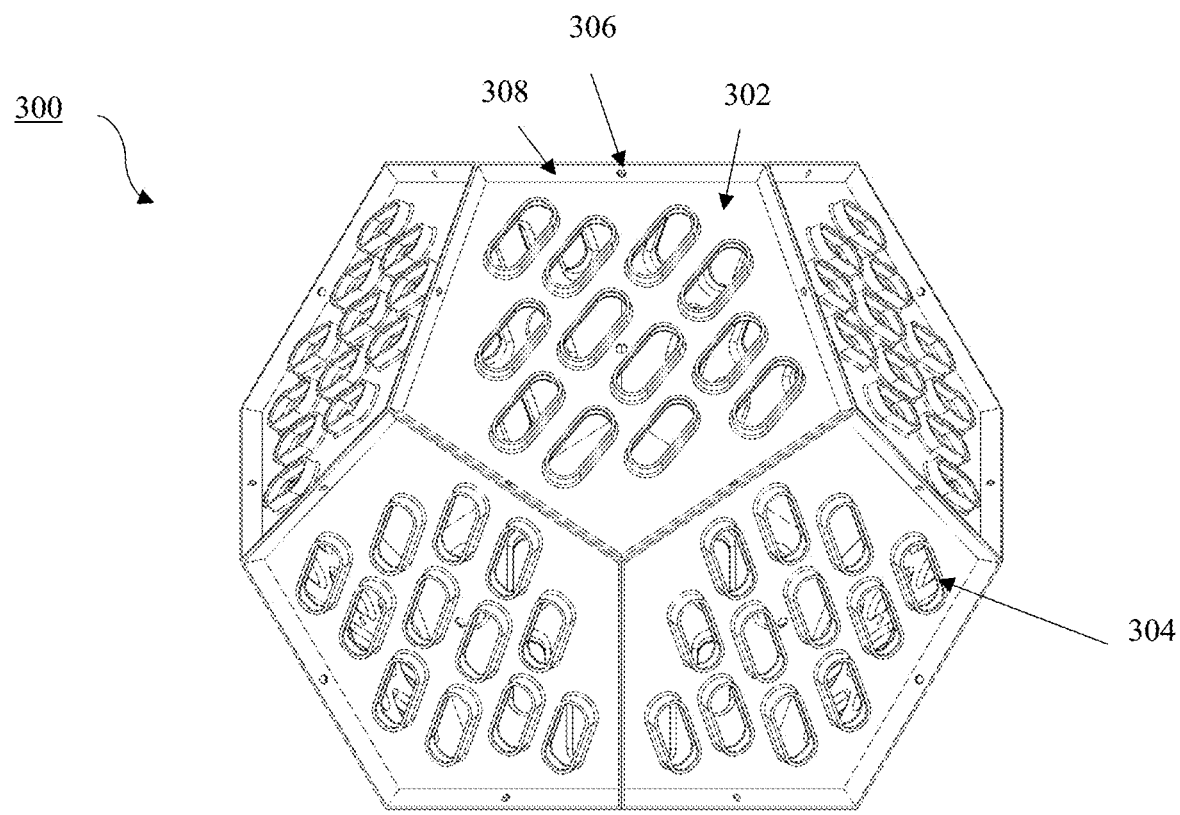
FIG. 22B is a front view of the fish attractor and escape habitat system shown in FIG. 22A.
Figure 22C:
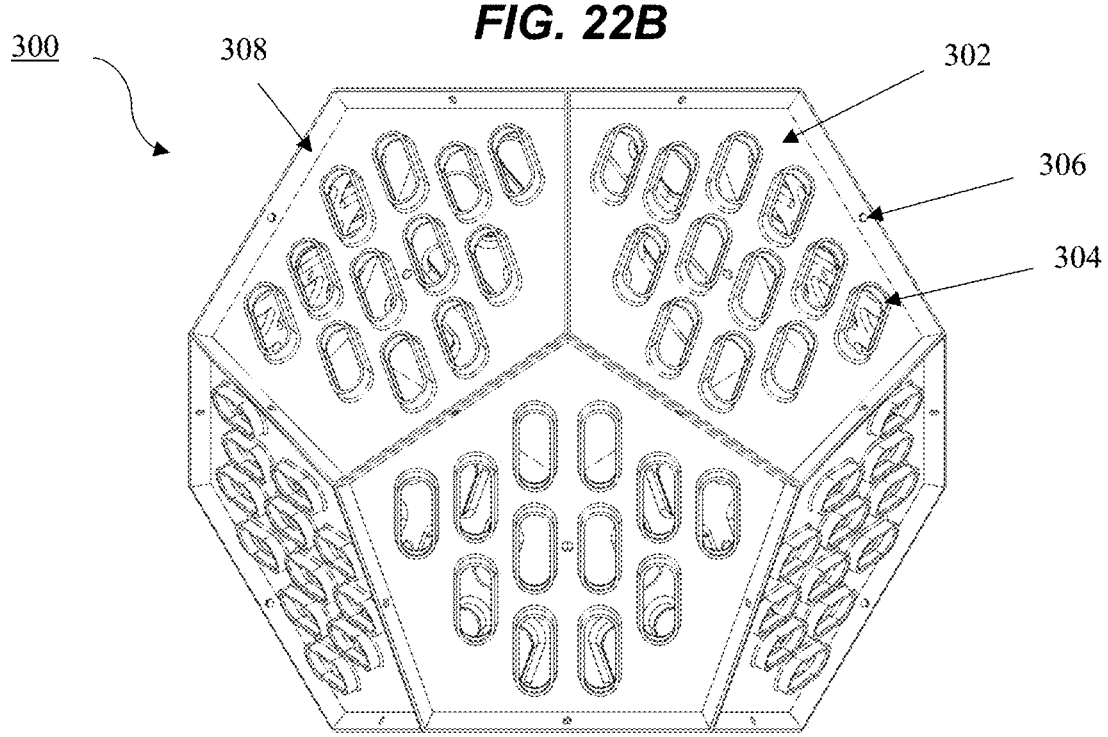
FIG. 22C is a rear view of the fish attractor and escape habitat system shown in FIG. 22A.
Figure 22D:
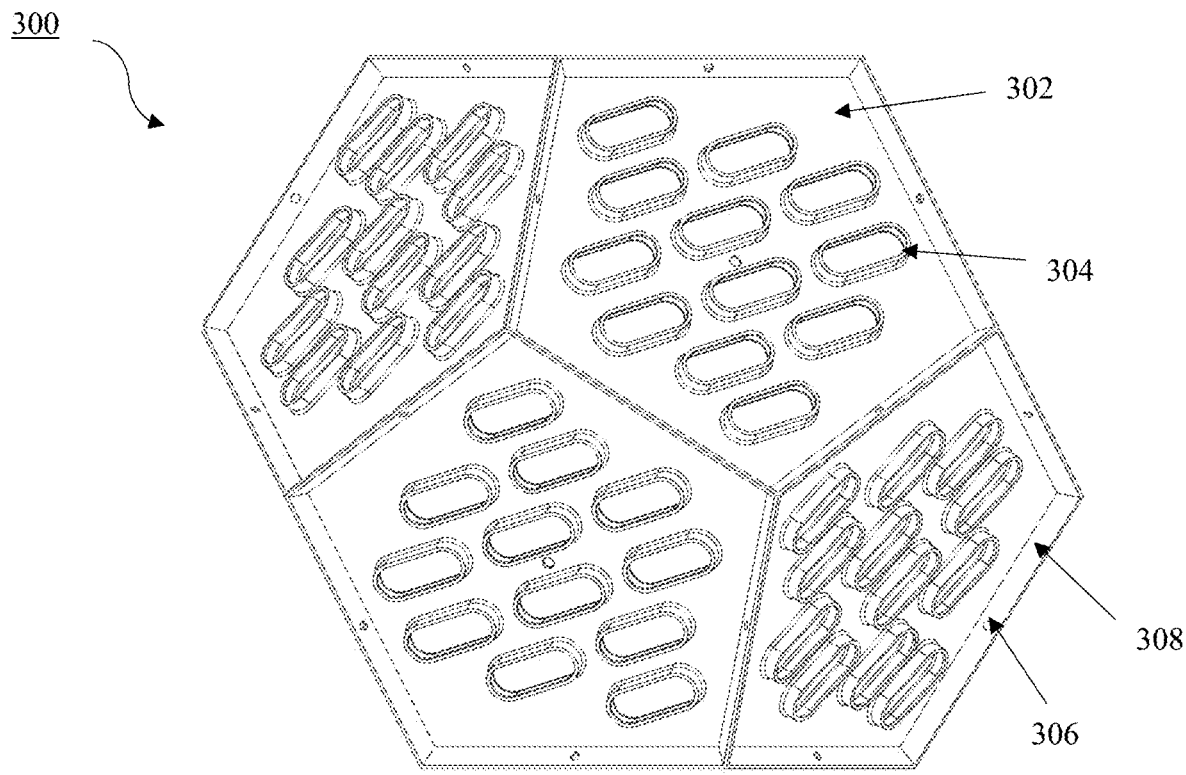
FIG. 22D is a first side view of the fish attractor and escape habitat system shown in FIG. 22A.
Figure 22E:
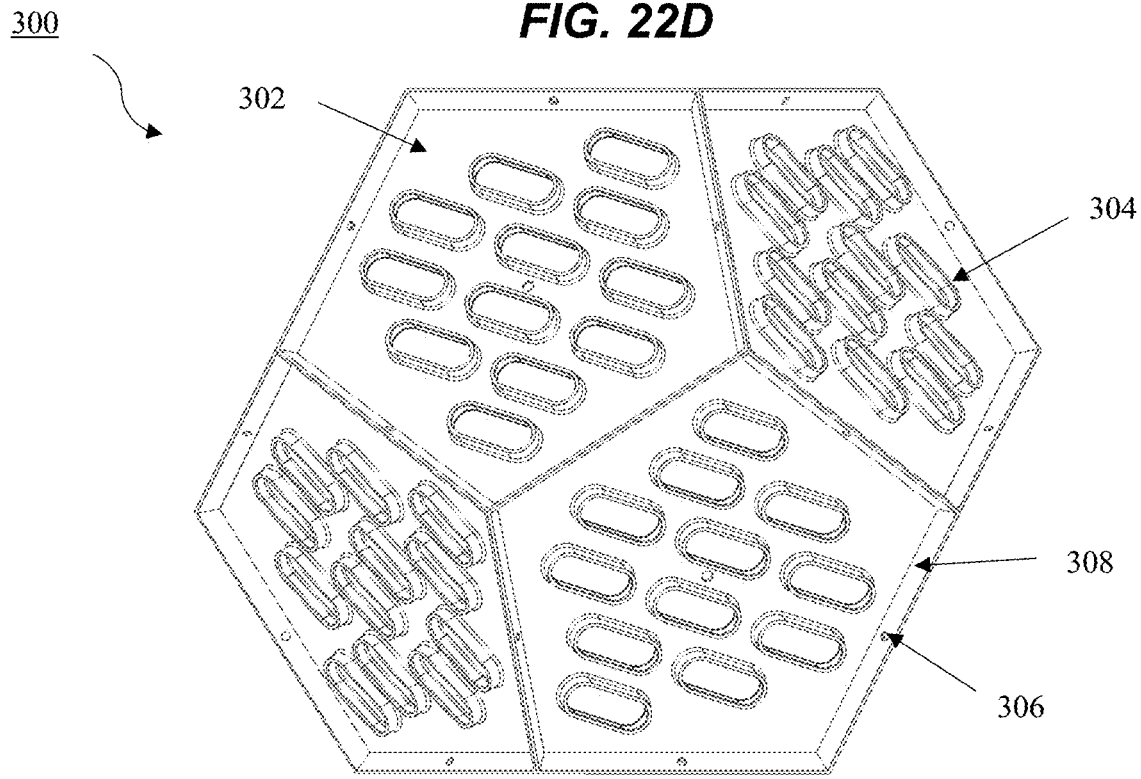
FIG. 22E is a second side view of the fish attractor and escape habitat system shown in FIG. 22A.
Figure 22F:
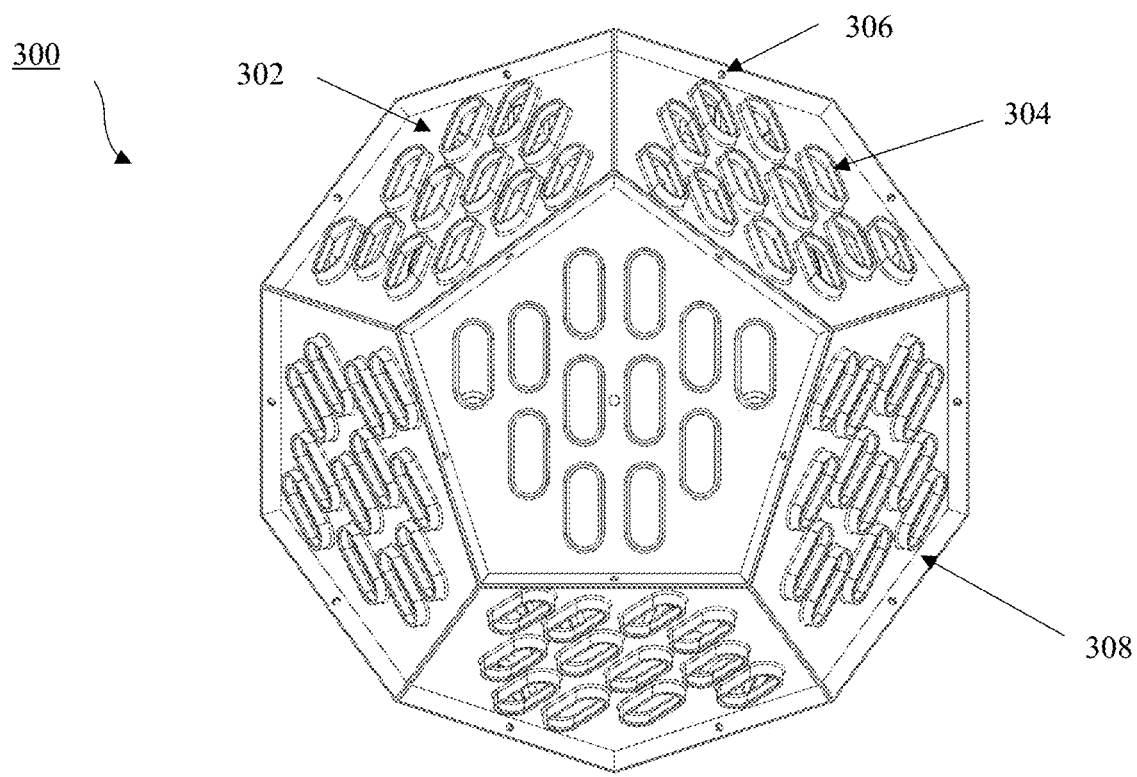
FIG. 22F is a top view of the fish attractor and escape habitat system shown in FIG. 22A.
Figure 22G:
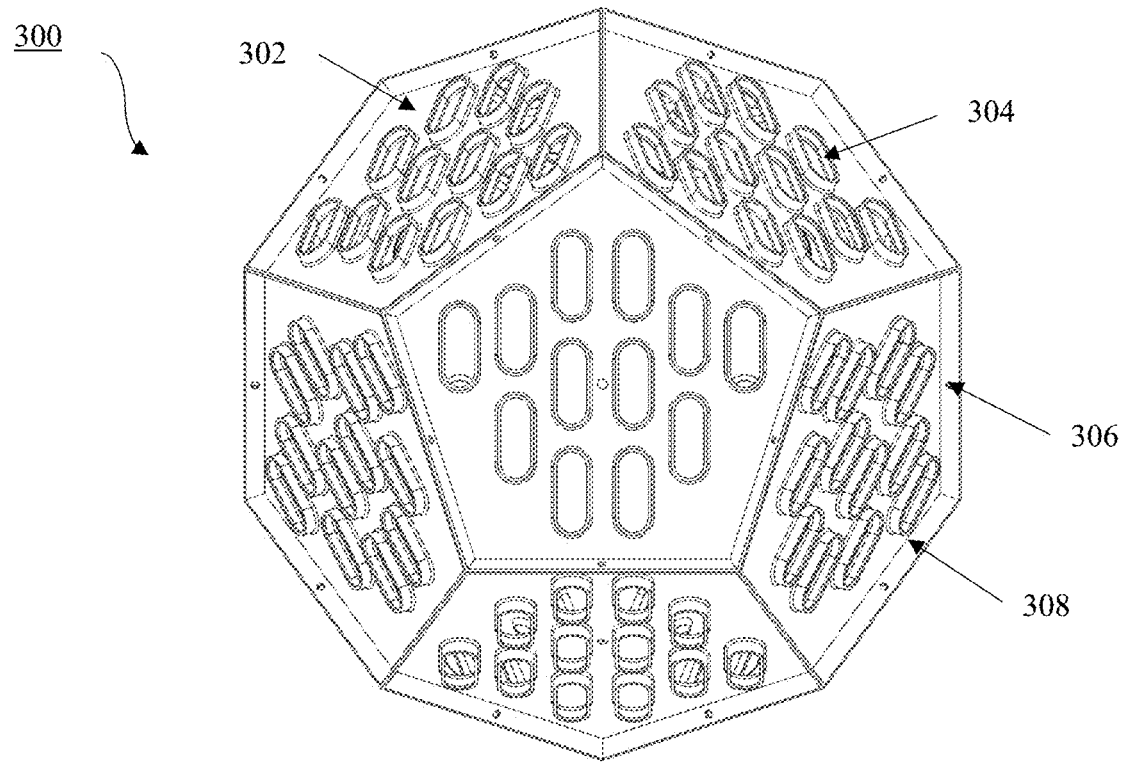
FIG. 22G is a bottom view of the fish attractor and escape habitat system shown in FIG. 22G.

FIG. 21 shows an exemplary securing means for securing the spawning device 200 to the bottom of the body of water. As described above, the lower lip 78 is configured to rest on the bottom of the body of water to help stabilize the device. The lower lip 78 includes the attachment holes 80 that are configured to receive a plurality of stakes 99 that can be used to secure the spawning device 200 to the bottom of the body of water. The stakes 99 can be inserted into the bottom floor to help stabilize the device 200. In other embodiments, the spawning device 200 can also have jagged teeth along one or more bottom portions of the lower lip 78 (not specifically shown, but optionally similar to that of the jagged bottom of the pyramid shaped embodiments described above) that can used to secure the device 200 in place.

A single spawning device 200 can be used, or multiple spawning devices 200 can be used together. In some embodiments, the lower lips 78 of multiple spawning devices 200 may be overlapped and staked down together. The newly hatched fish fry will have a place to escape predators inside the base of the device 200. For those with lakes or other bodies of water being built or with low water levels, the devices 200 can be placed where desired. When installing in existing lakes or with water levels above where desired, various options exist. For example, one option is to use the paver 86 or 88 (or other weight) inserted in the compartment 74 and lowered into the water or dropped in shallow water. If a pea-gravel paver (one preferred embodiment of the paver) is used, fish may attach eggs to the rough surface, which dispenses of the need for the gravel material 90 or the filter material 92. In other embodiments, the paver 86 or 88 may be inserted into the compartment 74 for weight and then the filter material 92 or gravel material 90 may be installed and lowered into the water. In still other embodiments, as described above, a user can insert the paver 86 or 88 and top off the surface with the gravel material 90 and lowered into the water using the ropes 98.

Referring to FIGS. 22A-22G, a fish attractor and escape habitat system 300 according to still another embodiment is shown. The fish attractor and escape habitat system 300 can provide an escape habitat or a protective area for fish to escape from predators, such as larger fish, birds, and other creatures. The fish attractor and escape habitat system 300 can also act as a conservation system and provide a base for fish forage growth. Once forage fish have grown to a certain size, they can no longer enter the system 300 and the medium sized forage fish become the ideal meal size for predator fish. The fish attractor and escape habitat system 300 is designed to be strategically submerged in bodies of water used for fish conservation as a protective habitat, fish attractant, and fish feeding device. The fish attractor and escape habitat system 300 can be installed in a body of water where fish feeders dispense fish feed so forage fish can leave the system 300 to feed and then return to the safety of the system 300.

As shown in FIGS. 22A-22G, the fish attractor and escape habitat system 300 is preferably a multi-sided geometric structure made up of a plurality of side walls 302. In the illustrated embodiment, the fish attractor and escape habitat system 300 has twelve side walls 302, with each side wall 302 being in the shape of a pentagon. This geometric figure is known as a dodecahedron. However, the fish attractor and escape habitat system 300 may be of various other geometric shapes including, but not limited to, a four-sided pyramid shape, a four-sided cube-shape, a six-sided cube-shape, or other geometric shapes with eight, ten, twelve, or more sides.

In some embodiments, the fish attractor and escape habitat system 300 is formed of side walls 302 that are separate, attachable side pieces. The separate pieces allow for the side walls 302 to nest for compact packaging. In this configuration, the side walls 302 can be assembled and attached to each other. In some embodiments, each side wall 302 has a flange 308 at each edge that overlaps with a corresponding flange on an adjacent side wall 302. The flanges 308 may include holes 306 configured to receive a fastener to secure the side walls 302 to one another. The side walls 302 can be attached to one another with a variety of different types of fasteners discussed herein and as known to those of skill in the art. For example, the flanges 308 may be secured together using fasteners (such as the fastener depicted in FIG. 17C), friction pins, zip ties, or male/female attachments. The assembled side walls 302, as shown in FIGS. 22A-22G, create a generally hollow interior. In still other embodiments, the fish attractor and escape habitat system 300 can be a unitary structure such that the side walls 302 are integrally formed with one another.

Figure 23:
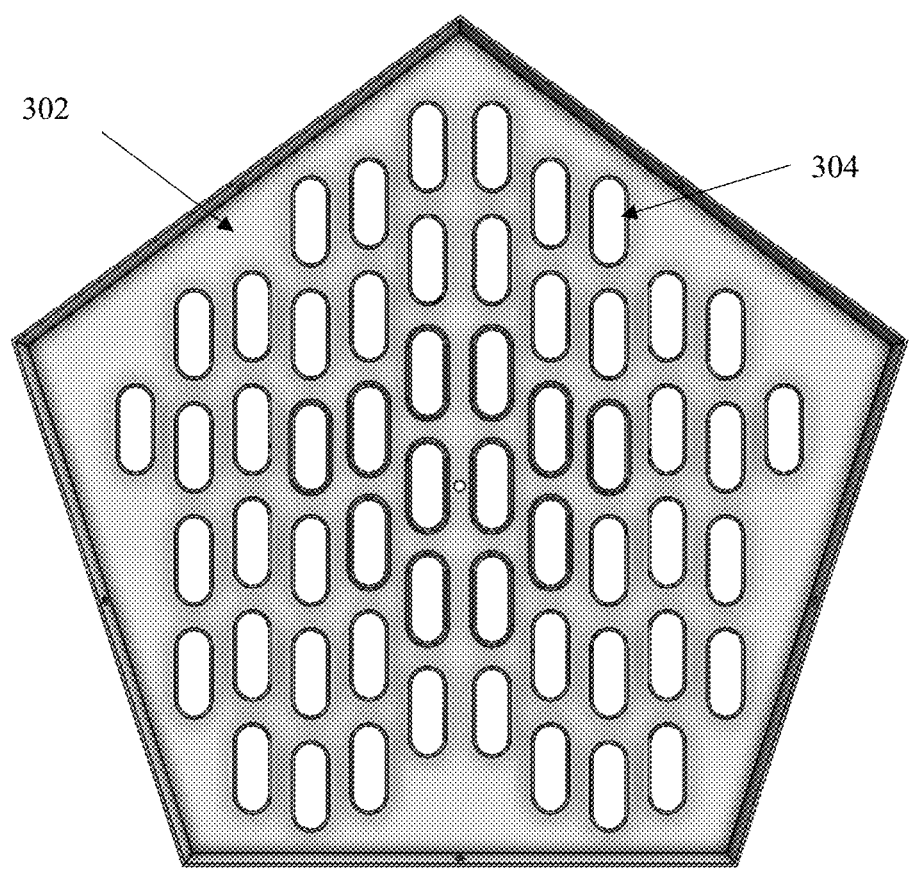
FIG. 23 is a front view of a panel used on the fish attractor and escape habitat system according to another embodiment of the present disclosure.

In further embodiments, each of the side walls 302 may have a plurality of elongated slots 304 formed therein. The elongated slots 304 provide access to a protective area within the fish attractor and escape habitat system 300 for newly hatched fish (fry) and small forage fish from predators. The elongated slots 304 may have a width of about 2.54 cm (1 inch) to about 7.62 cm (3 inches), preferably about 5.08 cm (2 inches), and more preferably about 2.54 cm (1 inch). The elongated slots 304 may have a length of about 5.08 cm (2 inches) to about 15.24 cm (6 inches), preferably about 7.62 cm (3 inches) to about 12.7 cm (5 inches), and more preferably about 10.16 cm (4 inches). Any other similar sizes that allow smaller fry to enter, but not larger more predatory fish to enter, may be used with the present disclosure. As shown in FIGS. 22A-22G, each side wall 302 has twelve elongated slots 304 formed therein. However, the side walls 302 may include more or less elongated slots 304 depending on the size of each side wall 302. For instance, as shown in FIG. 23, larger side walls 302 can include as many as 56 elongated slots 304.

The fish attractor and escape habitat system 300, including the side walls 302, may be made of a thermoplastic polymeric material. Suitable thermoplastic polymeric materials include, but are not limited to, nylon (polyamide), acrylic, polycarbonate, polyoxymethylene (POM), polystyrene (PS), acrylonitrile butadiene styrene (ABS), polypropylene (PP), polyethylene (PE), and high-density polyethylene (HDPE). In one embodiment, the fish attractor and escape habitat system 300 may be made of PP. In another embodiment, the fish attractor and escape habitat system 300 may be made of HDPE. In one embodiment, the fish attractor and escape habitat system 300 has a density of less than 0.98 g/cm$^3$ such that it floats within the water. For example, the fish attractor and escape habitat system 300 may have a density of about 0.95 g/cm$^3$ or less. In other embodiments, the fish attractor and escape habitat system 300 has a density of less than 0.90 g/cm$^3$. In some embodiments, the fish attractor and escape habitat system 300 has a tensile strength greater than about 3,500 psi. In other embodiments, the fish attractor and escape habitat system 300 has a tensile strength greater than about 4,000 psi. In still other embodiments, the fish attractor and escape habitat system 300 has a tensile strength greater than about 4,500 psi. For instance, the fish attractor and escape habitat system 300 may have a tensile strength of about 4,800 psi.

The fish attractor and escape habitat system 300 may have any size suitable to allow for the system 300 to be deployed and used in the water. In some embodiments, the side walls 302 have sides that are about 25.4 cm (10 inches) to about 101.6 cm (40 inches) in length. In some embodiments, the side walls 302 have sides that are about 40.64 cm (16 inches) to about 91.44 cm (36 inches) in length. In other embodiments, the side walls 302 have sides that are about 60.96 cm (24 inches) to about 76.2 cm (30 inches) in length. For instance, in some embodiments, the side walls 302 have sides that are about 34.29 cm (13.5 inches) in length. In the configuration shown in FIGS. 22A-22G, the approximate assembled size is about 91.44 cm (36 inches) in diameter. In other embodiments, the fish attractor and escape habitat system 300 may have an approximate assembled size of about 106.68 cm (42 inches) in diameter, 121.92 cm (48 inches) in diameter, 137.16 cm (54 inches) in diameter, 152.4 cm (60 inches) in diameter, 167.64 cm (66 inches) in diameter, 182.88 cm (72 inches) in diameter, or larger or smaller.

Figure 24:
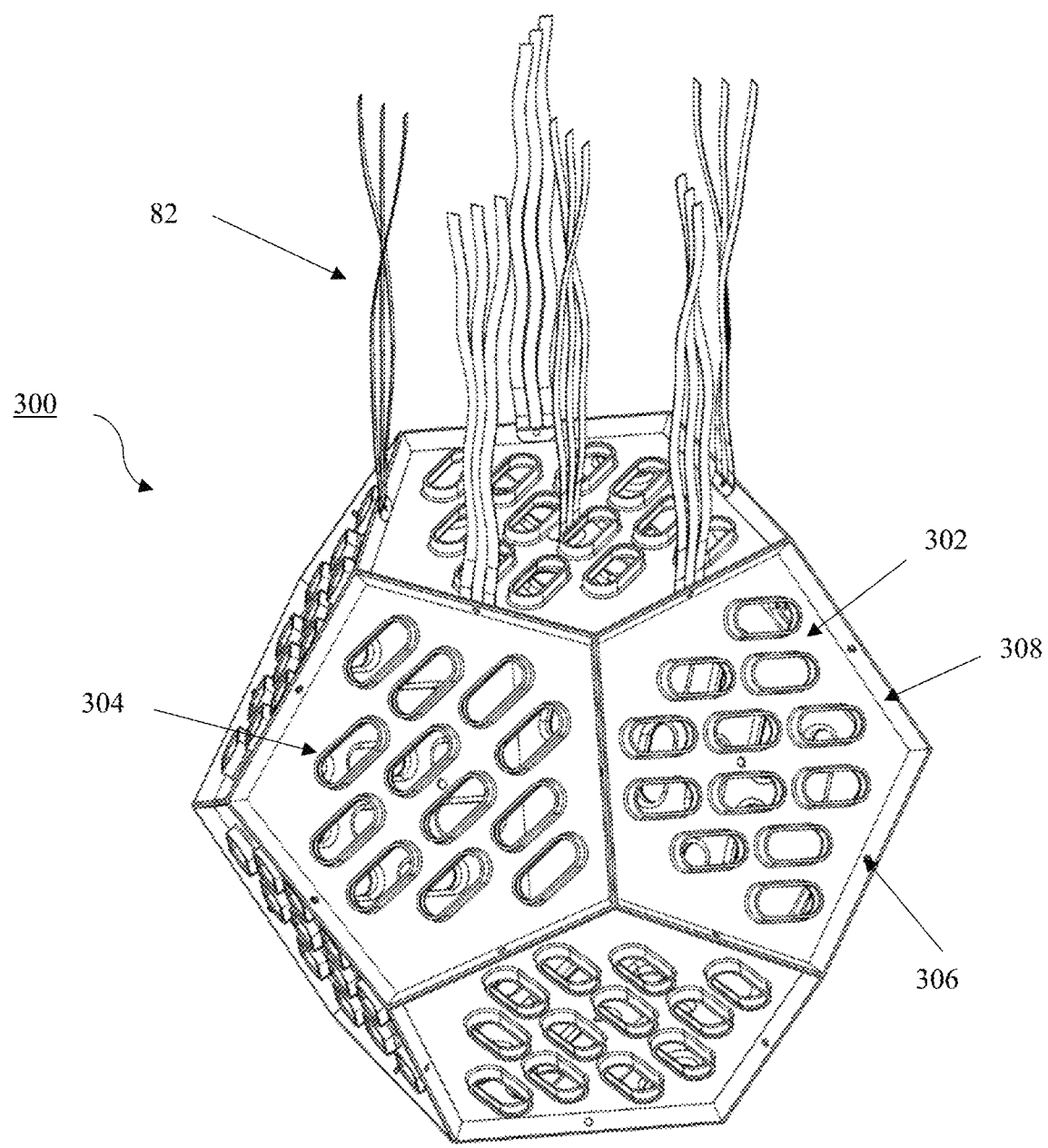
FIG. 24 is an upper perspective view of the fish attractor and escape habitat system shown in FIG. 22A with vegetation strands attached thereto according to one embodiment of the present disclosure.

FIG. 24 shows the fish attractor and escape habitat system 300 having the vegetation strands 82, as described above, attached thereto. The vegetation strands 82 may be attached at any of the holes 306 on the fish attractor and escape habitat system 300 (for example, on the flanges 308 and on the face of the side walls 302). In some embodiments, as shown in FIG. 24, the vegetation strands 82 may be attached at the holes 306 along the flanges 308 of the side wall 302 and at the holes 306 on the face of the side wall 302. When assembling the fish attractor and escape habitat system 300, a user can add vegetation strands 82 to the system 300 by inserting the fastener, such as fastener 84, through the hole in the vegetation strands 82, and then through the holes 306 along the flanges 308 of the side wall 302 and/or at the holes 306 on the face of the side wall 302. In other embodiments, the vegetation strands 82 may be attached at only some of the holes 306, for instance, some of the holes 306 along the flanges 308 and/or face of the side wall 302. In still other embodiments, the vegetation strands 82 may be attached at every hole 306 on the fish attractor and escape habitat system 300, or only used along the flanges 308 or only used on the faces of the side walls 302. The vegetation strands 82 may be attached to the system 300 using the exemplary fastener discussed above, friction fit pins, push pins, straps, snaps, or other male/female connectors known in the art.

The fish attractor and escape habitat system 300 can be deployed into any body of water. In some embodiments, the fish attractor and escape habitat system 300 can be suspended under water and tethered to a weighted device that is anchored to the bottom of the body of water, as described above with respect to the fish attractor and escape habitat system 100. This allows for the fish attractor and escape habitat system 300 to be placed/float in ideal levels of the water that are highest in oxygen, for instance, at a depth of about 1.83 m (6 feet) below the surface.

All of the systems and devices described herein can also greatly support and enhance conservation efforts. For example, the structures and devices disclosed herein can help protect fish from predators, such as cormorants, herons, turtles, other fish species, or other species that feed on fish.

Some embodiments of the systems and devices described herein may also have indicia on the structure, for example, images or graphics that display or mimic structure (like logs, brush piles, aquatic vegetation, etc.), water droplets, leaves, waves, sand, or other emblems (for example, professional or college team names, mascots, logos, etc.). Such indicia may make the devices more visually appealing to consumers. The indicia may be an adhesive layer placed on the outer surface of the structure or be integral with the device structure.

In some embodiments, the components of the systems and devices described herein can be made from eco-friendly polymer materials with a rough texture or finish to promote the growth of algae, phytoplankton (micro-algae), and other bacteria, periphyton and other microorganisms that serve as a food source to fish and other living creatures. Optional materials that can be utilized for various aspects of the embodiments described herein, and some of the surface roughness ranges that may be utilized for those embodiments that utilize a rough texture, are set out in Table 1 below (where Ra is calculated as the Roughness average of a surfaces measured microscopic peaks and valleys):

Surface Ra of different plastic

| molding | | material | Ra index arrange μm | | | | | | | | | | | |
|---|---|---|---|---|---|---|---|---|---|---|---|---|---|---|
| | | | 0.012 | 0.025 | 0.05 | 0.1 | 0.2 | 0.4 | 0.8 | 1.6 | 3.2 | 6.3 | 12.5 | 25 |
| inject | Thermoplastics | PMMA | | 0.025 | 0.05 | 0.1 | 0.2 | 0.4 | 0.8 | 1.6 | | | | |
| | | ABS | | 0.025 | 0.05 | 0.1 | 0.2 | 0.4 | 0.8 | 1.6 | | | | |
| | | AS | | 0.025 | 0.05 | 0.1 | 0.2 | 0.4 | 0.8 | 1.6 | | | | |
| | | PC | | | 0.05 | 0.1 | 0.2 | 0.4 | 0.8 | 1.6 | | | | |
| | | PS | | | 0.05 | 0.1 | 0.2 | 0.4 | 0.8 | 1.6 | 3.2 | | | |
| | | PP | | | | 0.1 | 0.2 | 0.4 | 0.8 | 1.6 | | | | |
| | | PA | | | | 0.1 | 0.2 | 0.4 | 0.8 | 1.6 | | | | |
| | | PE | | | | 0.1 | 0.2 | 0.4 | 0.8 | 1.6 | 3.2 | 6.3 | | |
| | | POM | | | 0.05 | 0.1 | 0.2 | 0.4 | 0.8 | 1.6 | 3.2 | | | |
| | | PSU | | | | | 0.2 | 0.4 | 0.8 | 1.6 | 3.2 | | | |
| | | PVC | | | | | 0.2 | 0.4 | 0.8 | 1.6 | 3.2 | | | |
| | | PPO | | | | | 0.2 | 0.4 | 0.8 | 1.6 | 3.2 | | | |
| | | Chlorinated polyether | | | | | 0.2 | 0.4 | 0.8 | 1.6 | 3.2 | | | |
| | | PBT | | | | | 0.2 | 0.4 | 0.8 | 1.6 | 3.2 | | | |
| | Thermosetting | Aminoplasts | | | | | 0.2 | 0.4 | 0.8 | 1.6 | 3.2 | | | |
| | | phenolics | | | | | 0.2 | 0.4 | 0.8 | 1.6 | 3.2 | | | |
| | | Silicone plastic | | | | | 0.2 | 0.4 | 0.8 | 1.6 | 3.2 | | | |
| press | | Aminoplasts | | | | | 0.2 | 0.4 | 0.8 | 1.6 | 3.2 | | | |
| | | phenolics | | | | | 0.2 | 0.4 | 0.8 | 1.6 | 3.2 | | | |
| | | Melamine | | | | 0.1 | 0.2 | 0.4 | 0.8 | | | | | |
| | | Silicone plastic | | | | | 0.2 | 0.4 | 0.8 | | | | | |
| | | DAP | | | | | | 0.4 | 0.8 | 1.6 | 3.2 | | | |
| | | Unsaturated polyester | | | | | | 0.4 | 0.8 | 1.6 | 3.2 | | | |
| | | Epoxy plastic | | | | | 0.2 | 0.4 | 0.8 | 1.6 | 3.2 | | | |
| | | Plexiglass | | 0.025 | 0.05 | 0.1 | 0.2 | 0.4 | 0.8 | 1.6 | 3.2 | 6.3 | | |
| | | PA | | | | | | | | 1.6 | 3.2 | 6.3 | 12.5 | |
| | | PTFE | | | | | | | 0.8 | 1.6 | 3.2 | 6.3 | 12.5 | |
| | | PVC | | | | | | | | 1.6 | 3.2 | 6.3 | 12.5 | |
| | | Reinforced | | | | | | | | 1.6 | 3.2 | 6.3 | 12.5 | 25 |

This invention may be provided in other specific forms and embodiments without departing from the essential characteristics as described herein. The embodiments described are to be considered in all aspects as illustrative only and not restrictive in any manner. The invention is not limited to the particular embodiments of the invention that have been described, since modifications may be made by those skilled in the art, particularly in light of the foregoing teachings.

What is claimed is:

1. A fish attractor and escape habitat system, comprising:
a pyramid-shaped base structure comprising a plurality of side walls forming an interior space and having an open bottom and an open top, wherein the side walls comprise a plurality of elongated slots and brace slots formed therein and each of the side walls comprises a bottom edge that forms the open bottom and each of the bottom edges comprises a plurality of jagged teeth formed in a zig zag pattern,
wherein the elongated slots and brace slots are arranged in a plurality of rows on each side wall, the plurality of rows comprising a top row and a bottom row, wherein each of the top row and the bottom row consists of the brace slots and the bottom row has a greater number of brace slots than the top row,
wherein each side wall comprises a plurality of snap fit elements configured for engagement with corresponding slots on an adjacent side wall to form a snap fit connection,
a plurality of braces slidably attached to the pyramid-shaped base structure at the brace slots, wherein each brace comprises two concave curved trough regions and a crest region integrally formed therebetween, and
wherein the pyramid-shaped base structure is formed of a thermoplastic polymeric material.

2. The fish attractor and escape habitat system of claim 1, wherein the thermoplastic polymeric material is high-density polyethylene (HDPE).

3. The fish attractor and escape habitat system of claim 1, wherein the elongated slots have a width of about 1 inch to about 3 inches and a length of about 2 inches to about 6 inches.

4. The fish attractor and escape habitat system of claim 1, wherein the thermoplastic polymeric material has a tensile strength of about 3,000 psi or greater.

5. The fish attractor and escape habitat system of claim 1, wherein the pyramid-shaped base structure has a length of about three feet to about ten feet.

6. A fish attractor and escape habitat system, comprising:
a pyramid-shaped base structure comprising a plurality of sloping side walls forming an interior space and having an open bottom and an open top, wherein the sloping side walls comprise a plurality of elongated slots and brace slots formed therein and each of the sloping side walls comprises a bottom edge that forms the open bottom and each of the bottom edges comprises a plurality of jagged teeth formed in a zig zag pattern,
wherein the elongated slots and brace slots are arranged in a plurality of rows on each side wall, the plurality of rows comprising a top row, a bottom row, and at least one middle row positioned therebetween, wherein each of the top row, the bottom row, and the at least one middle row consists of a different number of the brace slots,
a plurality of braces slidably attached to the pyramid-shaped base structure at the brace slots, wherein each brace comprises two concave curved trough regions and a crest region integrally formed therebetween, and
wherein the pyramid-shaped base structure and the plurality of braces are formed of a thermoplastic polymeric material.

7. The fish attractor and escape habitat system of claim 6, wherein the braces have a textured surface comprising a plurality of longitudinal ribs.

8. The fish attractor and escape habitat system of claim 6, wherein the braces are V-shaped.

9. The fish attractor and escape habitat system of claim 6, wherein the braces are at least three feet in length.

10. The fish attractor and escape habitat system of claim 6, wherein each of the sloping side walls comprises an upper edge that forms the open top and each of the upper edges comprises a plurality of holes configured for attaching a cable thereto.

11. A kit for a fish attractor and escape habitat system, comprising:
a pyramid-shaped base structure comprising a plurality of side walls forming an interior space and having an open bottom and an open top, wherein the side walls comprise a plurality of elongated slots and brace slots formed therein and each of the side walls comprises a bottom edge that forms the open bottom and each of the bottom edges comprises a plurality of jagged teeth, wherein each side wall comprises a plurality of snap fit elements configured for engagement with corresponding slots on an adjacent side wall to form a snap fit connection, and wherein the elongated slots and brace slots are arranged in a plurality of rows on each side wall, the plurality of rows comprising a top row and a bottom row, wherein each of the top row and the bottom row consists of the brace slots and the bottom row has a greater number of brace slots than the top row,
a plurality of braces configured for insertion into the pyramid-shaped base structure at the brace slots, wherein each brace comprises two concave curved trough regions and a crest region integrally formed therebetween,
a cable configured for attaching a weight to the pyramid-shaped base structure, and
a plurality of clips configured for attaching the cable to the pyramid-shaped base structure.

12. The kit of claim 11, wherein the weight comprises a cinder block, a paver, or a brick.

13. The kit of claim 11, wherein the cable is made of stainless or galvanized steel.

14. The kit of claim 11, wherein the cable comprises a center loop configured for attachment to the weight and two end loops configured for attachment to the clips.

15. The kit of claim 11, wherein each of the side walls comprises a plurality of holes configured for attachment by the clips.

16. The kit of claim 11, wherein the clips are carabiner clips.

17. The kit of claim 11, wherein the pyramid-shaped base structure and the braces are formed of high-density polyethylene (HDPE).

18. The fish attractor and escape habitat system of claim 6, wherein each side wall comprises a plurality of snap fit elements configured for engagement with corresponding slots on an adjacent side wall to form a snap fit connection.

19. The fish attractor and escape habitat system of claim 11, wherein the plurality of jagged teeth is formed in a zig zag pattern.

* * * * *